(12) United States Patent
Baughman et al.

(10) Patent No.: US 11,217,366 B2
(45) Date of Patent: Jan. 4, 2022

(54) SHEATH-CORE FIBERS FOR SUPERELASTIC ELECTRONICS, SENSORS, AND MUSCLES

(71) Applicant: Board of Regents, The University of Texas System, Austin, TX (US)

(72) Inventors: Ray H. Baughman, Dallas, TX (US); Zunfeng Liu, Richardson, TX (US); Shaoli Fang, Richardson, TX (US); Francisco A. Moura, Campinas (BR); Nan Jiang, Richardson, TX (US); Dong Qian, Plano, TX (US); Hongbing Lu, Plano, TX (US); Xavier N. Lepro, Richardson, TX (US); Carter S. Haines, Murphy, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 872 days.

(21) Appl. No.: 15/745,383

(22) PCT Filed: Jul. 15, 2016

(86) PCT No.: PCT/US2016/042579
§ 371 (c)(1),
(2) Date: Jan. 16, 2018

(87) PCT Pub. No.: WO2017/058339
PCT Pub. Date: Apr. 6, 2017

(65) Prior Publication Data
US 2019/0096540 A1 Mar. 28, 2019

Related U.S. Application Data

(60) Provisional application No. 62/193,231, filed on Jul. 16, 2015.

(51) Int. Cl.
*H01B 7/04* (2006.01)
*B29C 70/14* (2006.01)
(Continued)

(52) U.S. Cl.
CPC ............... *H01B 7/04* (2013.01); *B29C 70/14* (2013.01); *H01B 1/24* (2013.01); *H01B 3/28* (2013.01);
(Continued)

(58) Field of Classification Search
None
See application file for complete search history.

(56) References Cited

U.S. PATENT DOCUMENTS

| | | |
|---|---|---|
| 2011/0278040 A1 | 11/2011 | Zhang et al. |
| 2012/0000293 A1 | 1/2012 | Baughman et al. |
| 2015/0147573 A1 | 5/2015 | Zhang et al. |

OTHER PUBLICATIONS

Zhang et al., https://onlinelibrary.wiley.com/doi/full/10.1002/adma.201404573, Nov. 2014 (Year: 2014).*

(Continued)

*Primary Examiner* — Shawn Mckinnon
(74) *Attorney, Agent, or Firm* — Dickinson Wright PLLC; Ross Spencer Garsson

(57) ABSTRACT

Superelastic conductive fibers, and more particularly, sheath-core fibers for superelastic electronics, sensors, and muscles, and a process for fabricating of highly stretchable sheath-core conducting fibers by wrapping fiber-direction-oriented conductive nanofiber sheets on stretched rubber fiber cores.

9 Claims, 45 Drawing Sheets

(51) Int. Cl.
*H01B 7/02* (2006.01)
*H01B 7/18* (2006.01)
*H01B 3/28* (2006.01)
*H01B 13/26* (2006.01)
*H01B 1/24* (2006.01)

(52) U.S. Cl.
CPC ......... *H01B 7/0241* (2013.01); *H01B 7/1855* (2013.01); *H01B 13/26* (2013.01); *B29K 2995/0046* (2013.01)

(56) References Cited

OTHER PUBLICATIONS

Authorized Officer Athina Nickitas-Etienne; International Preliminary Report On Patentability; dated Jan. 25, 2018; 8 pages.

* cited by examiner

SHEATH-CORE FIBERS FOR SUPERELASTIC ELECTRONICS, SENSORS, AND MUSCLES

CROSS-REFERENCE TO RELATED APPLICATIONS

This Application is the 35 U.S.C. § 371 national application of International Application Number PCT/US2016/042579, entitled "Sheath-Core Fibers For Superelastic Electronics, Sensors, And Muscles," filed on Jul. 15, 2016, which designated the United States, claiming priority to U.S. Provisional Patent Application 62/193,231, entitled "Sheath-Core Fibers For Superelastic Electronics, Sensors, And Muscles," filed Jul. 16, 2015 ("the '231 Provisional Patent Application"). Attachments A and B to the '231 Provisional Patent Application were each unpublished papers at the time of the filing of the '231 Provisional Patent Application, which papers subsequently published as (A) Z. Liu et al., Hierarchically Buckled Sheath-Core Fibers for Superelastic Electronics, Sensors, and Muscles. Science, 349 (6246), 400-404 (Jul. 24, 2015) ("Liu 2015") and (B) Z. Liu, et al., Supplementary Materials for Hierarchically Buckled Sheath-Core Fibers for Superelastic Electronics, Sensors, and Muscles. Science, (Jul. 22, 2015) ("Liu 2015 *Supplemental Materials*"). These applications (including Attachments A and B, Liu 2015, and Liu 2015 *Supplemental Materials*) are incorporated by reference herein in their entirety.

GOVERNMENT INTEREST

This work was supported by Air Force Office of Scientific Research Grants FA9550-12-1-0211, FA9550-15-1-0089, and FA9550-14-1-0227; Robert A. Welch Foundation Grant AT-0029; US Army W91CRB-14-C-0019; Department of Defense Grant W81XWH-14-1-0228; National Institutes of Health 1R01DC011585-01; National Science Foundation Grants CMMI-1031829, 1120382, 1335204, and ECCS-1307997; Office of Naval Research MURI Grant NOOD14-11-1-0691; Army Grant W91CBR-13-C-0037; and the Louis A. Beecherl, Jr. Chair. The U.S. government has certain rights in the invention.

FIELD OF THE INVENTION

The present disclosure is generally related to superelastic conductive fibers, and more particularly, to sheath-core fibers for superelastic electronics, sensors, and artificial muscles.

BACKGROUND

Highly elastic electrical conductors are needed for stretchable electronic circuits, pacemaker leads, light-emitting displays, harvesters of mechanical energy, batteries, supercapacitors, and strain sensors [Rogers 2010]. For such purposes, conducting elastomers have been fabricated by incorporating conducting particles in rubber [Sekitani 2009; Y Kim 2013; Park 2012; Chun 2010] or attaching sheets of conducting nanofibers [Chen 2015; Liang 2013; Y Zhu 2012; Yamada 2011], graphene sheets [Chen 2014; Zang 2013], or coiled or serpentine conductors to a rubber sheet or fiber [Wang 2011; Bowden 1998; White 2013; Cai 2013; Khang 2006; Z Zhang 2015].

While reversible strains have exceeded 500%, the quality factor (Q=percent strain/percent resistance change) has been below 3 for such large strains [Z Zhang 2015; Boland 2014; U Shin 2014; S Zhu 2013]. Although elastomeric conductors having very low quality factors are useful as resistance-based strain sensors, the other above applications would benefit from the realization of very high quality factors. The availability of conducting fibers that can be stretched to greater extents without significantly changing electrical conductance could enable superelastic fibers that are artificial muscles, electronic interconnects, supercapacitors, or light-emitting elements, as well as highly stretchable electronic interconnects for elastically deformable electronic circuits, energy storage and mechanical energy harvesting devices, and light sources. Additionally, the presently used electronic cables for pacemakers fail at an unacceptably high rate, which necessitates medical operations to replace failed leads. Hence, improved electronically conducting cables are needed for pacemaker leads that can be severely bent and stretched in response to body motion for over a decade without degradation of electronic conductance.

The present invention provides superelastic sheath-core fibers that undergo little change in electronic conductance when highly stretched, highly twisted, coiled, knotted, or bent to a small radius. Described carbon-nanotube/rubber sheath-core fibers function as conductors that can be reversibly stretched 1320%, and provide a ratio of percent elongation in fiber length to percent resistance change of up to 421, which is 97 times higher than for previously reported elastomeric fiber conductors. Since extreme twist does not degrade conductance, the elastic range can be increased to 2470% by tightly coiling the conducting sheath-core fiber. These highly elastomeric fibers can be deployed as pacemaker leads and as cables that are extendable up to 31 times their initial length without significant conductance change, which can be applied for morphing structures in space, robotic arms or exoskeletons having giant reach, or as interconnects for highly elastic electronic circuits and devices.

When these sheath-core fibers are modified by applying one or more rubber sheaths and one or more additional conducting nanofiber sheaths, they provide tensile and torsional artificial muscles and capacitive strain sensors that are linearly responsive over a giant strain range to generate 860% capacitance change as the fiber is elongated 950%. Unprecedented performance results from novel short-period and long-period sheath buckling, which reversibly occurs out-of-phase in axial and belt directions.

There is a need for high stroke torsional artificial muscles that are electrically driven without requiring electrothermal processes (which limit muscle electrical-to-mechanical energy conversion efficiency) or electrochemical processes (which require the problematic presence of an electrolyte, counter electrode, and device packaging, which add much more to actuator system weight than the actuating material and limit operating temperature, operating voltage, actuation rate, and deployment possibilities). This need is, for example, for low-cost, low-weight and low-volume chemical mixers, pumps, and valves and for beam steerers and beam choppers for optical circuits. Torsional muscles based on the sheath-core fibers of the applicant are shown by the applicant to provide a 104 times higher torsional stroke per muscle length than any previously reported electrically-driven, non-thermal, non-electrochemical torsional muscle fiber [Pan 2008; J Kim 2001].

SUMMARY

The present invention includes highly-elastic nanofiber-sheath/rubber-core conducting fibers that serve as electronic interconnects that retain their electronic conductance when severely stretched, twisted, coiled, bent to small radius, or knotted.

The present invention further provides torsional and tensile fiber actuators (artificial muscles) and fiber supercapacitors that exploit the properties of highly elastic nanofiber-sheath/rubber-core conducting fibers that contain one or more elastomeric sheaths and at least two electronically conducting nanofiber sheaths. The present invention also includes devices that include these highly elastic fibers.

Superelastic conducting fibers providing improved properties and functionalities are needed for diverse applications. Applicants have discovered a process for fabricating of highly stretchable (up to 1320%) sheath-core conducting fibers by wrapping fiber-direction-oriented carbon nanotube sheets on stretched rubber fiber cores. The resulting structure exhibited unique short-period and long-period sheath buckling that reversibly occurred out-of-phase in axial and belt directions, which enabled the resistance change for 1000% stretch to be below 5%. By including other rubber and carbon nanotube sheath layers, strain sensors have been demonstrated generating 860% capacitance change, and electrically powered torsional muscles have been shown that operate reversibly by a coupled tension-to-torsion actuation mechanism. The complementary effects of increase in muscle length and a large positive Poisson's ratio on torsional actuation and electronic properties have been quantified.

Exciting progress has been made in realizing highly elastic electrical conductors for such applications as elastic interconnects and stretchable electronic devices. Conducting elastomers have been fabricated by incorporating conducting particles in rubber or attaching sheets of conducting nanofibers, graphene sheets, or coiled or serpentine conductors to a rubber sheet. While reversible strains have exceeded 500%, the quality factor (Q=percent strain/percent resistance change) has been below three (3) for such large strains.

The present invention realizes conducting fibers that are much more elastically stretchable than previous conducting sheets or fibers, and simultaneously provide a dramatically increased Q for giant stretch.

The present invention also enables such fibers as highly elastic electronic interconnects, capacitors, strain sensors, and electrically-driven muscles that combine torsional actuation with tensile actuation. These artificial muscle fibers can provide high strokes and fast responses, while avoiding the Carnot efficiency limit of thermally powered artificial muscles and the use of liquids or vapors for electrochemically or absorption-powered muscles.

Superelastic conducting fibers providing improved properties and new functionalities are needed for diverse applications. Carbon-nanotube/rubber sheath-core fiber conductors of the present invention can be reversibly stretched 1320%, and provide a ratio of percent elongation in fiber length to percent resistance change of up to 421, which is 97 times higher than for previously reported elastomeric fiber conductors. Since extreme twist does not degrade conductance, the elastic range can be increased to 2470% by tight fiber coiling. This performance results from short-period and long-period sheath buckling that reversibly occurs out-of-phase in axial and belt directions. This structure enabled strain sensors generating 860% capacitance change, and electrically powered torsional muscles that operate by a new mechanism. Capacitive strain sensor results showed that 950% stretch of an $NTS_4$@rubber@$NTS_3$@fiber provided a remarkable 860% increase in capacitance and that this capacitance change was largely non-hysteretic and reversible. Both high linearity and high sensitivity can be obtained over a giant strain range. Fractional capacitance change was substantially higher than for previous elastomeric fiber dielectric capacitors.

Artificial muscles, with twisted fiber geometry, provided novel torsional actuators having up to 104 times higher torsional stroke per muscle length than previously demonstrated for any electrically driven, non-thermal, non-electrochemical muscle fiber.

The elastomeric fibers of the present invention can also be deployable for such applications as pacemaker leads. Other possibilities are for cables that are extendable up to 31 times their initial length without significant resistance change, which could be applied for morphing structures in space, robotic arms or exoskeletons having giant reach, or as interconnects for highly elastic electronic circuits.

In one aspect, the invention features a method of producing a superelastic conductive fiber. The method includes selecting a reversibly stretchable fiber core. The method further includes stretching the stretchable fiber core. The method further includes wrapping one or more layers of nanofiber sheet on the stretchable fiber core while it is stretched. The wrapping results in wrapped layers of one or more layers of the nanofiber sheets around the stretchable fiber core. The orientation of nanofibers in at least one of the one or more nanofiber sheets is parallel to the stretchable fiber core. The method further includes releasing the nanofiber-wrapped stretchable fiber core. The method further includes restretching the nanofiber wrapped stretchable fiber core to form the superelastic conductive fiber in stretched state.

Implementations of the inventions can include one or more of the following features:

The stretchable fiber core can include a rubber.

The superelastic conductive fiber can be stretchable at least up to 1320%.

The superelastic conductive fiber can exhibit short-period and long-period sheath buckling that reversibly occurred out-of-phase in axial and belt directions during the steps of releasing and restretching.

The superelastic conductive fiber can be operable to be stretched 1000% without a resistance change greater than 5%.

The superelastic conductive fiber can be operable to be stretched to more than 30 times its unstretched length without a resistance change greater than 5%.

The superelastic conductive fiber can have a ratio of percent elongation in fiber length to percent resistance change of at least 5.

The superelastic conductive fiber can have a ratio of percent elongation in fiber length to percent resistance change of at least 100.

The superelastic conductive fiber can have a ratio of percent elongation in fiber length to percent resistance change of at least 400.

The wrapped nanofiber sheet or sheets can include highly-oriented carbon multiwall nanotube aerogel sheets.

The stretchable fiber core can include styrene-(ethylene-butylene)-styrene.

The stretchable fiber core can further include a plasticizer.

The step of stretching the stretchable fiber core can include stretching the stretchable fiber core to at most 1400% strain.

The method can further include a step of coating the wrapped, stretchable fiber core in a rubber layer.

The step of rubber coating can be performed after the stretchable fiber core is substantially released from the stretched state.

There can be at least two nanofiber sheet layers wrapped on the stretchable fiber core and a rubber layer separating the two nanofiber sheet layers.

The step of rubber coating can be performed while the stretchable fiber core is stretched.

There can be more than two layers of nanofiber sheets wrapped on the stretchable fiber core, on the rubber layer, or both.

The stretchable fiber core and the rubber layer comprise styrene-(ethylene-butylene)-styrene.

The rubber layer can further include a plasticizer.

The method can further include the step of liquid-based densification of the one or more layers of nanofiber sheet on the stretchable fiber core after the step of wrapping.

The step of liquid-based densification can occur before the step of releasing.

The step of liquid-based densification can occur after the step of releasing.

The orientation of the nanofibers in each of the one or more nanofiber sheets can be parallel to the stretchable fiber core.

In another aspect, the invention features a superelastic conductive fiber. The superelastic conductive fiber includes a reversibly stretchable fiber core and one or more layers of nanofiber sheets wrapped on the stretchable fiber core. The one or more layers of nanofiber sheets were wrapped on the stretchable fiber core while the reversibly stretchable fiber core was in the stretched position. There are wrapped layers of the one or more layers of nanofiber sheets wrapped around the stretchable fiber core.

The orientation of the nanofibers in at least one of the one or more nanofiber sheet is parallel to the stretchable fiber core.

Implementations of the inventions can include one or more of the following features:

The superelastic conductive fiber was produced by the process of stretching the stretchable fiber core. The superelastic conductive fiber was further produced by the process of wrapping one or more layers of nanofiber sheet on the stretchable fiber core while it is stretched. The superelastic conductive fiber was further produced by the process of releasing the nanofiber wrapped stretchable fiber core.

The superelastic conductive fiber can be operable as a fiber selected from the group consisting of fiber capacitors, tensile strain sensors, and artificial muscles that combine torsional and tensile actuation.

The superelastic conductive fiber can be operable as a fiber capacitor in which 950% stretch of the superelastic conductive fiber provides at least 800% increase in capacitance. The increase in capacitance change can be substantially non-hysteretic and reversible.

The superelastic conductive fiber can be operable as an artificial muscle based on electrostatic attraction between electrodes of dielectric rubber capacitors.

The artificial muscle can be a high stroke torsional fiber muscle made by inserting twist into the superelastic conductive fiber.

The orientation of the nanofibers in each of the one or more nanofiber sheets can be parallel to the stretchable fiber core.

In another aspect, the invention features a method for making an elastomeric sheath-core electrically conducting fiber having a high quality factor Q for a large strain range. The quality factor Q is percent strain/percent resistance change. The method includes the step of stretching an elastomeric core fiber to a fabrication strain $\varepsilon_{fab}$. The method further includes the step of applying an array of oriented conducting nanofibers as a sheath to the surface of the stretched elastomeric core fiber so that (i) the average orientation direction of the conducting nanofibers is substantially parallel to the length of stretched elastomeric core fiber, and (ii) the nanofibers in the sheath are electrically percolated along said length. The method further includes the step of releasing the applied force that resulted in the fabrication strain. The method further includes the step of restretching the nanofiber-coated core fiber to a core-fiber strain that does not substantially exceed the fabrication strain.

Implementations of the inventions can include one or more of the following features:

The array of oriented conducting nanofibers can be applied by contacting the stretched elastomeric core fiber with an oriented sheet of nanofibers in which the nanofibers are predominately aligned in one direction.

The method can further include liquid-based densification of the nanofiber sheath.

The liquid-based-densification of the nanofiber sheath can be conducted before the step of releasing the applied force that resulted in the fabrication strain.

The oriented sheet of nanofibers can be made by a process comprising electrospinning.

The oriented sheet of nanofibers can be made by a process comprising mechanical draw of carbon nanotubes from a carbon nanotube forest.

The sheath layer can be densified.

The sheath layer can be densified by non-liquid based densification.

The step of restretching can include that the core-fiber strain substantially equals the fabrication strain.

The nanofibers can be selected from the group consisting of metal nanofibers, conducting polymer nanofibers, carbon nanotubes, and combinations thereof.

The method can further include a twist insertion process. The twist insertion process can include inserting twist into the elastomeric sheath-core electrically conducting fiber.

The twist insertion process can produce a coiled elastomeric sheath-core electrically conducting fiber.

The twist insertion process can be performed in the absence of a mandrel.

The twist insertion process can be performed in the presence of a mandrel.

The twist insertion process can be conducted by wrapping an elastomeric sheath-core electrically conducting fiber about the mandrel. The elastomeric sheath-core electrically conducting fiber used for mandrel wrapping can have either (i) not been twist inserted or (ii) been twist-inserted to below the twist needed to produce coiling and the twist insertion before mandrel coiling has either the same or an opposite direction to the twist direction used for the mandrel coiling.

The method can further include coating the nanofiber sheath with a layer of elastomer while the elastomeric sheath-core electrically conducting fiber is in the stretched state.

The coating of the nanofiber sheath can be performed while the elastomer fiber core is stretched to at least approximately the fabrication strain $\varepsilon_{fab}$.

The method can further include coating the nanofiber sheath with a layer of elastomer while the elastomeric sheath-core electrically conducting fiber is in the strain-relaxed state.

The method can further include applying to the rubber-coated elastomeric sheath-core electrically conducting fiber an array of nanofibers that are oriented in the fiber direction. The step of applying can be performed while the rubber core of the rubber-coated elastomeric sheath-core electrically conducting fiber is elongated to at least approximately the fabrication strain.

In another aspect, the invention features an elastomeric electrically conducting fiber that is operable for being periodically buckled in a first dimension and a second dimension. The elastomeric electrically conducting fiber includes an elastomeric fiber core. The elastomeric electrically conducting fiber further includes a nanofiber sheath having nanofibers that are predominately oriented in the length direction of the elastomeric fiber core. The first dimension is provided by the length direction of the elastomeric electrically conducting fiber. The second dimension is provided by the belt direction of the elastomeric electrically conducting fiber. The periodic buckling in the first dimension and the second dimension provides out-of-plane buckling.

Implementations of the inventions can include one or more of the following features:

The periodic buckling in first dimension and the second dimension can be operable to occur out-of-phase in the length and belt directions as the length of the elastomeric electrically conducting fiber is varied by either mechanical stretch or release of mechanical stretch.

The buckling in both the first direction and the second direction can be hierarchical in that, in each of the first direction and the second direction, both long period and short period buckling can occur.

BRIEF DESCRIPTION OF THE DRAWINGS

FIG. 1A illustrates the steps in the fabrication of an $NTS_m$@fiber, where the circular arrow 103 indicates the belt direction.

FIG. 1B illustrates the structure of a longitudinal section of an $NTS_m$ sheath, showing two-dimensional, hierarchical buckling. The fiber direction is horizontal. The yellow (lighter) color in FIGS. 1A-1B represents SEBS rubber 101 and the gray shells are NTSs 102.

FIGS. 1C-1D are, respectively, low and high resolution SEM images showing long-period and short-period buckles for an $NTS_{180}$@fiber at 100% applied strain. The fiber direction, which is the direction of the applied strain, is horizontal and the belt direction is vertical in FIGS. 1C-1D. The fabrication strain was 1400%.

FIG. 4A is a graph that shows measured data points and predicted curves for the dependence of resistance on strain for $NTS_m$@fibers (curves 401-407 for m=1, 4, 8, 19, 50, 100, and 200, respectively), rubber@$NTS_{50}$@fibers (curve 408), and seven plied rubber@$NTS_{90}$@fibers (curve 409). $R(\varepsilon)$ is the resistance at strain $\varepsilon$ and $L_{max}$ is the maximum length of the stretched sheath-core fiber. $\sigma_C$ and $\sigma_D$ are conductivities in the axial direction and in the inter-buckle contact region, respectively.

FIG. 4B is a graph that shows resistance change versus strain for $NTS_m$@fibers, for increasing strain (curves (open circles) 410-413 for m=8, 50, 100, and 200, respectively) and decreasing strain (curves (filled circles) 414-417 for m=8, 50, 100, and 200, respectively). $R_0$ is the resistance at zero strain. The inset 418 of FIG. 4B is a graph that shows the dependence of the available strain range ($\varepsilon_{max}$) and the maximum percent resistance change on m (curve (filled triangle) 419 and curve (filled square) 420, respectively).

FIG. 4C is a graph that shows the comparison of the quality factor $Q=(\Delta L/L_0)/(\Delta R/R_0)$ and the maximum reversible tensile strain for sheath-core fibers of the present invention and previous elastomeric conductors having a strain range ≥200%. Open squares 421 (for rubber@$NTS_m$@fiber for m=1, 50, and 100, as shown in FIG. 4C) and filled light squares 422 for $NTS_m$@fiber for m=1, 8, 19, 50, 100, and 200, as shown in FIG. 4C) are for the present work and the dark symbols shown in table 423 are for literature results, described in the table 423 included with FIG. 4C.

FIG. 5A is a graph that shows resistance change versus strain for coiled rubber@$NTS_{19}$@fibers made by mandrel-free coiling 501 (increasing strain curve (open circle) 503 and decreasing strain curve (filled circle) 504) and by coiling a fiber on a rigid mandrel 502 having a similar diameter as the fiber (increasing strain curve (open diamonds) 505 and decreasing strain curve (filled diamond) 506).

FIG. 5B is a graph that shows the strain dependence of capacitance and linear capacitance (per instantaneous length) of $NTS_4$@rubber@$NTS_3$@fiber 507. Capacitance is shown in curve (open square) 508 and curve (filled square) 509, are for increasing and decreasing strains, respectively. Linear capacitance is shown in curve (open circle) 510 and curve (filled circle) 511, are for increasing and decreasing strains, respectively. The inset 512 of FIG. 5B shows the capacitance change during selected cycles to 950% strain (curve 513).

FIG. 8A is a graph that shows the dependence of rotation angle (curve 801), rotation speed (curve 802), and tensile stroke (curve 803) on inserted twist for the single-ply muscle 804 when operated isobarically at a field of 10.3 MV/m.

FIG. 8B is a graph that shows the theoretical (dashed curves 805 and 806, respectively) and experimental data points (points 807 and 808, respectively) for (a) the electric-field dependence of rotation angle and (b) tensile stroke for an isobarically operated single-ply muscle 804 containing 3.20 turns/cm of twist. The inset 809 of FIG. 8B shows the relationship between maximum rotation speed and torsional stroke (theoretical curve 810 and experimental data points 811).

FIG. 8C is a graph that shows the dependence of rotation angle (curve 812), rotation speed (curve 813), and tensile stroke (curve 814) on the twist inserted during plying for a two-ply muscle 815 operated isobarically at 11.7 MV/m.

FIG. 8D is a graph that shows the dependence of rotation angle (curve 816) and tensile stroke (curve 817) on electric field for an isobarically operated two-ply muscle 815, plied using 3.47 turns/cm of twist. The inset 818 of FIG. 8D shows the relationship between maximum rotation speed and torsional stroke (curve 819).

DETAILED DESCRIPTION

Figure 1A:
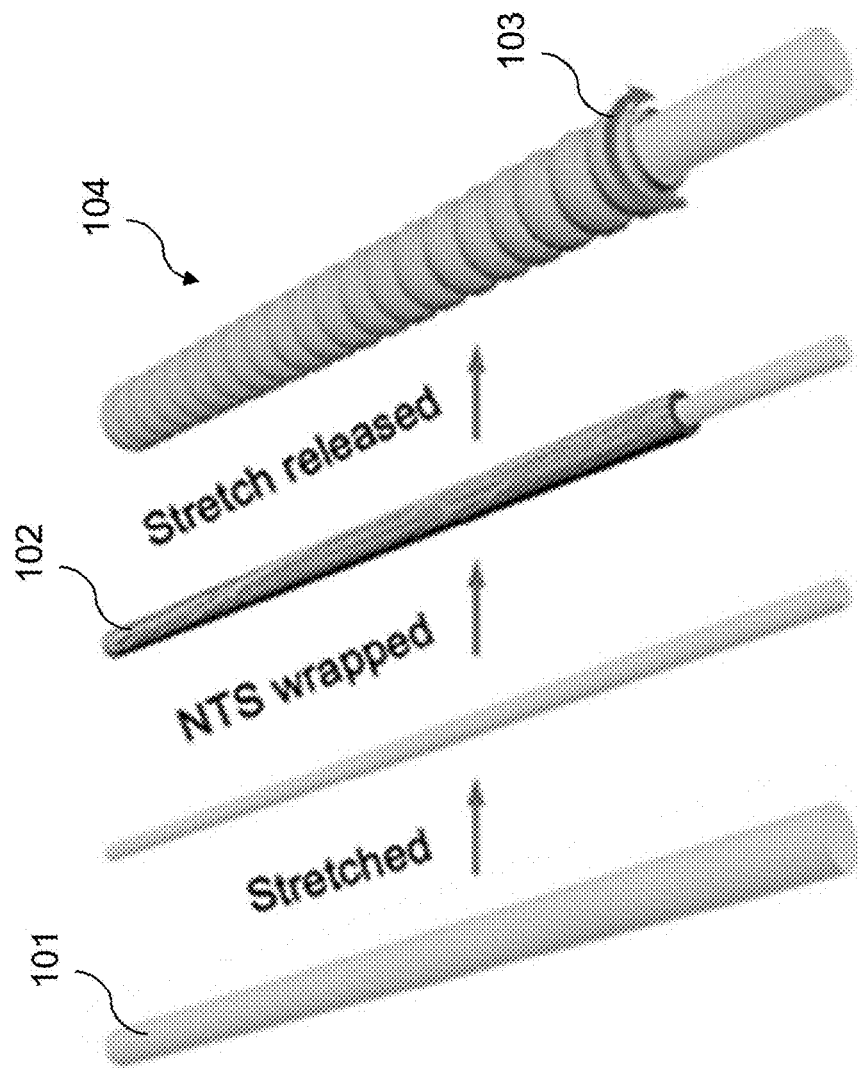
FIGS. 1A-1D show two-dimensional, hierarchically buckled, sheath-core fibers of the present invention.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems.

The present invention is directed to highly elastic nanofiber-sheath/rubber-core conducting fibers that undergo little change in electronic conductance when highly stretched, highly twisted, coiled, knotted, or bent to a small radius. When these sheath-core fibers are modified by applying one or more rubber sheaths and at least one additional conducting nanofiber sheath, they provide tensile and torsional artificial muscles and capacitive strain sensors that are linearly responsive over a giant strain range.

Described carbon-nanotube/rubber sheath-core fibers function as conductors that can be reversibly stretched 1320%, and provide a ratio of percent elongation in fiber length to percent resistance change of up to 421, which is 97 times higher than for previously reported elastomeric fiber conductors. Since extreme twist does not degrade conductance, the elastic range can be increased to 2470% by tightly coiling the fiber.

The remarkable performance of these sheath-core fibers results from an important topological constraint that does not exist for conducting layers on stretched sheets. This constraint can profoundly affect structure and properties when the fiber's Poisson's ratio is large, which is the case for the rubbers preferred for the fiber core. This Poisson's ratio for stretch in the fiber direction is ~0.5 for strains from 0 to 1300%, which means that the volume of the rubber is conserved during stretch. To realize this conservation, a Z-fold increase in length must result in a $Z^{1/2}$-fold decrease in rubber fiber diameter. In contrast, a laminated sheet can approximately conserve rubber volume by undergoing a $Z^{1/2}$-fold decrease in both rubber sheet width and thickness, when the overcoating conducting layer is non-confining, and a Z-fold decrease in thickness and no change in width when the overcoating sheet is deformable only in the stretch direction.

The Fabrication and Structure of Highly Elastic Nanofiber-Sheath/Rubber-Core Conducting Fibers The highly elastic nanofiber-sheath/rubber-core conducting fibers of the present invention embodiments comprise one or more nanofiber sheaths. For the purpose of these invention embodiments, "nanofibers" are defined as fibers that have a smallest lateral average dimension of below 1000 nm, and ribbons are considered to be a specific type of nanofibers. Networks of electrically interconnected nanofibers having predominately a smallest nanofiber lateral dimension of either below 100 nm or below 10 nm can be especially useful for these invention embodiments.

Various nanofibers and nanofiber syntheses and fabrication processes can be usefully deployed for the nanofiber sheaths, as can be mixtures of different nanofiber types and mixtures of nanofibers with other materials. As one important example, conducting nanofibers produced by electrostatic spinning can be used (for electrospinning methods for both conducting and insulating nanofibers). [See Carnell 2008; D. Li 2004; Katta 2004; Fennessey 2004]. Since nanofibers in the sheet should preferably have an average orientation in the fiber direction of the rubber core and since nanofiber sheet wrapping provides a convenient method for fabricating highly elastic sheath-core conducting fibers, these nanofibers can usefully be ones that are assembled as sheets containing highly oriented nanofibers during the electrospinning process. These nanofibers can be either electrostatically spun as conducting fibers or converted to conducting nanofibers after the electrostatic spinning process. Examples are conducting polymer nanofibers that are either electrostatically spun as conducting nanofibers or made electrically conducting after the spinning process by using a chemical or electrochemical doping process. Another example is provided by carbon-precursor polymer fibers that are electrospun as insulating polymer nanofibers and thereafter converted to electronically conducting fibers by post-spinning pyrolysis to produce carbon nanofibers or by coating with a metal layer. As another important example, the conducting nanotubes in forest-drawn carbon nanotube sheets can be either directly used for sheath fabrication, coated with another conductor, or used as a template to make hollow nanofibers by depositing a metal on the carbon nanotubes and then removing the carbon nanofiber core by oxidation [see Lima 2011]. Alternatively, the oriented carbon nanotube sheet used for sheath fabrication can be obtained by well-known processes in which the carbon nanotubes are synthesized in the gas phase [Lashmore Patent Application; Y. Li 2004].

Other nanofiber types that do not include carbon are useful for invention embodiments, and various processes are well known in the art for making these nanofibers. Some examples are the growth of superconducting $MgB_2$ nanowires by the reaction of single crystal boron nanowires with the vapor of Mg [Wu 2001], the growth of superconducting lead nanowires by the thermal decomposition of lead acetate in ethylene glycol [Wu 2003], and the synthesis of lead nanowires by templating lead within channels in porous membranes or steps on silicon substrates [Wu 2003]. The latter methods and various other methods of producing metallic nanowires of types suitable for the practice of invention embodiments are described in Wu 2003, and are elaborated upon in associated references. Y. Li and coworkers have shown how to make bismuth nanotubes. [Y. Li 2001].

Because of their strength, electrical conductivity, and mechanical strength, carbon nanotubes (CNTs) are especially preferred for invention embodiments. Especially useful types of CNTs include carbon multiwalled nanotubes (MWNTs), carbon few-walled nanotubes (FWNTs), and carbon single-walled nanotubes (SWNTs). Such SWNTs and FWNTs are useful for invention embodiments even when the nanotube diameter is sufficiently large that the SWNTs or FWNTs collapse into ribbons. Doping with electron donors or acceptors can be usefully employed for increasing the electronic conductivity of carbon nanotube sheaths, as well as other sheath types where doping can enhance electronic conductivity. For instance, previous work has shown that the electrical conductivity of few wall carbon nanotube (FWNT) yarns can be increased from $2.9 \times 10^4$ to $5 \times 10^4$ S/cm by doping with iodine vapor [Behabtu 2013], compared with the nanotube direction conductivity of about 700 S/cm for densified MWNT sheet or MWNT fibers [M Zhang 2005].

Nanofibers that comprise nanoribbons of graphene sheets are also useful for making conducting sheaths. One preferred method for making these graphene ribbons as high aspect ratio nanofibers is by unzipping carbon nanotubes [Kosynkin 2009]. This unzipping process is preferably accomplished after the CNTs are assembled as highly oriented sheets.

Since highly oriented carbon nanotube sheets are readily made by such processes as mechanical draw from a nanotube forest, and since these nanotubes are both strong and highly conducting, they will be used in many of the demonstrations of sheath-core conducting fiber fabrication and application.

Various types of rubbers can be deployed as fiber core and as dielectric layers for embodiments of the invention, such as styrene ethylene/butylene styrene (SEBS), styrene butadiene styrene block polymer (SBS), polyolefin elastomer (POE), the polymer of ethylene propylene diene monomer (EPDM), thermoplastic polyurethanes (TPU), ethylene-vinyl acetate copolymer (EVA), and silicone rubber. As an alternative to using a dielectric rubber, the elastomeric core of the sheath-core fiber can comprise other highly elastic materials, such as an ionically conducting elastomeric gel [Keplinger 2013]. Elastomeric ionically conducting gels can also be used as separating layers between nanofiber sheath electrodes. Such replacement of dielectric rubber layers separating sheath electrodes with an elastomeric ionically conducting gel results in an electrochemical supercapacitor, which can provide much higher capacitance than a dielectric capacitor.

While the elastic core of the sheath-core fiber is most preferably one having a circular or quasi-circular cross-section, other fiber cross-section geometries can be usefully deployed. Additionally, the fiber core can comprise other materials or void space. For example the fiber core can be a hollow rubber tube or a hollow rubber tube filled with an ionically conducting liquid or gel, a dielectric liquid, a liquid metal alloy, or combinations thereof. A liquid metal alloy inside a hollow rubber tube has been used [S Zhu 2013] to make elastomeric wires, which unfortunately provide a very low quality factor, since fiber elongation increases fiber resistance because of both the increasing length and decreasing cross-sectional area of the metal alloy. However, when used in conjunction with the buckled sheaths of present invention embodiments, the metal-alloy-containing rubber core can be used as a resistance-based sensor of fiber elongation, an inner electrode for a sheath-core fiber capacitor (in which the elastomeric tube is a dielectric, or to provide an electronic pathway that can be used in parallel (or independently) of the electronic pathway provided by one or more electronically conducting nanofiber sheaths.

Whether or not the optionally present void volume within the elastomeric core of the sheath-core fiber is filled with other materials, this void volume can have various topologies, such as comprising a parallel assembly of void channels (such as more than one cylindrical channel). Well known melt spinning or coagulation-based spinning processes from appropriately designed spinnerets can be used to provide arbitrarily shaped fiber cores and void channels within these cores, which can be filled with guest materials during the spinning process.

Conducting fibers of invention embodiments can contain one electronically conducting nanofiber sheath, two electronically conducting nanofiber sheaths, or more than two electronically conducting nanofiber sheaths, and well as sheaths that are not electronically conducting. One important case is where the sheath-core fiber contains more than two conducting nanofiber sheaths, wherein each nanofiber sheath serves as a capacitor electrode (since neighboring nanofiber sheaths are separated by a dielectric coating from adjacent nanofiber sheaths). The benefit here is that the capacitance of the sheath-core fiber can be increased by connecting adjacent dielectric-separated sheaths to positive and negative voltages and non-adjacent sheaths to the same voltage, so that the sheath array functions as capacitors that are in parallel. Such arrangement increases the charge storage capacity of the sheath-core fiber for a given inter-electrode applied potential. For actuator applications, these capacitors will mechanically act in parallel to increase the actuator stroke that is obtained for a given applied voltage (corresponding to the potential difference of the negative and positive voltages).

In embodiments of the present invention, Applicant replaced the frequently used laminate of a carbon nanotube (CNT) sheet on a stretched rubber sheet with a multilayer CNT sheath on a rubber fiber core [M Zhang 2005; Liu 2015 *Supplemental Materials*], and enabled additional functions by including other rubber and CNT sheath layers. The conducting sheaths were derived from highly-oriented carbon multiwall nanotube aerogel sheets, which are drawn from CNT forests [Liu 2015 *Supplemental Materials*]. Three basic configurations were deployed: $NTS_m$@fiber, rubber@$NTS_m$@fiber, and $NTS_n$@rubber@$NTS_m$@fiber. $NTS_m$@fiber denotes that m carbon nanotube sheet (NTS) layers were deposited on top of a rubber fiber core, rubber@$NTS_m$@fiber is a rubber-coated $NTS_m$@fiber, and $NTS_n$@rubber@$NTS_m$@fiber indicates an $NTS_n$ sheath on a rubber@$NTS_m$@fiber core. However, it should be understood that the described fabrication method can usefully be extended for particular applications by the addition of one or more additional rubber sheaths and/or nanofiber sheaths.

The rubber fiber core 101 was highly stretched (typically to 1400% strain) during the wrapping of NTS layers 103 around the stretched rubber fiber core 101 and the carbon nanotube orientation was preferably parallel to the rubber fiber direction (FIG. 1A). When the stretched fiber core 101 is released from stretching (to form an $NTS_m$@fiber 104), this results in NTS layers 103 wrapped around rubber fiber core 101 (with circular arrow 103 indicating the belt direction). For preparation of rubber@NTS$_m$@fiber, the outermost rubber coating was applied while the rubber core was fully stretched, while for preparation of NTS$_n$@rubber@NTS$_m$@fiber, the thicker rubber layer used as a dielectric was deposited on an NTS$_m$@fiber when the NTS$_m$@fiber was not stretched.

Various methods can be used for wrapping nanofiber sheets around a rubber core. In the process shown in FIGS. 2A-2B, opposite ends of a rubber fiber 101 were attached between the shafts of two motors 201 and then the rubber fiber core 101 was highly stretched. Unless otherwise indicated, this original strain (called the fabrication strain) was 1400%. Freestanding nanotube sheet 102 was supported on a U-shaped frame 204 that was mounted on a translation stage 203. To attach the NTS 102 onto the rubber fiber 101, the two motors 201 synchronously rotated (in direction 202) the stretched rubber fiber 101, so no net twist was introduced. The NTS 102 was brought into contact with the rotating rubber fiber 101, so that it was wrapped onto the fiber 101, like a jelly roll. Importantly, the alignment direction of the carbon nanotubes in NTS 102 was in the axial direction of the rubber fiber 101.

After completion of wrapping, where the number of NTS layers m was controlled by counting the number of turns of the rubber fiber 101, ethanol (98%) was used to densify the NTSs 102 onto the rubber fiber 101. After drying in air, the stretched rubber fiber 101 was slowly released to form the non-stretched NTS$_m$@fiber. A rubber@NTS$_m$@fiber was obtained by spray-coating a 6-µm-thick layer of rubber (5 wt % plasticized SEBS in cyclohexane) while the NTS$_m$@fiber was in the fully stretched state. Then the fiber was first allowed to dry in air and then slowly released to its relaxed length. Unless otherwise indicated, all stresses and strains mentioned are engineering values.

This parallel orientation of CNT fibers and rubber core, the giant strain applied during sheath wrapping, and the use of large m, resulted in the observed hierarchical, two-dimensional buckling and corresponding high performance. The rubber core and rubber layers separating nanotube sheets were a styrene-(ethylene-butylene)-styrene (SEBS) copolymer containing a plasticizer (ExxonMobil, Marcol 82) [Liu 2015 *Supplemental Materials*] and the diameter of the non-strained rubber fiber was typically 2 mm, which reduced to 0.52 mm at 1400% strain [Liu 2015 *Supplemental Materials*].

The carbon nanotube aerogel sheet or sheet stack was densified after wrapping around the rubber core by using surface tension effects due to the process of liquid infiltration and subsequent liquid evaporation. This or alternative densification processes need not be deployed for the wrapping of nanofiber sheets around the rubber core if the wrapped sheet is already dense before wrapping and if this sheet strongly adheres to the wrapped core.

Figure 3A:
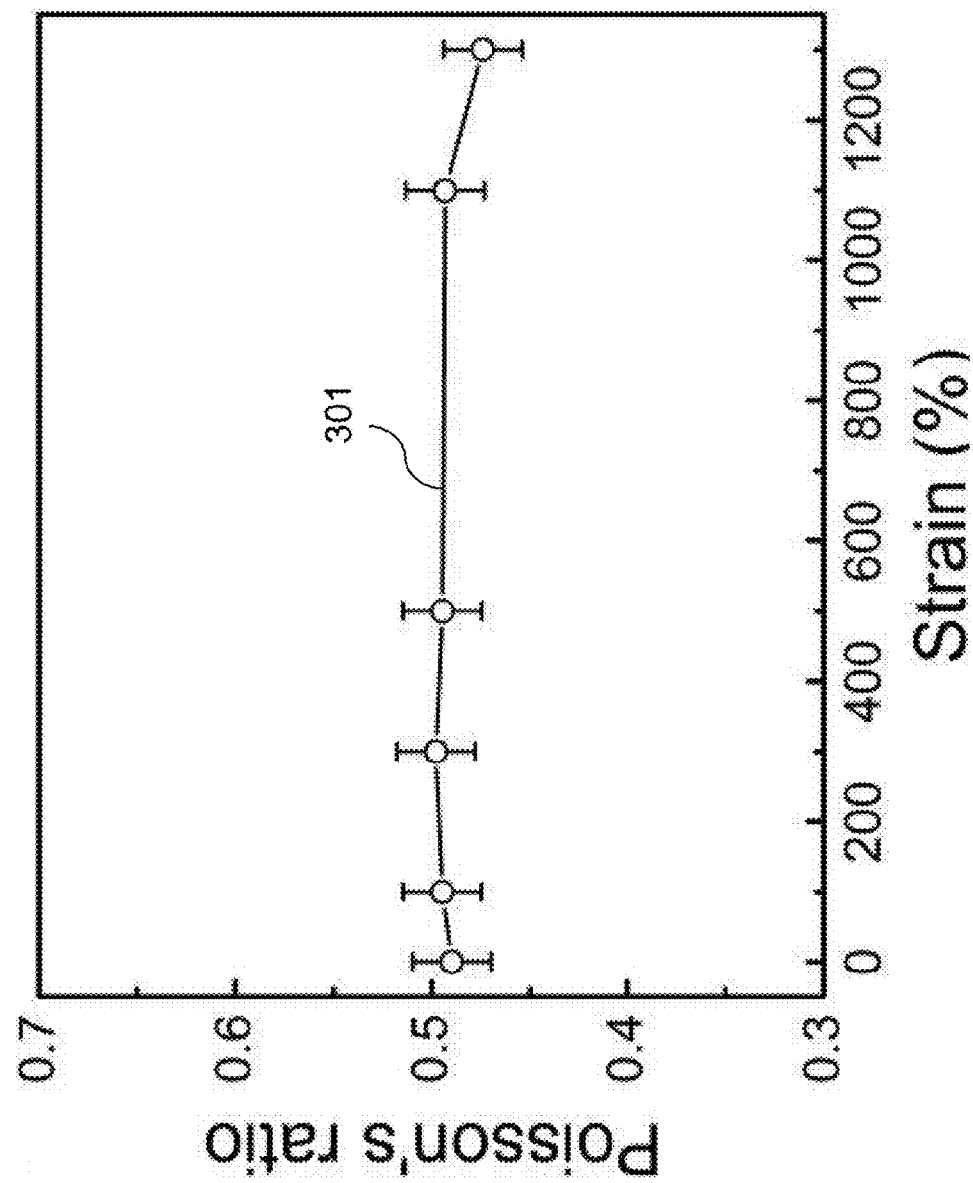
FIG. 3A is a graph that shows the dependence of the Poisson's ratio of an SEBS fiber on applied strain. The Poisson's ratio was ~0.5 from 0% to 1300% strain, indicating that fiber volume is conserved as the SEBS fiber is stretched over this large strain range.
Figure 3B:
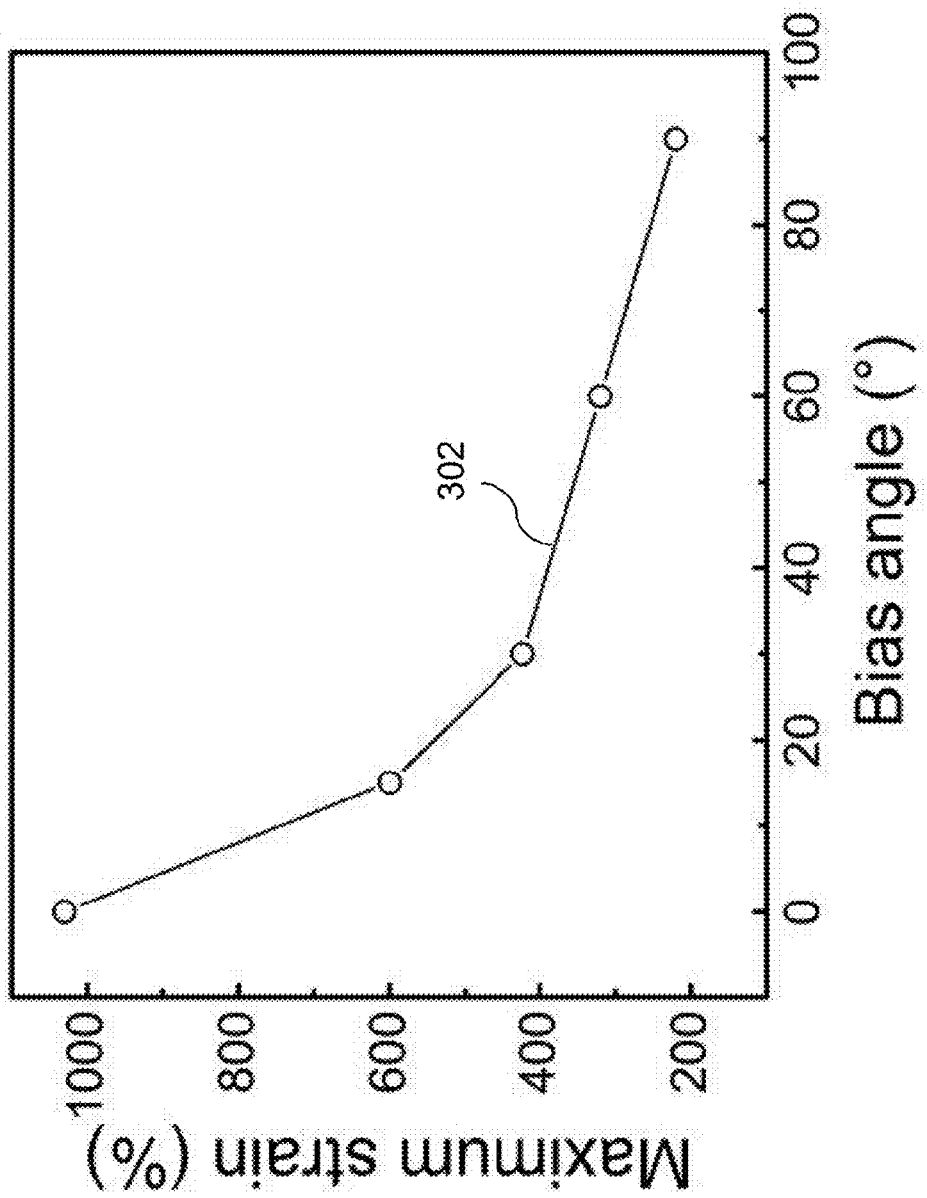
FIG. 3B is a graph that shows the effect of NTS wrapping angle (called the bias angle, which is the angle between the CNT orientation direction and the axial direction of the rubber core) on the maximum realized strain range for $NTS_{80}$@fibers over which fibers could be stretched without irreversibly degrading fiber conductance. The rubber core was stretched 1400% during wrapping of the rubber sheath, so 1400% was the fabrication strain.

Since the rubber fiber core must increase diameter (and circumference) as it relaxes from the maximum fiber stretch (fiber volume is conserved as shown in curve 301 of FIG. 3A), it was observed that the realizable elastic deformation range decreased with increasing m for the NTS$_m$@fiber. Even though the CNT sheets were highly anisotropic, having lower modulus in the belt direction of the CNT sheath, this low modulus and the bending modulus of the nanofibers were sufficient to limit the elastic range for the sheath-core fiber when m is large. As shown by the experimental results in curve 302 of FIG. 3B, the elastic range dramatically decreased when the nanotube orientation had a non-zero bias angle with respect to the fiber axis.

Figure 1B:
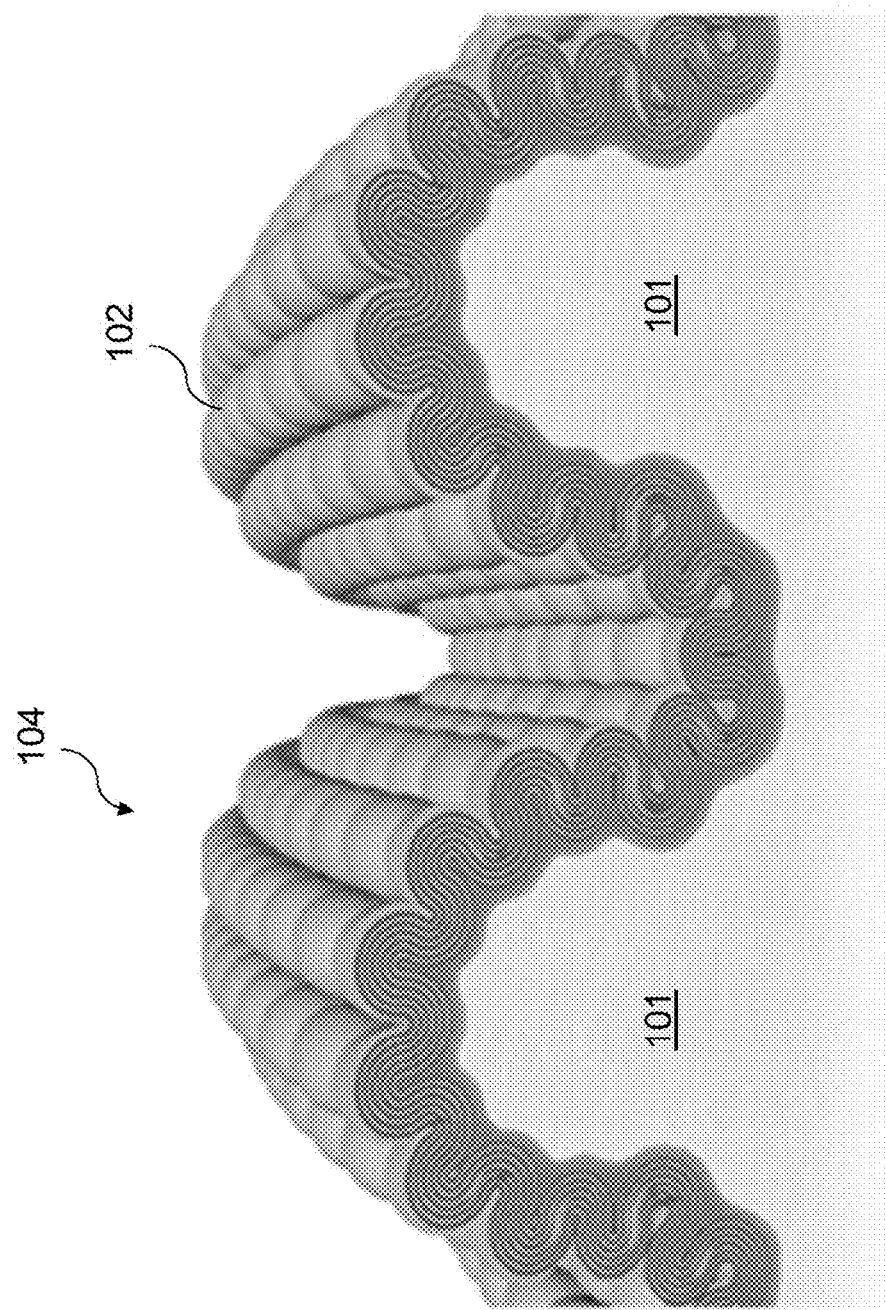

Applicant observed periodic hierarchical buckling in two dimensions for NTS$_m$@fibers when m is larger than 10 and the fabrication strain $\varepsilon_{fab}$ (i.e., the strain applied to the rubber fiber core during wrapping CNT sheaths) was large (typically 1400%). This hierarchical buckling in two dimensions (schematically illustrated in FIG. 1B) is important for maximizing properties for the sheath-core fibers of the present invention, and has not been reported for previously investigated laminated structures of any type.

Figure 1C:
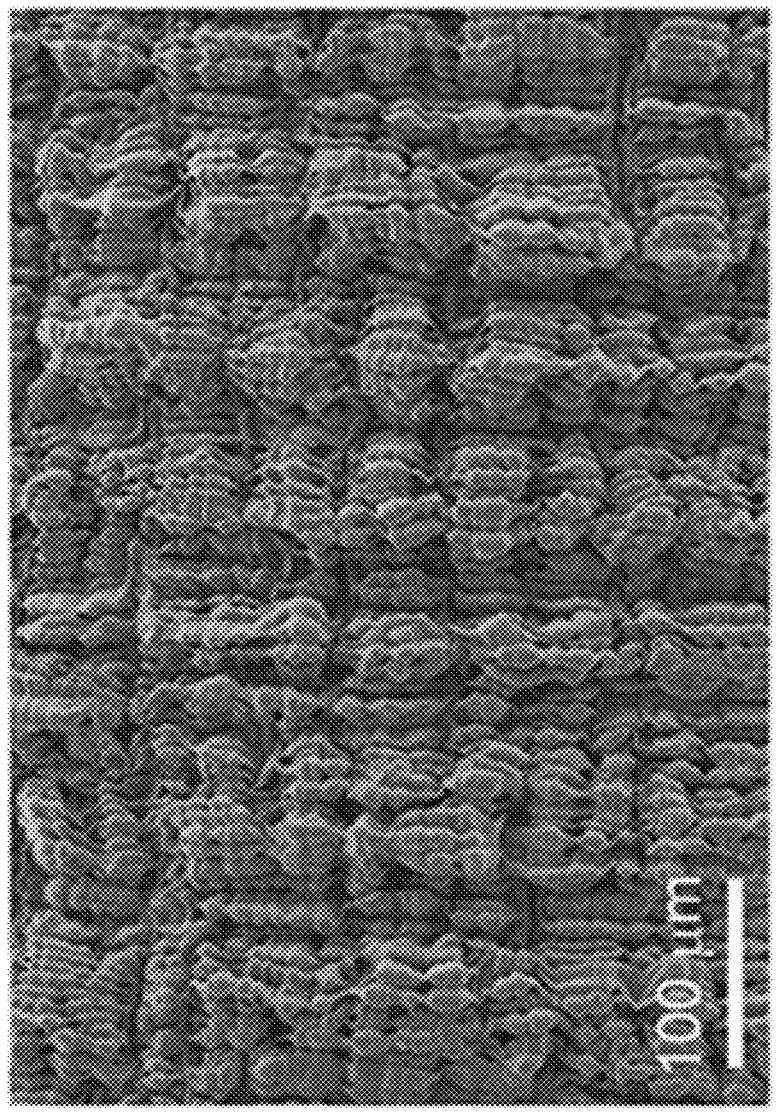
Figure 1D:
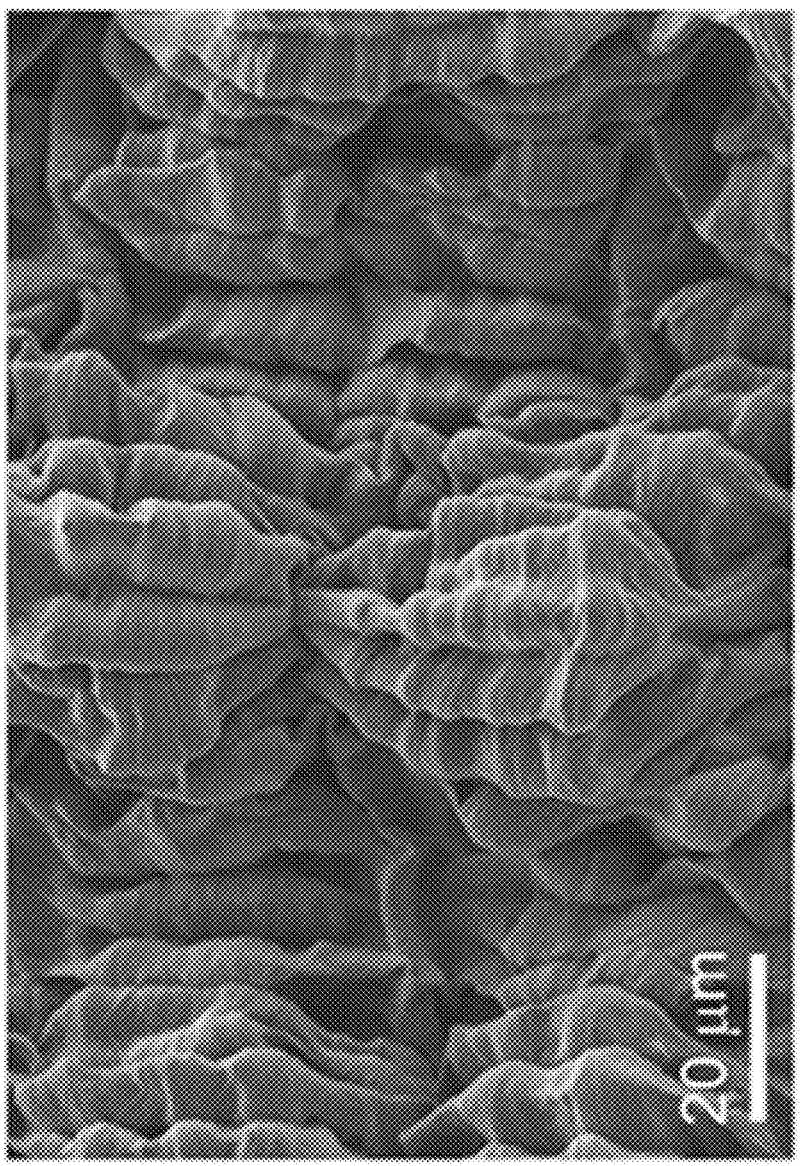

Scanning electron microscope (SEM) images (FIGS. 1C-1D) showed an elongation (100%) for which short and long buckling periods were simultaneously observed for the fiber axial direction (at ~8 µm and ~35 µm, respectively) and the fiber belt direction (at ~8.5 µm and ~51 µm, respectively). Unless otherwise indicated, such as by using the term "fabrication strain," mentioned strains are with respect to the relaxed state of the sheath-core structure, rather than with respect to the relaxed state of the sheath-free core. Also, structure and properties characterizations are for conducting elastomer fibers that have been conditioned by applying about five stretch-release cycles to the maximum strain that does not plastically stretch the NTSs in the sheet alignment direction. This conditioning is useful, since the two-dimensionally buckled structure appeared during the first cycle, and thereafter slightly evolved over the next few cycles, as indicated by an about 10% or smaller permanent increase in the resistance of the strain-released state.

The reversible buckling for fiber axial and belt directions were out-of-phase, as is illustrated by the SEM images of FIGS. 15A-15D for an NTS$_{92}$@fiber, which can be reversibly elongated 1000%. Long-period buckling along the fiber axis was seen at 0% strain (where short-period axial buckles existed, but were squeezed together), and at 200% strain the axial short-period buckles were pulled apart. The long-period axial buckles disappeared at 400% strain and the short-period axial buckles disappeared near 1000% strain. There was no buckling in the belt direction at 0% strain, and long-period buckling in the belt direction appeared between 200% and 400% strain, becoming more pronounced at higher strains. During strain release (from 1000% strain), these out-of-phase buckling processes in axial and belt directions reversed without noticeable hysteresis.

Figure 12:
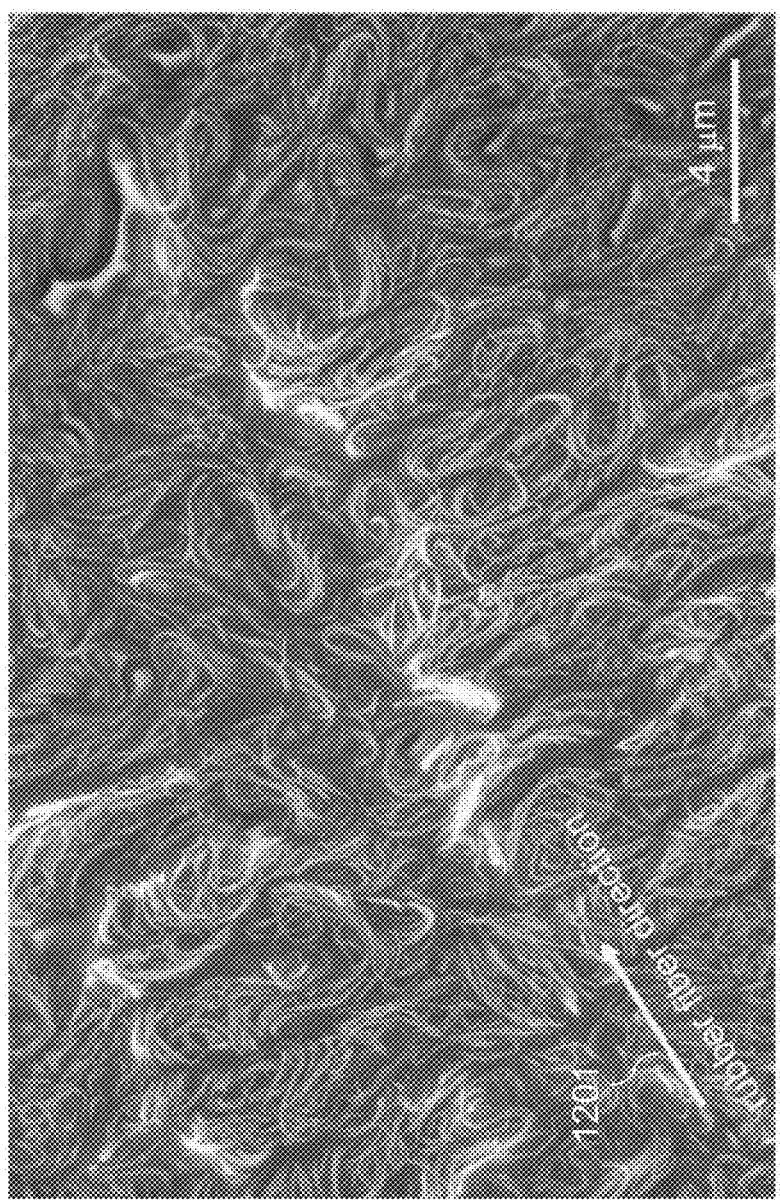
FIG. 12 is an SEM image of an NTS$_1$@fiber at 0% strain, when using a fabrication strain of 1400%. The MWNTs form a chaotic, in-plane buckled structure in which the MWNTs remain in close contact with the elastomer surface.
Figure 13A:
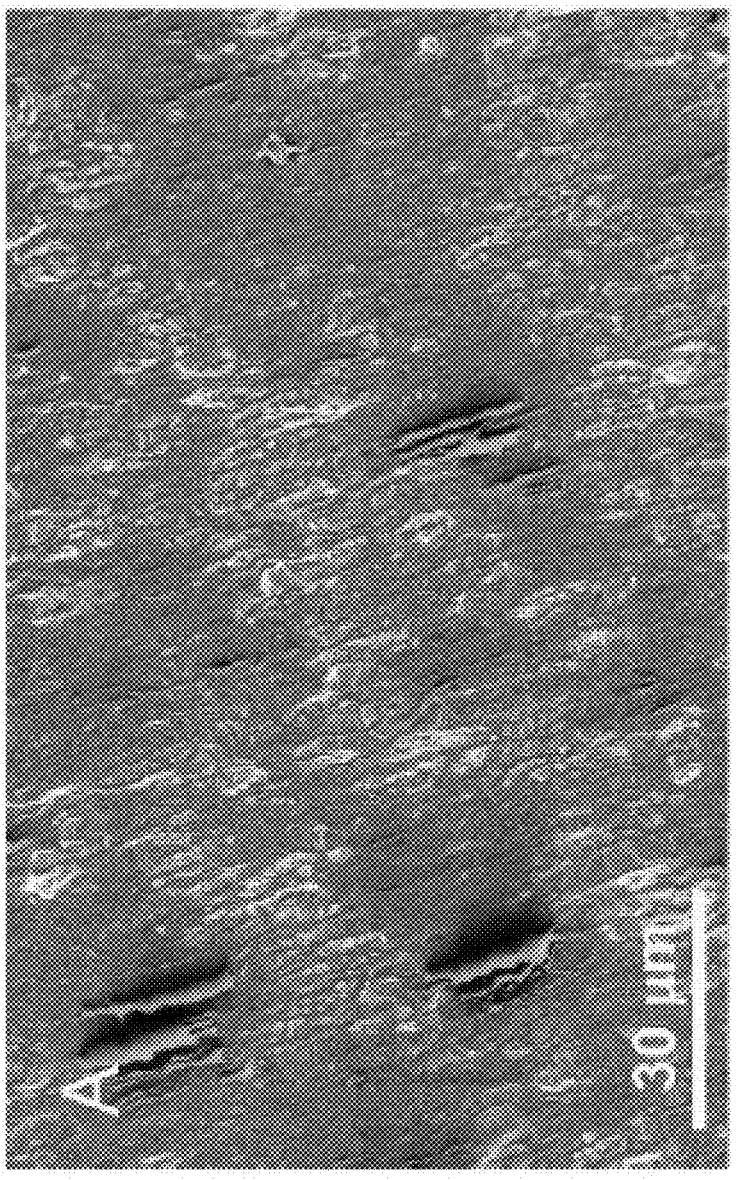
FIGS. 13A-13E are SEM images showing the surface of an NTS$_m$@fiber with (FIG. 13A) 1 layer, (FIG. 13B) 2 layers, (FIG. 13C) 5 layers, (FIG. 13D) 10 layers, and (FIG. 13E) 100 layers of NTSs. The horizontal direction is the axial direction of the fiber. The fabrication strain was 1200%, and the images were taken at 0% strain. As the number of layers increases, the buckled structure forms and the period of short-period buckling increases. The short-period and long-period axial buckles are marked by white arrows 1301 and 1302, respectively, in FIG. 13E, where these axial buckles are most clearly seen.
Figure 13B:
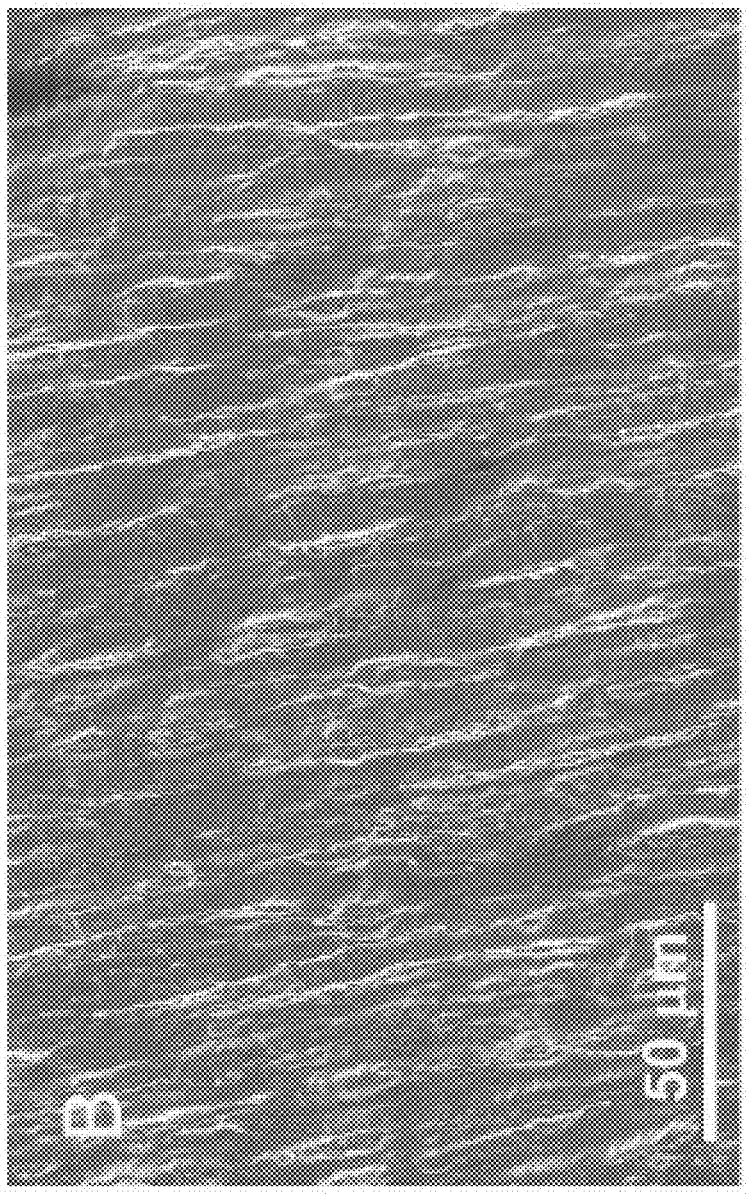
Figure 13C:
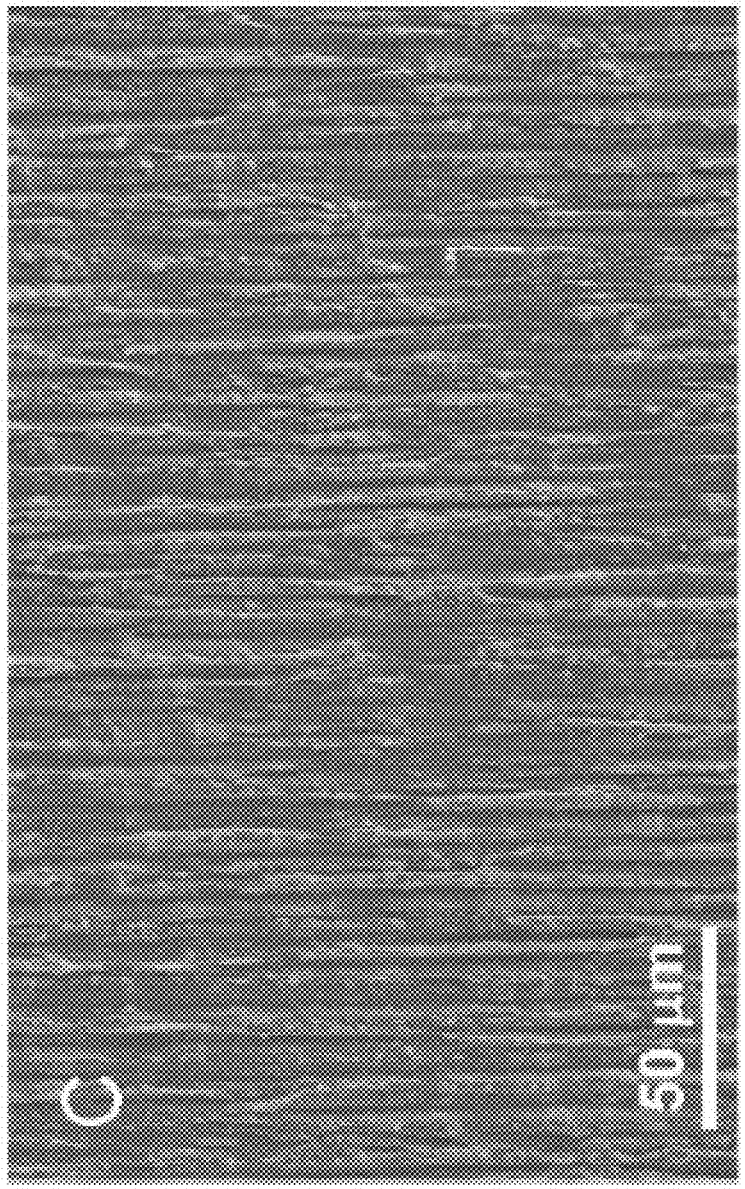
Figure 13D:
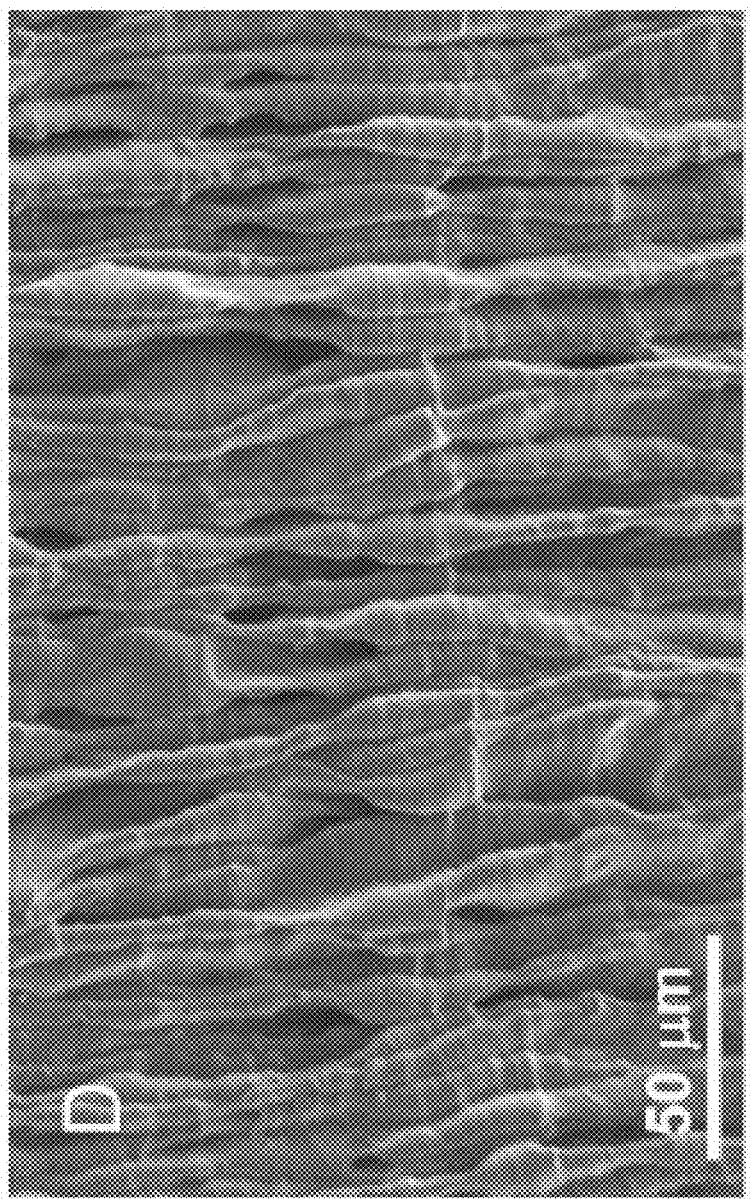
Figure 13E:
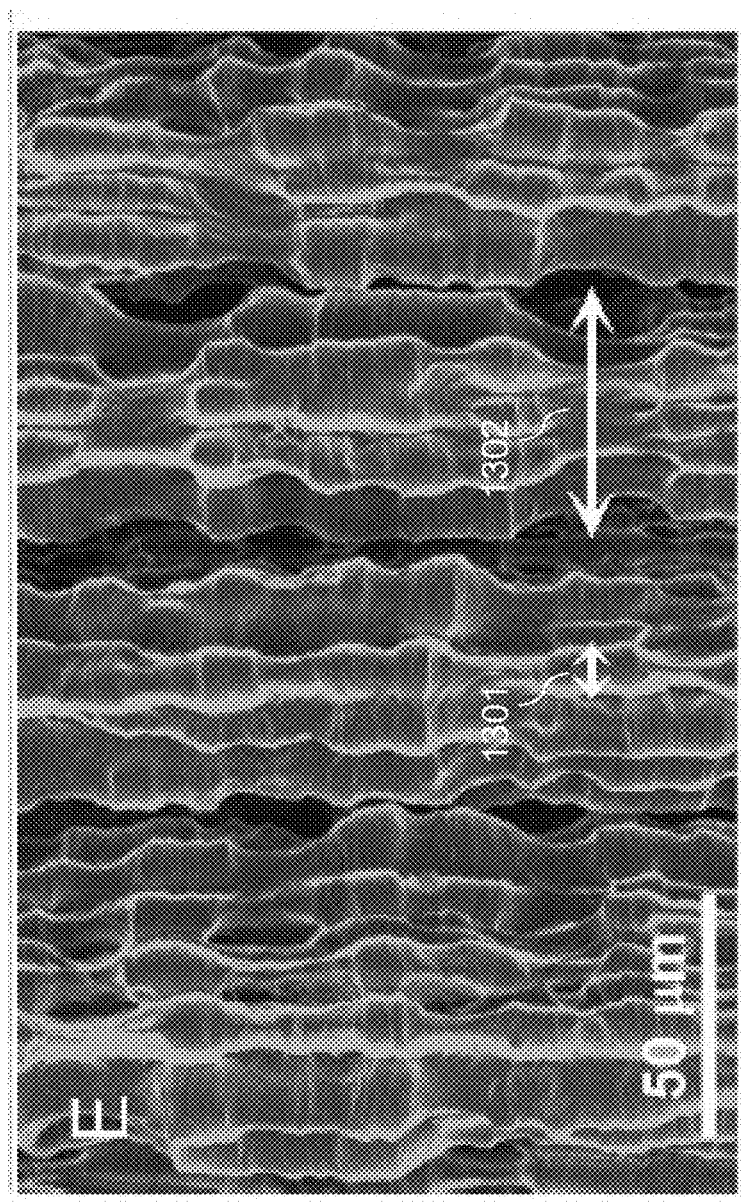

While the emergence of these different types of buckling and their corresponding periods for an NTS$_m$@fiber depended upon m and the fabrication strain, the out-of-phase behavior for axial and belt buckling and the order in which short-period and long-period axial buckling occurred was a general phenomenon for the sheath-core elastomeric fibers of the present invention. As the fabrication strain or m decreased, the long-period buckling in axial and belt directions disappeared, and then all out-of-plane buckling disappeared (FIGS. 13A-13E and FIGS. 16A-16F). For about five NTS layers and 1200% fabrication strain, only short-period axial buckles were observed. Long-period axial buckling appeared when m and the fabrication strain were large. Using a single sheet layer for the sheath resulted in only in-plane buckling (along the axial direction 1201) for fabrication strains up to the maximum investigated 1400% (FIG. 12).

The explanation for this out-of-phase behavior for axial and belt directions is found in the out-of-phase relationship between rubber fiber elongations in these directions, which results from the large positive Poisson's ratio of the rubber. Consequently, relaxation of tensile strain from the fabrication strain quasi-plastically elongated the CNT sheath in the belt direction during the first contraction, causing periodic necking. Subsequent stretch of the rubber fiber caused the elongated sheath to buckle in the belt direction at locations of the previously formed periodic-necking. During subsequent stretch-release cycles, this dependence of structure on strain was reversibly retained.

Figure 11:
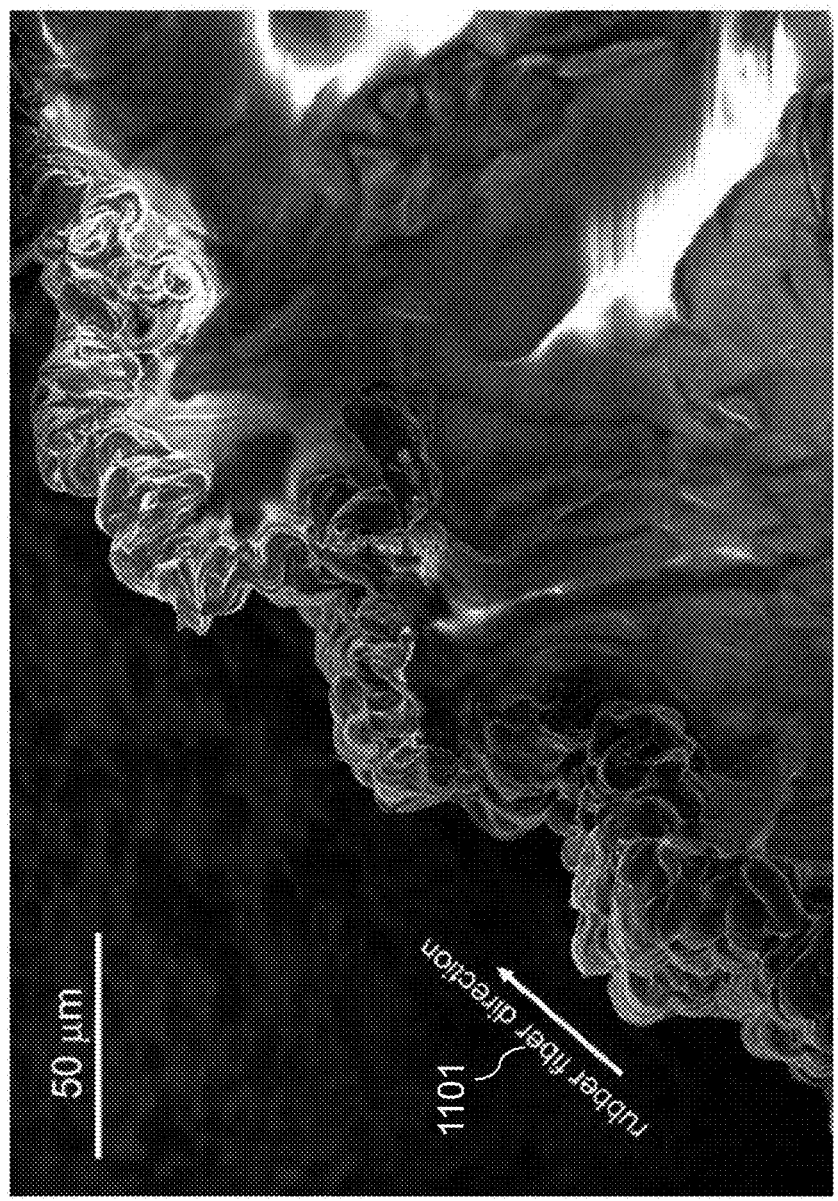
FIG. 11 is an SEM image showing the NTS$_{180}$@fiber's cross-section along the fiber axis, taken at 0% strain (the fabrication strain was 900%). The SEM image indicates that along the axial direction 1101, the short-period axial buckles partially delaminate from the rubber fiber, while the long-period axial buckles remain in contact with the rubber.

A cross-sectional SEM image shows that along the axial direction 1101, the short-period axial buckles partially delaminate from the rubber fiber when strain is released, while the long-period axial buckles remain in contact with the rubber core (FIG. 11). This delamination disappears when the sheath-core fiber is restretched, so structure and properties are highly reversible.

Figure 4A:
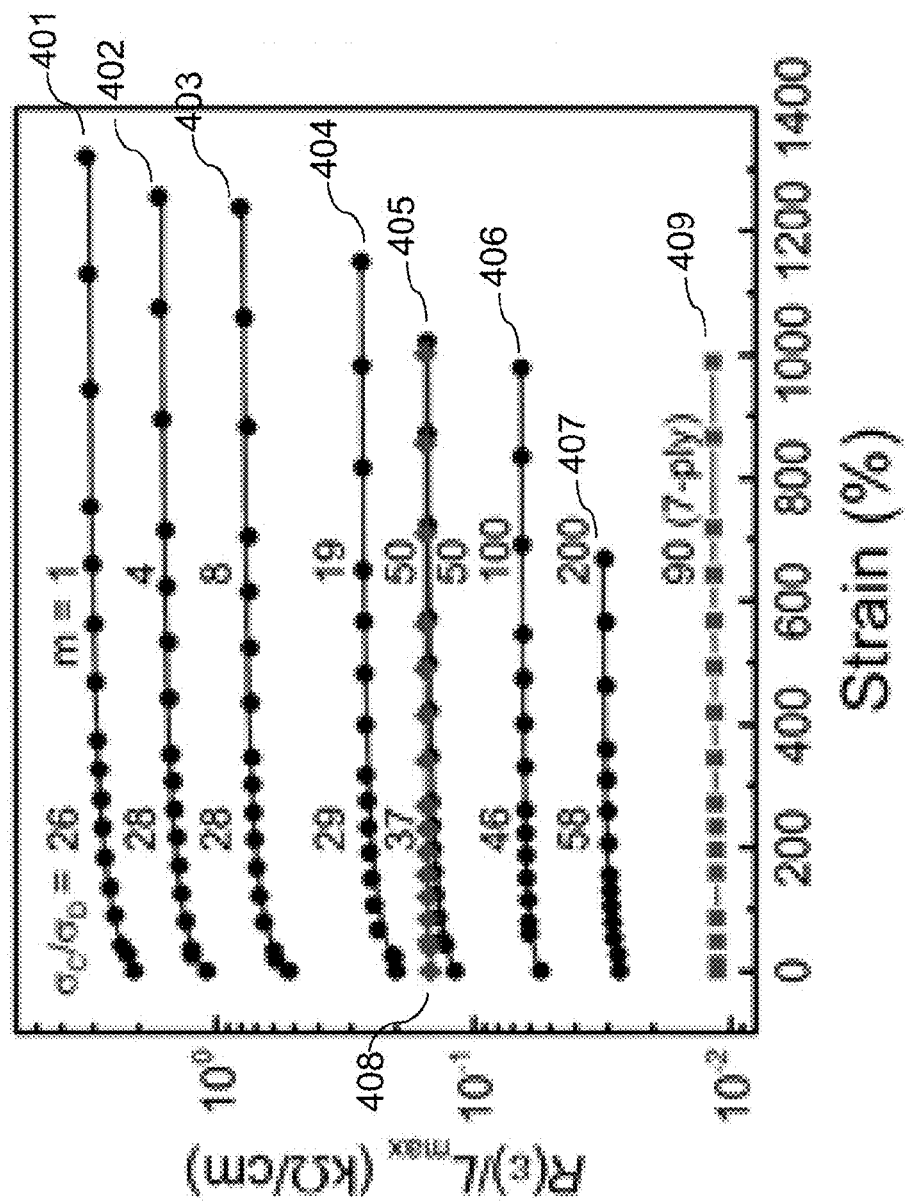
FIGS. 4A-4C show the strain dependence of electrical properties for sheath-core fibers of the present invention.

The Electrical Properties of Super-Elastic Nanofiber-Sheath/Rubber-Core Conducting Fibers FIG. 4A shows the dependence of $R(\varepsilon)/L_{max}$ on tensile strain ($\varepsilon$) for sheath-core $NTS_m$@fibers, where $R(\varepsilon)$ is the resistance of a fiber having a maximum stretched length of $L_{max}=L_{fab}$, and where $L_{fab}$ is the stretched length (corresponding to the fabrication strain) used for sheath wrapping. Reflecting the constraint on fiber belt expansion provided by the $NTS_m$ sheath during fiber contraction, the length of the unloaded sheath-core fiber ($L_{min}$) was longer than the starting sheath-free rubber fiber. Hence, the available strain range ($\varepsilon_{max}$) was smaller than the fabrication strain and decreases with increasing m (inset 418 of FIG. 4B).

Figure 4B:
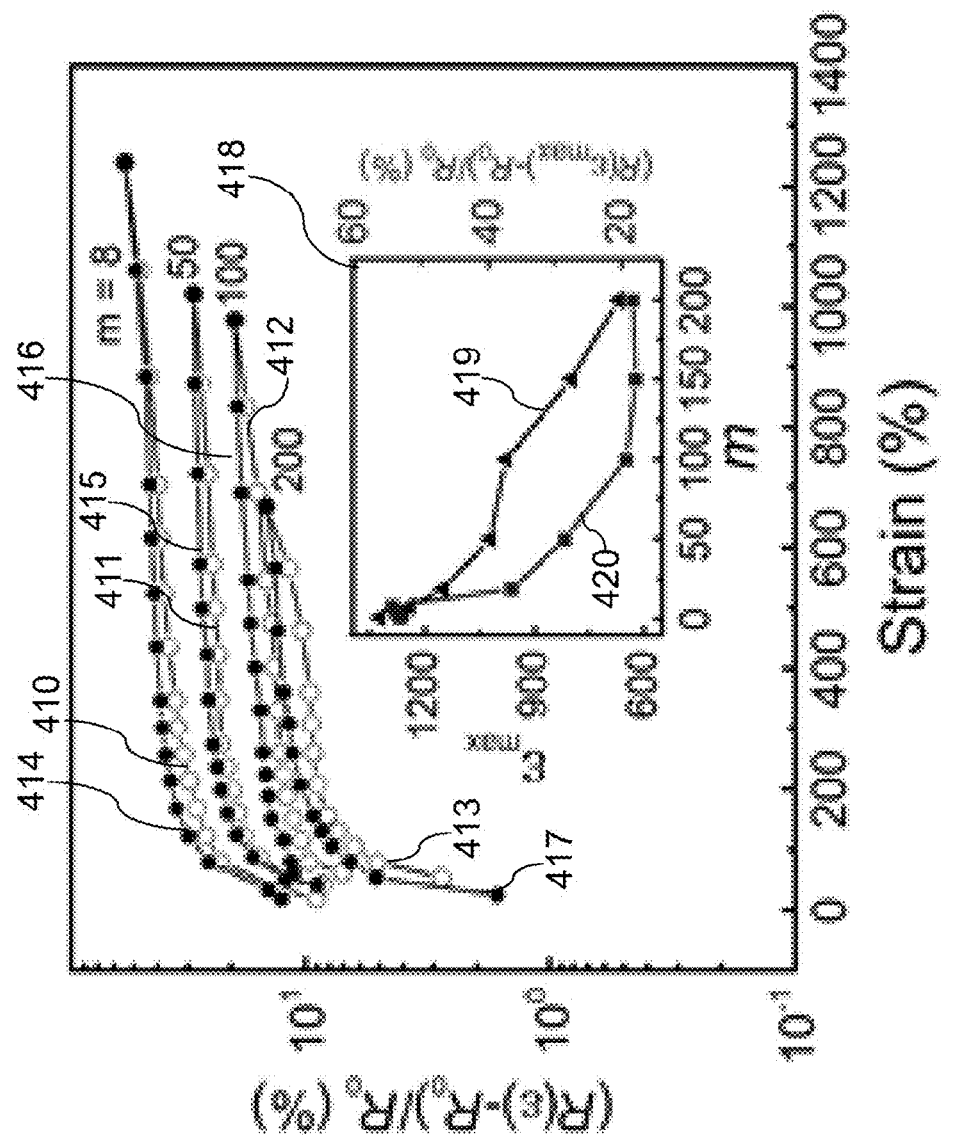

FIG. 4B shows the strain dependence of $(R(\varepsilon)-R_0)/R_0$, where $R_0$ is the resistance at 0% strain. Although applying m=1 resulted in reversible performance to a remarkably high strain (1320%), these results (inset 418 of FIG. 4B) showed that the maximum percent resistance change over this strain range, $\Delta R_{max}/R_0=(R(\varepsilon_{max})-R_0)/R_0$, decreased with increasing m (from 53% for m=1 to 18% for m=200). The corresponding values of $R_0/L_{max}$ decreased monotonically from 2.1 kΩ/cm for m=1 to 26.1 Ω/cm for m=200.

The increased $\Delta R_{max}/R_0$ for low m is explained by the effect of sheath thickness on the period of axial short-period buckling. For low m, the period of short-range buckling decreased with decreasing strain until adjacent buckles laterally contact. This contact provided a new transport path for electric current, which was orthogonal to the local CNT orientation (which largely followed the buckles). Hence, when m is low, this pathway decreases fiber resistance compared with that for higher strain states where buckles do not contact. To validate this, a resistor network model was developed that agreed with the measured data (FIG. 4A), despite the limited experimental information on structural evolution during buckle contact. Correlation of electrical transport data and SEM images as a function of strain (FIGS. 7A-7B and FIGS. 15A-15D) indicated that the strain below which $R(\varepsilon)$ deviates from $R(\varepsilon_{fab})$ corresponded to the strain at which buckles start contacting.

The measured increase in conductance due to contacting buckles, which occurs precipitously at small strain, was appreciable (37% for the sheath-core fiber with m=19, which contracts 1200%). This sizable effect arose, despite the fact that the ratio of sheet conductivity in the nanotube direction to that for the orthogonal direction for densified as-drawn sheets was about 10-20, and this ratio for non-densified sheets was 50-70 [M Zhang 2005], since the contacting area of buckle sidewalls was large compared with the cross-sectional area of the conducting pathway before buckles contact.

To avoid resistance changes resulting from buckle contact at low strains, Applicant overcoated a fully stretched $NTS_m$@fiber conductor with a ~6 μm thick layer of SEBS and thereby reduced resistance change to 4.5% for application of 1000% strain to a rubber@$NTS_{50}$@fiber (FIG. 4A). For comparison, an $NTS_{50}$@fiber provided a 28% change in resistance over the same strain range.

Figure 4C:
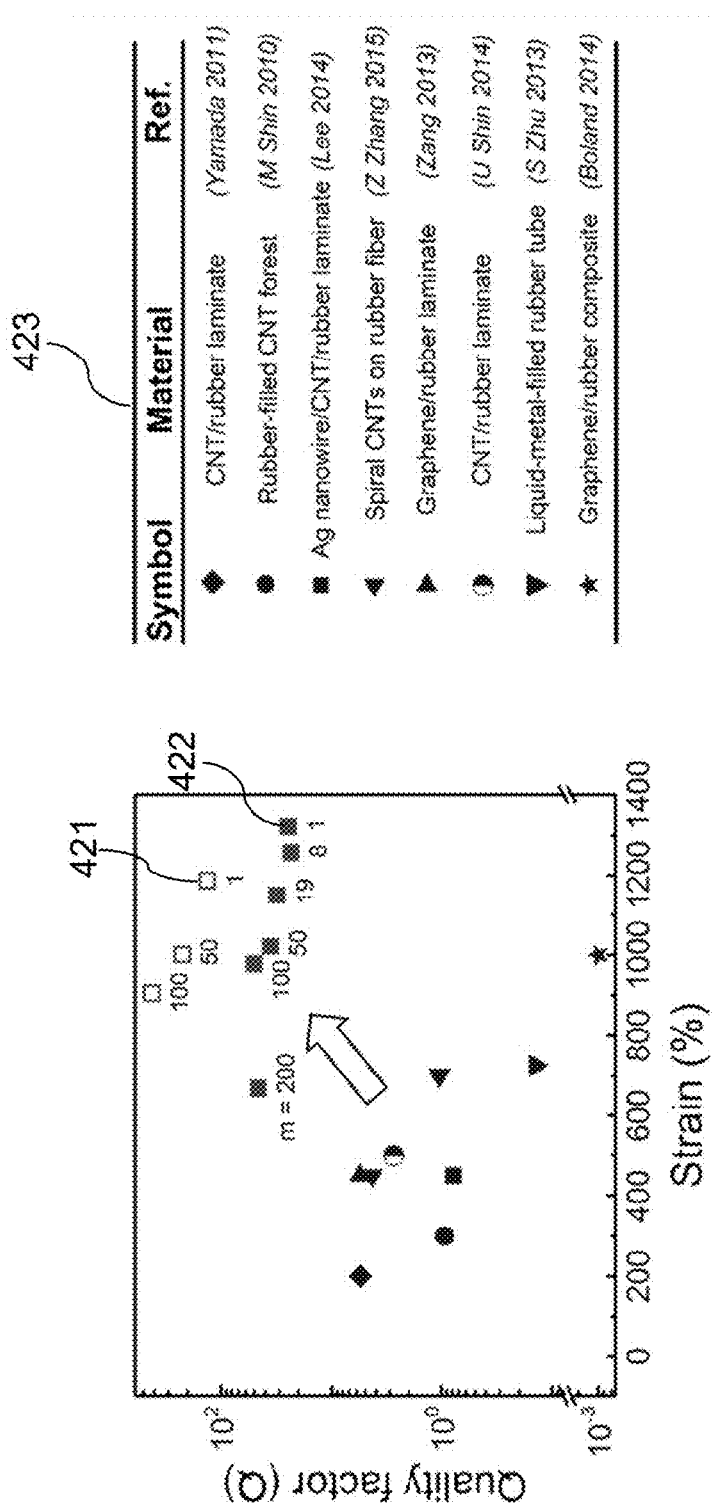

The results in FIG. 4C show that the demonstrated elastic range for reversible performance as a straight conducting fiber was much higher than previously realized for non-coiled elastomeric conducting fibers and continuous conducting coatings on elastomeric sheets and fibers. The quality factor Q that has been demonstrated for a non-coiled sheath-core fiber was 75 times higher than previously obtained for any of the above types of elastomeric conductors having a strain range above 450%. For $NTS_m$@fiber conductors (FIG. 4C), Q monotonically increased from 25 to 50 as the number of NTS layers increased from 1 to 100, and then remained essentially constant for up to 200 NTS layers. Adding a thin outer layer of rubber to $NTS_{100}$@fiber, to prohibit inter-buckle electrical contact between nanotubes during contraction, increased Q from 50 to 421 (corresponding to 2.15% resistance change for 905% elongation).

Figure 5A:
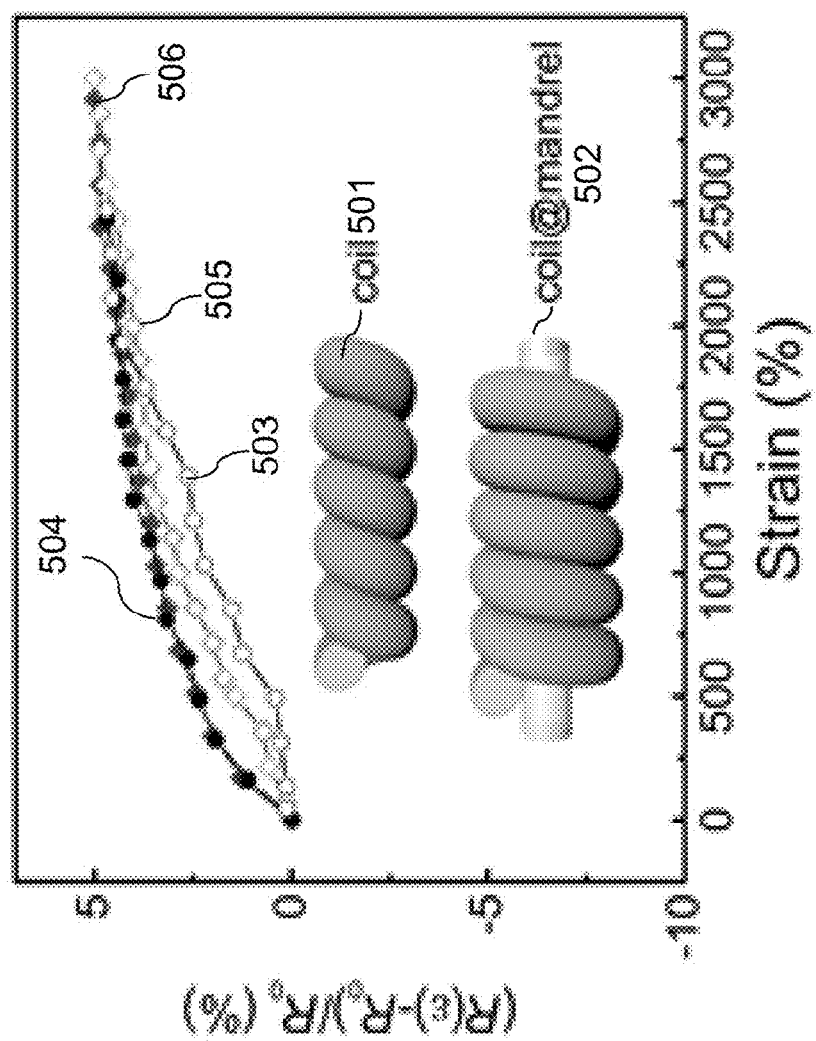
FIGS. 5A-5B show electromechanical response of coiled sheath-core fibers of the present invention.
Figure 10A:
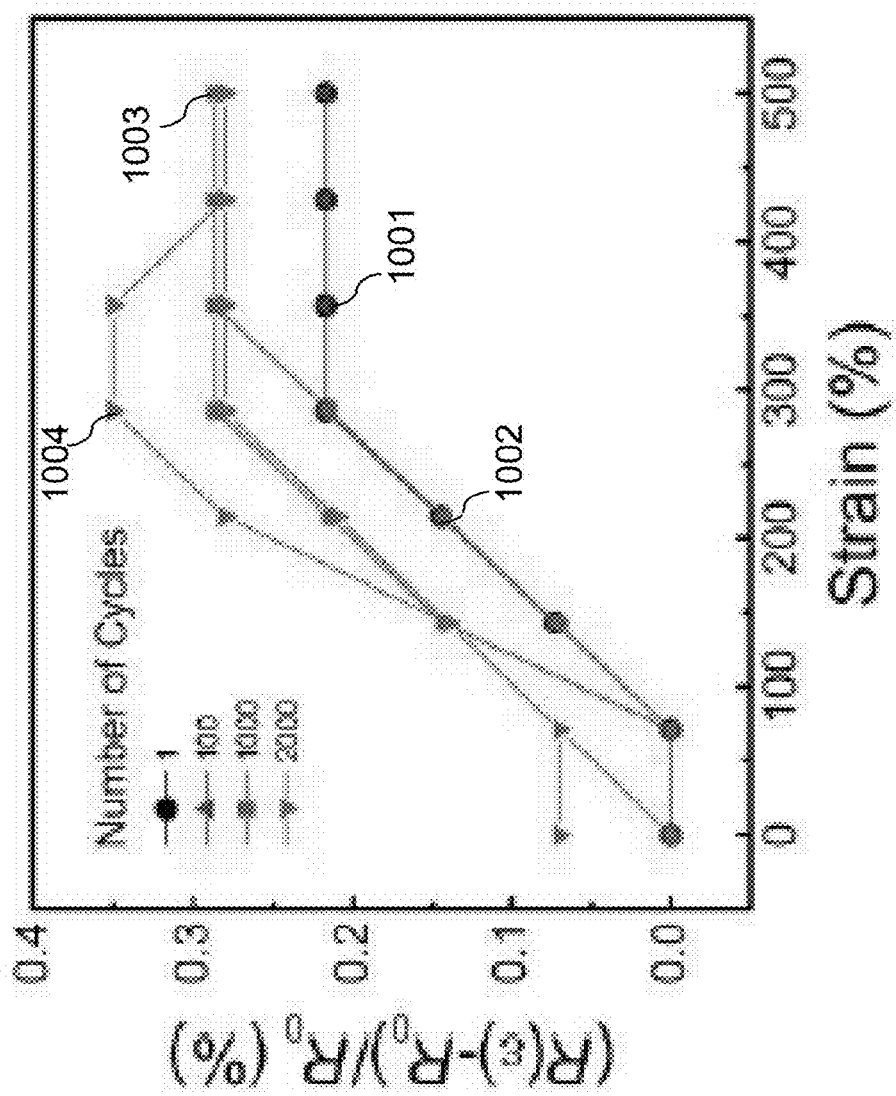
FIG. 10A is a graph that shows the percent resistance change as a function of strain over 2000 strain cycles for a rubber@NTS$_{15}$@fiber (after initial training cycles), where R$_0$ is the resistance of a non-elongated, non-twisted fiber. Circle points 1001, triangle points 1002, square points 1003, and upside down triangle points 1004 correspond to 1, 100, 1000, and 2000 strain cycles, respectively.
Figure 10B:
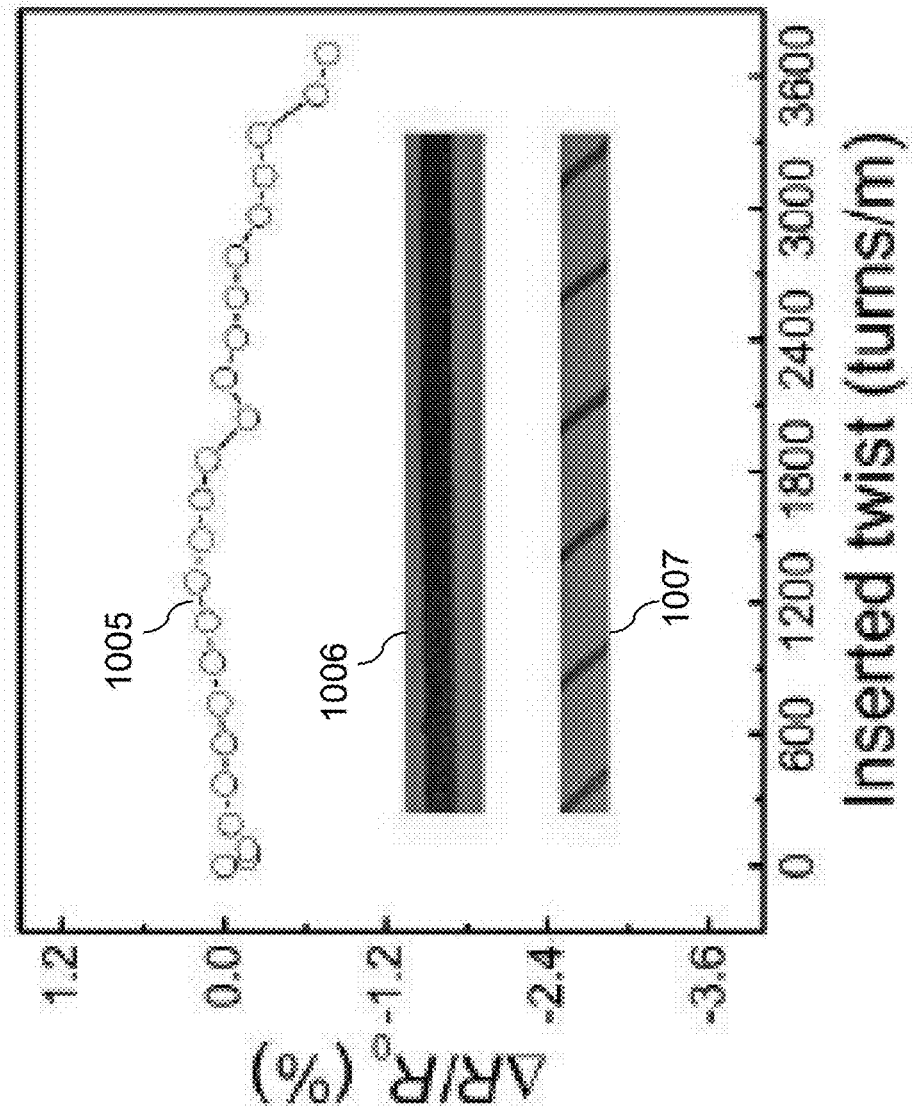
FIG. 10B is a graph that shows ΔR/R$_0$ as a function of inserted twist (curve 1005) for a 1.7-mm-diameter rubber@NTS$_{50}$@fiber that was twisted under 37.1 kPa tensile load. The insets of FIG. 10B provide pictures of the transformation of a straight ink-drawn line 1006 into a helix 1007 as a result of inserting 667 turns/m into a 2-mm-diameter rubber fiber.
Figure 10C:
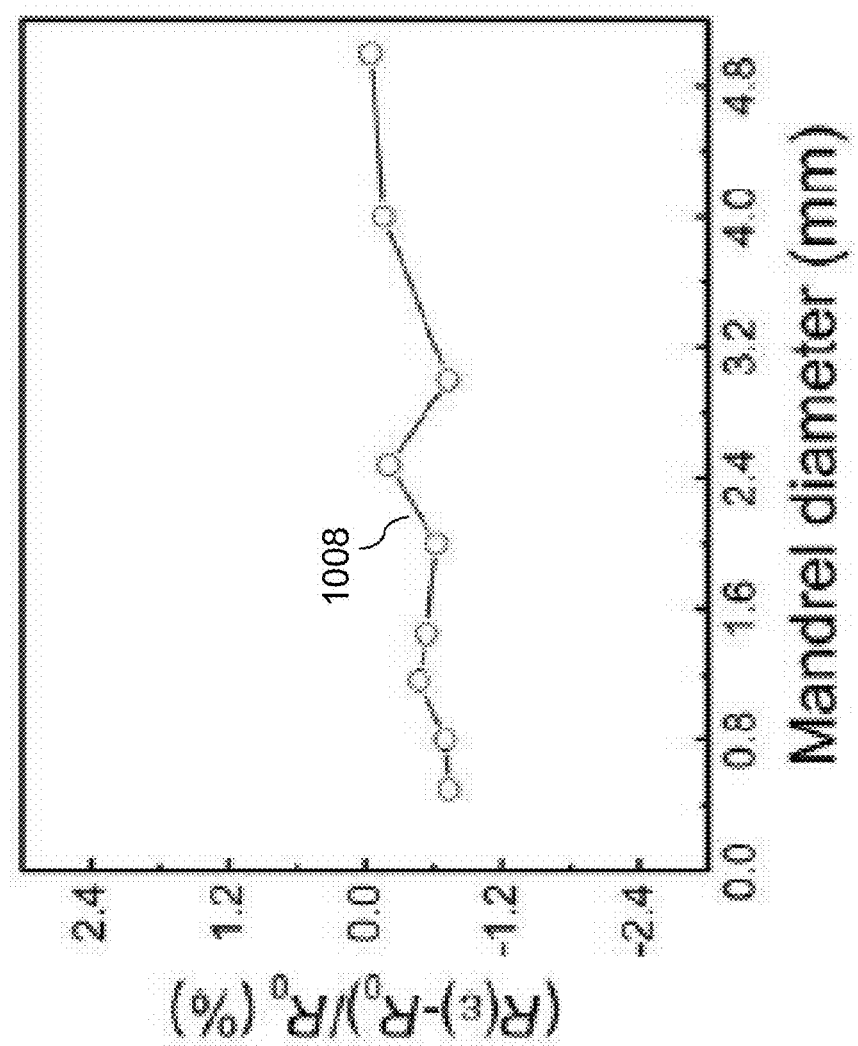
FIG. 10C is a graph (that shows the percent resistance change as a function of mandrel diameter curve 1008) for a 1.5-mm-diameter rubber@NTS$_{200}$@fiber that has been coiled around a rigid mandrel.
Figure 10D:
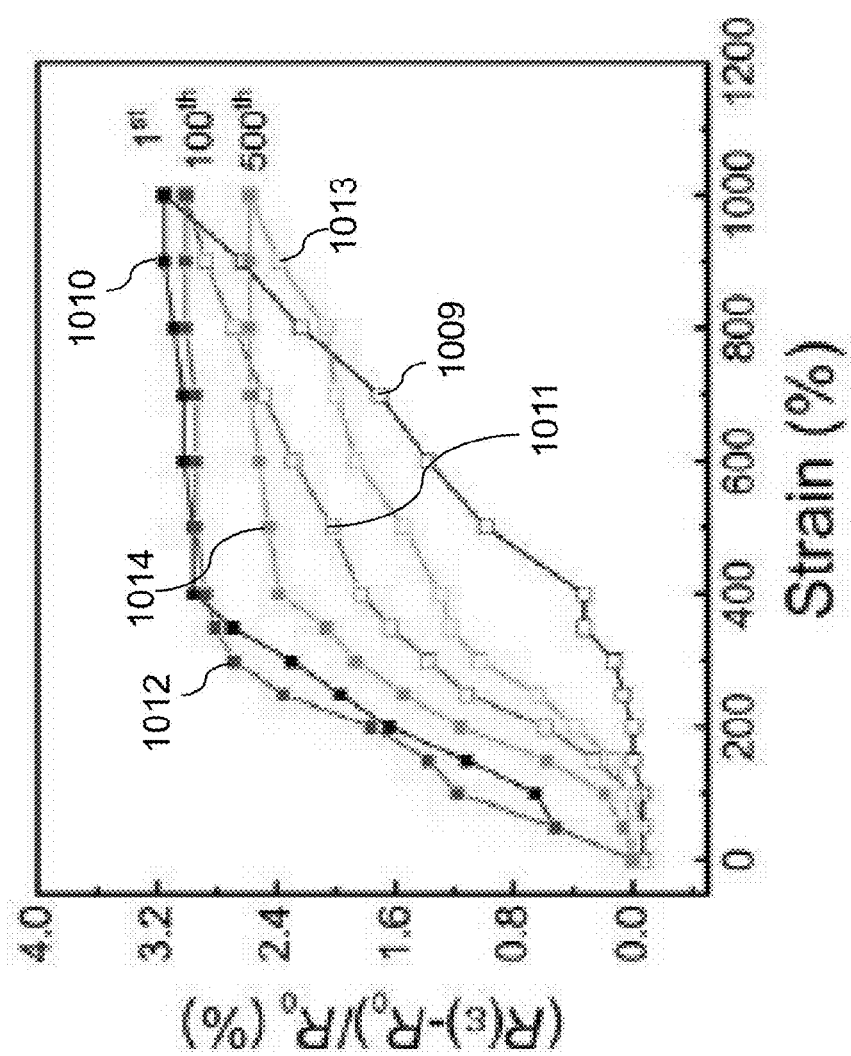
FIG. 10D is a graph that shows the percent change in unstretched resistance (R$_0$) as a function of tensile strain for first, 100$^{th}$, and 500$^{th}$ cycle to 1000% strain for a rubber@NTS$_{19}$@fiber that was coiled by twist insertion without using a mandrel. The open symbols (1009, 1011, and 1013 for first, 100$^{th}$, and 500$^{th}$ cycles, respectively) are for increasing strain and the solid symbols (1010, 1012, and 1014 for first, 100$^{th}$, and 500$^{th}$ cycles, respectively) are for subsequent strain decrease.

The strain range of nearly strain-invariant electrical conductance can further be increased by coiling a non-stretched rubber@$NTS_m$@fiber on a similar diameter rigid mandrel. FIG. 5A shows that the resistance of a coiled rubber@$NTS_{19}$@fiber reversibly changed by only 5.01% when stretched up to 3000% strain, providing a quality factor of 598. In this experiment, the mandrel (which is $\frac{1}{29}^{th}$ the length of the stretched elastomeric conductor) was retained inside the coiled rubber@$NTS_m$@fiber to prevent the conducting fiber from relaxing to a smaller inner coil diameter than the mandrel fiber diameter. Without this constraint, the strain range and Q value (2470% and 526, respectively) slightly decreased, but highly reversible behavior was still realized. (FIG. 5A; FIG. 10D)

This near invariance of conductance during giant elongations was complemented by highly reversible retention of nearly constant conductance over thousands of high strain cycles, extremely small changes in conductance during small radius coiling, and no degradation in conductance during fiber twisting, which is important for electrically driven torsional actuation. For example, the resistance change over a 500% strain range varied little during 2000 cycles for rubber@$NTS_{15}$@fiber (from 0.22% to 0.36% in FIG. 10A). Similarly, completely coiling a 1.5 mm diameter rubber@$NTS_{200}$@fiber around a 0.5 mm diameter mandrel decreased resistance by only 0.7% (FIG. 10C). Finally, inserting a giant 37 turns/cm of twist into a 1.7 mm diameter rubber@$NTS_{50}$@fiber at constant load (37.1 kPa, normalized to the original diameter) caused a 0.76% decrease in resistance. (FIG. 10B). This small resistance decrease was likely because of increased inter-nanotube electronic connectivity produced by twist-induced NTS densification.

Figure 6A:
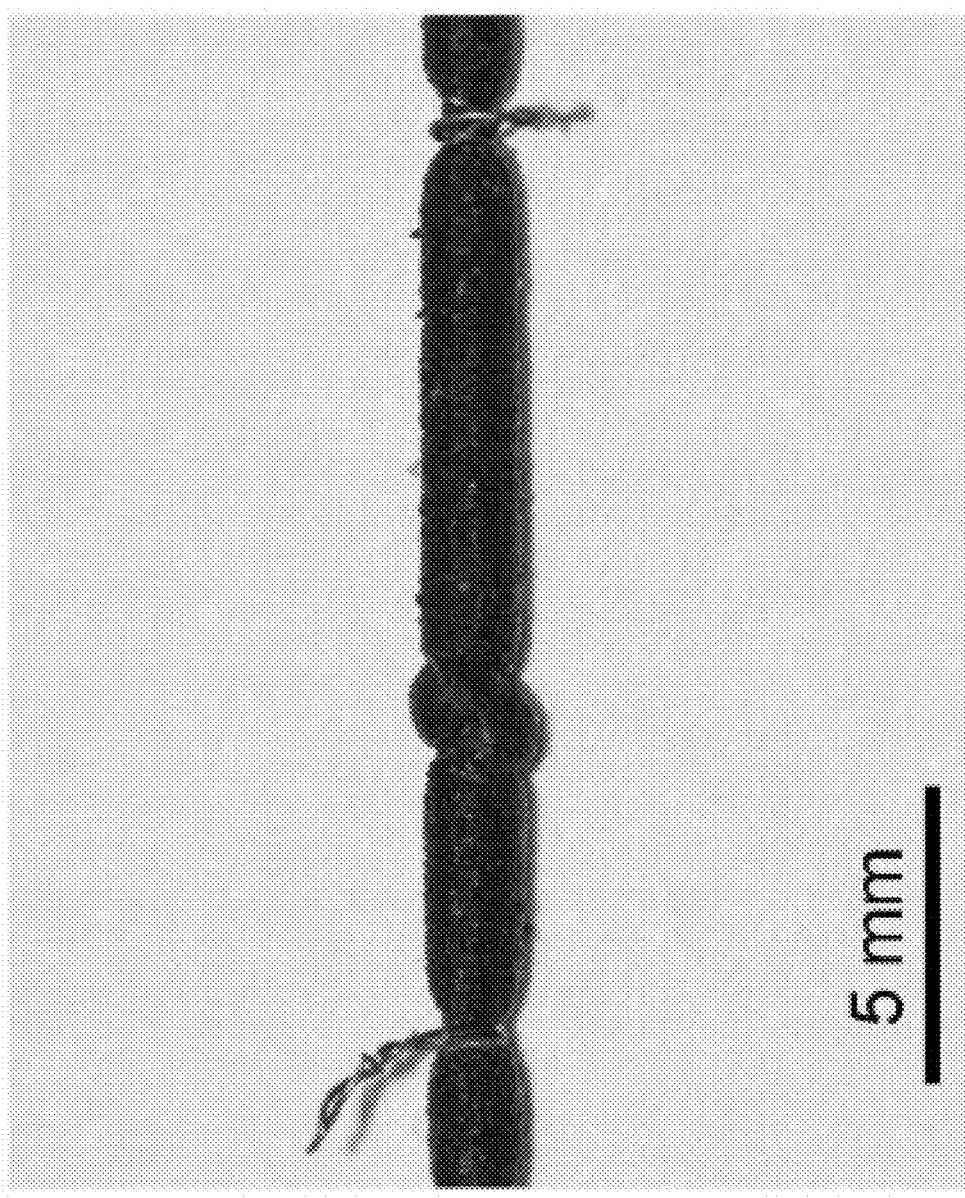
FIGS. 6A-6B are photographs, taken at 0% strain, showing a knotted rubber@$NTS_{56}$@fiber at different magnifications.
Figure 6B:
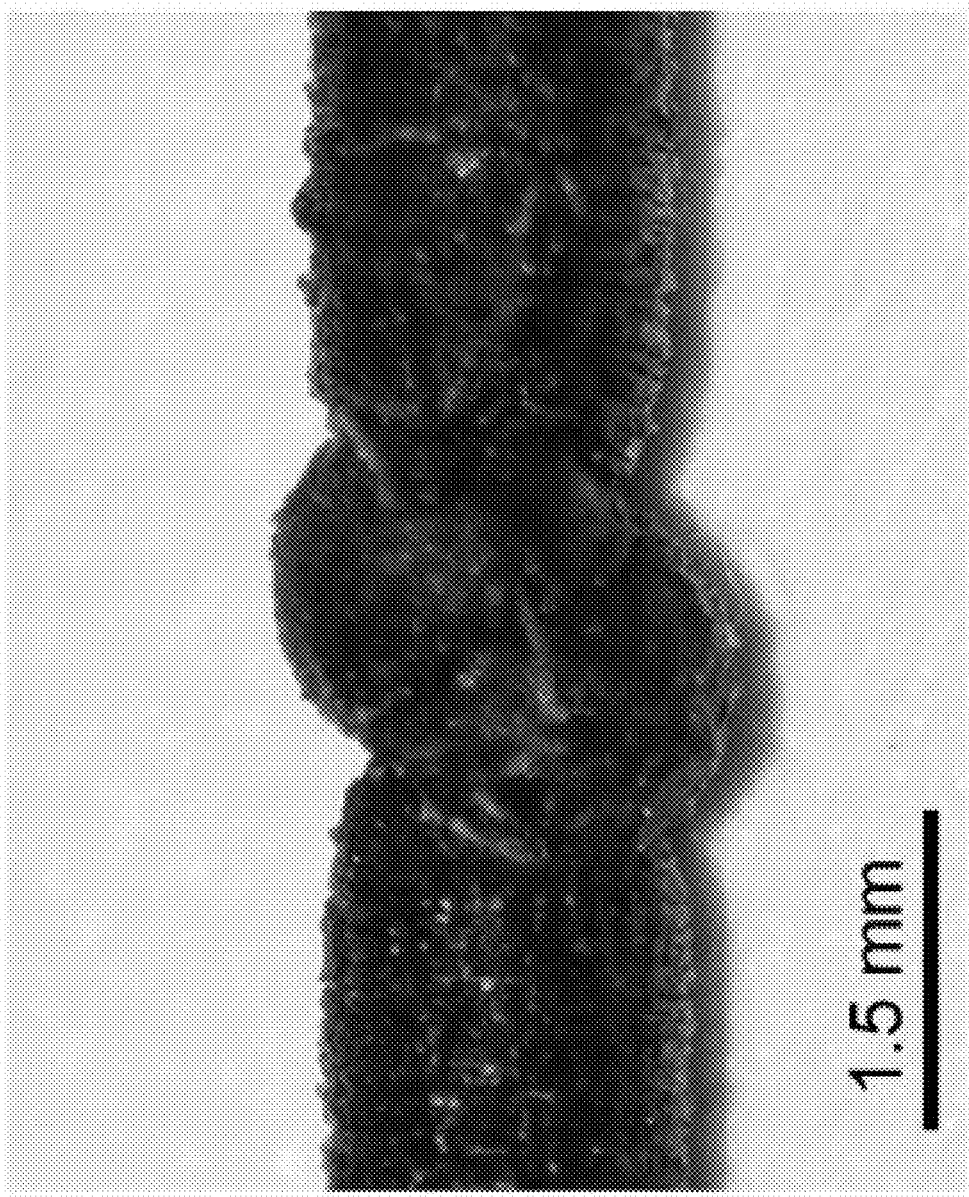
Figure 6C:
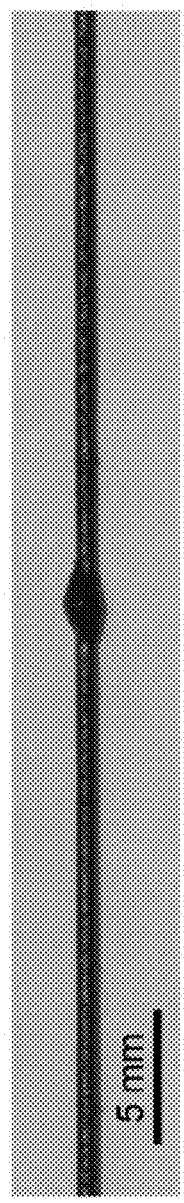
FIG. 6C is a photograph showing a knotted rubber@$NTS_{90}$@fiber under 730% tensile strain.
Figure 7A:
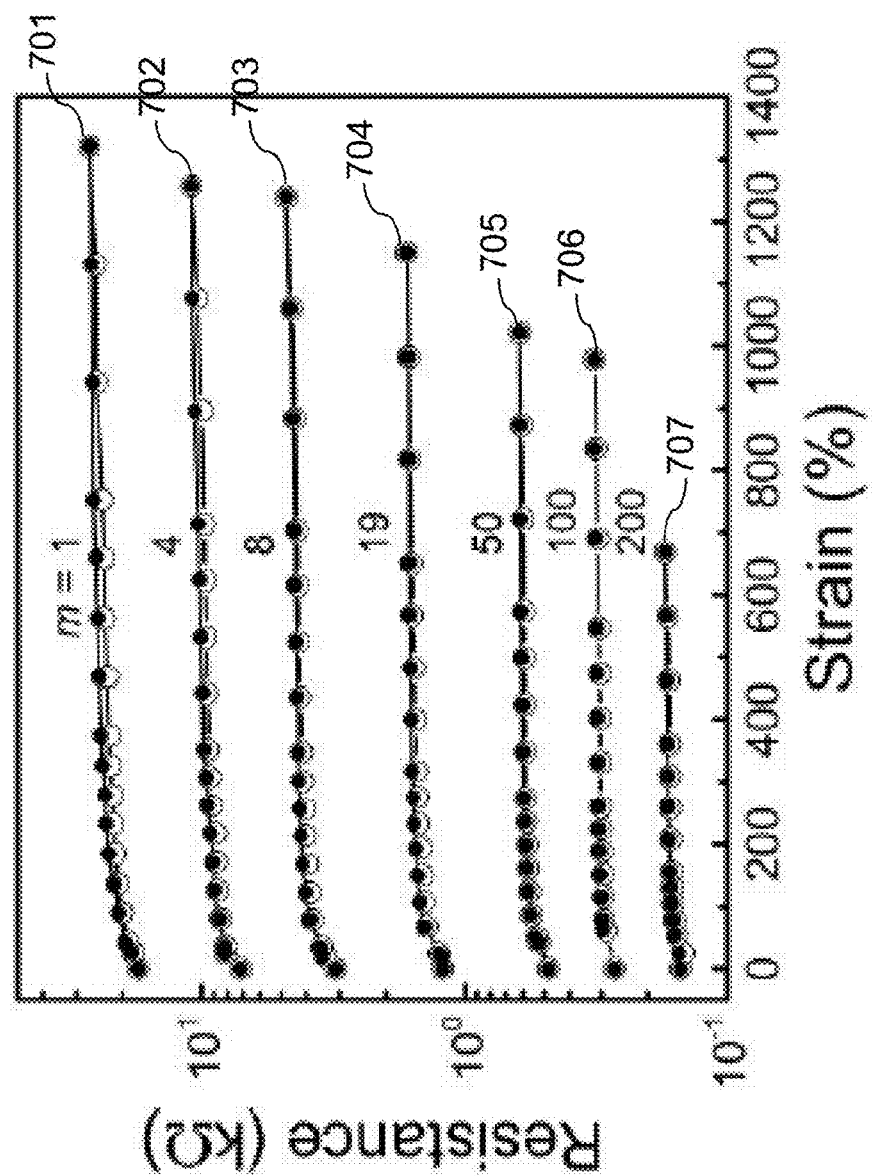
FIGS. 7A-7B are graphs that show the resistance (FIG. 7A, curves 701-707 for m=1, 4, 8, 19, 50, 100, and 200, respectively) and instantaneous-length-normalized resistance (FIG. 7B, curves 708-714 for m=1, 4, 8, 19, 50, 100, and 200, respectively) as a function of strain for $NTS_m$@fibers, where m is from 1 to 200.
Figure 7B:
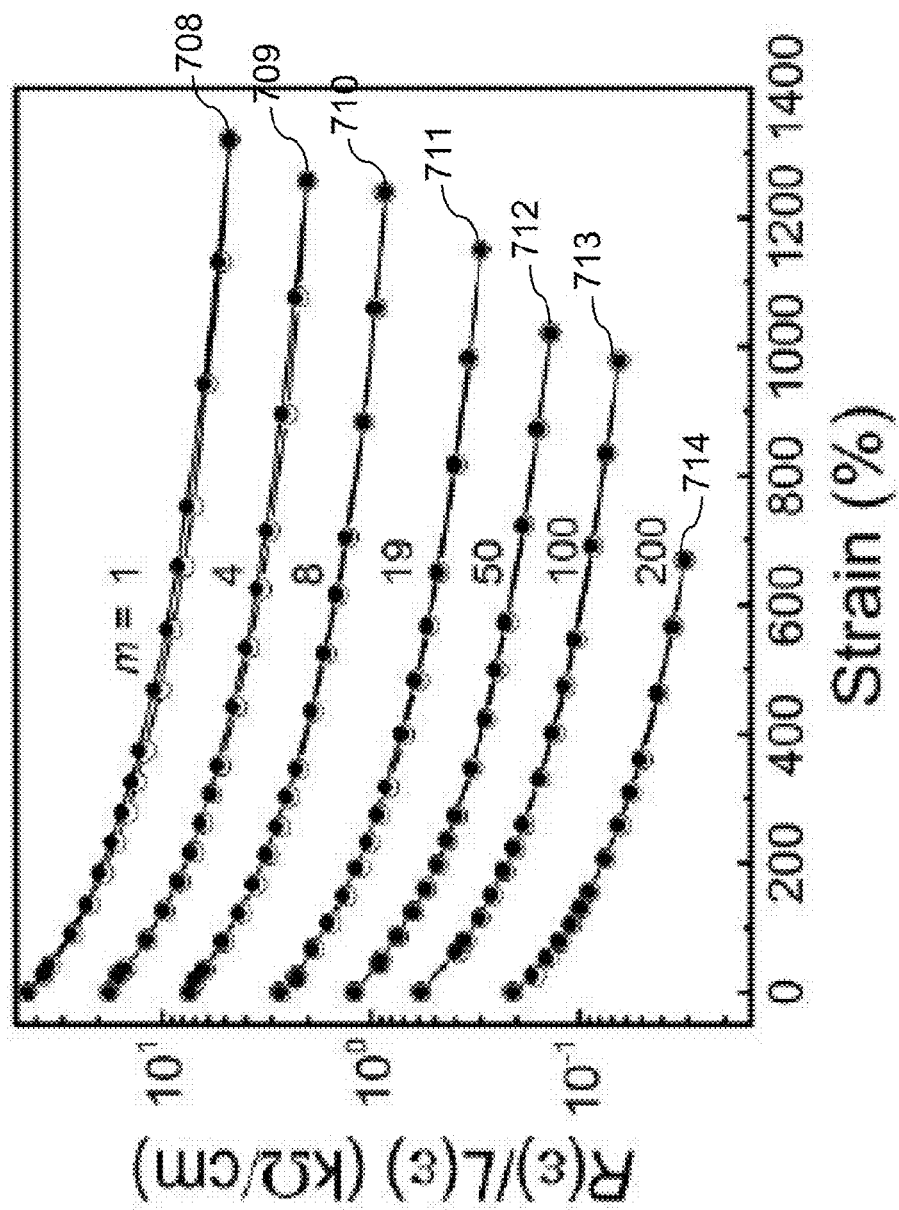
Figure 7C:
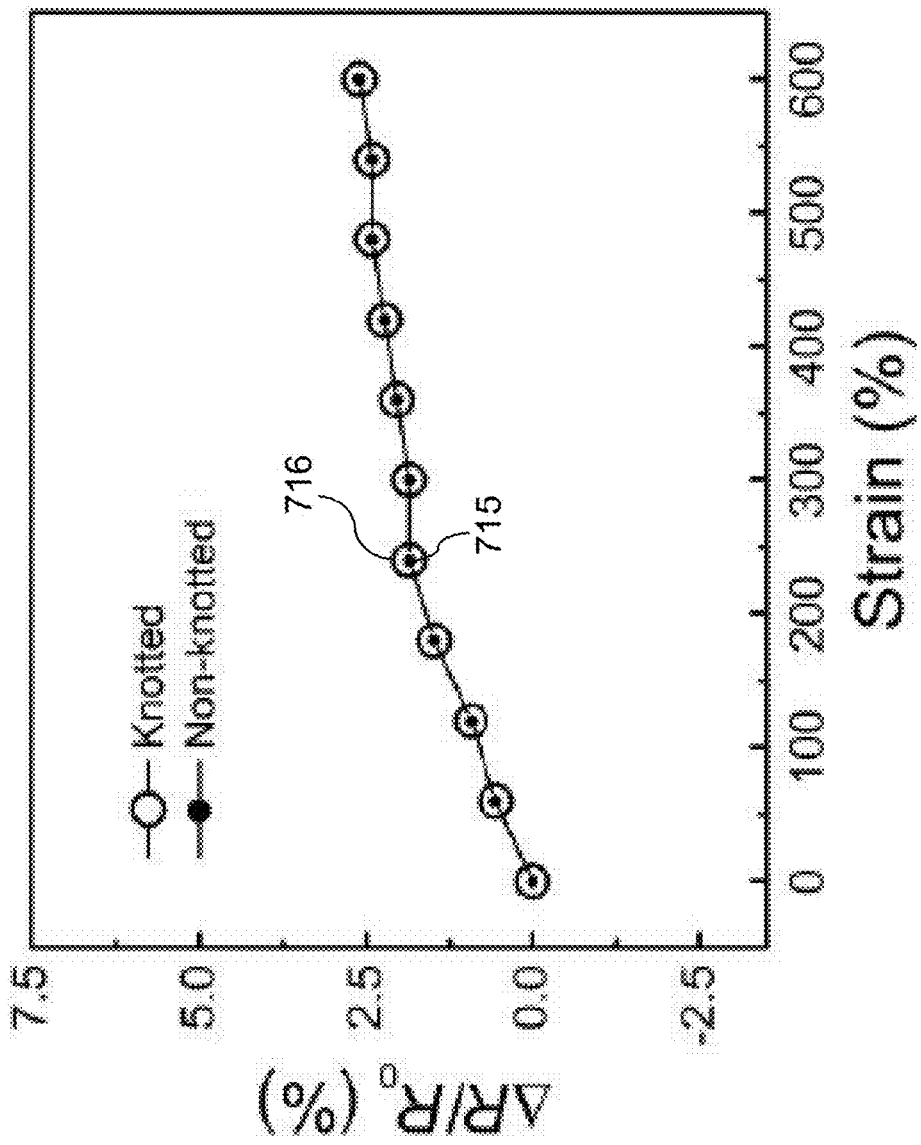
FIG. 7C is a graph that shows the dependence of percent resistance change of a rubber@NTS$_{116}$@fiber on strain, before and after knotting (curve (filled circle) 715 and curve (open circle) 716, respectively).
Figure 10E:
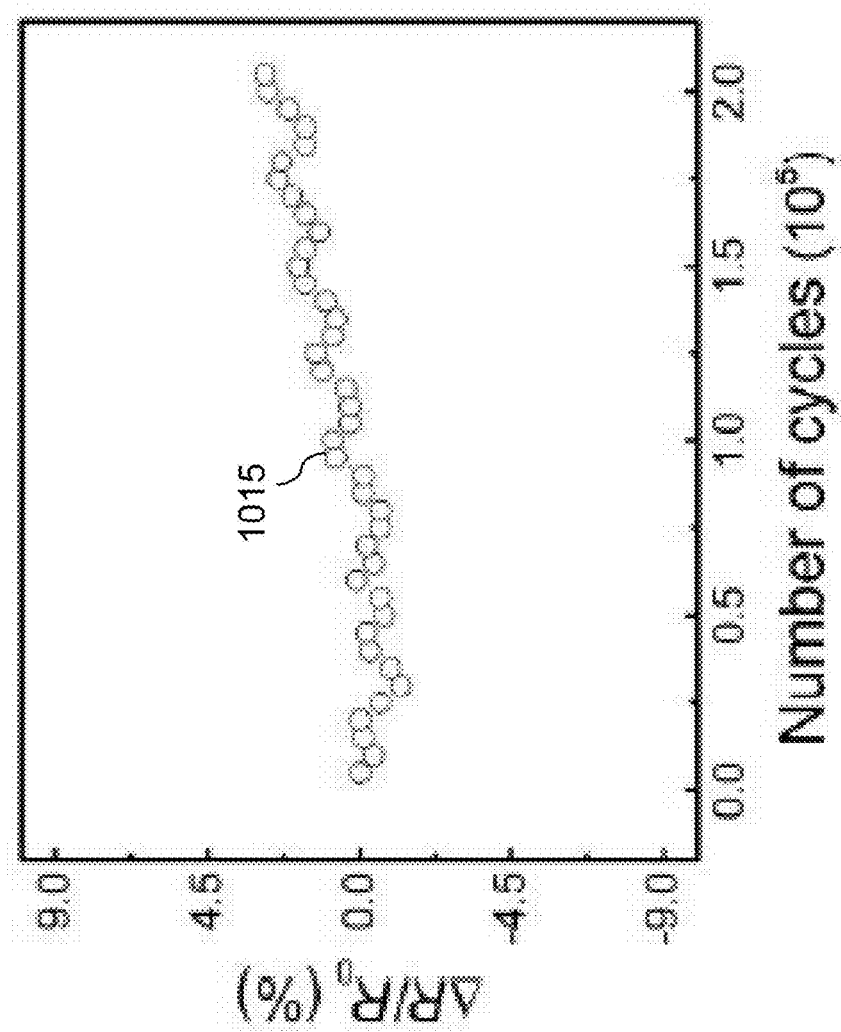
FIG. 10E is a graph that shows the percent resistance change of a 1.7-mm-diameter rubber@NTS$_{92}$@fiber during cyclic bending to a 2 mm radius (curve 1015). The fabrication strain for the sheath-core fibers in FIGS. 10A-10E was 1400%, and all tensile deformations were applied at 8%/s engineering strain rate.

FIGS. 6A-6C show pictures of tightly knotted rubber@$NTS_m$@fibers. A tightly knotted rubber@$NTS_{116}$@fiber underwent <3% resistance change when elongated to 600% strain (FIG. 7C). Additionally, the resistance of a 1.7-mm-diameter rubber@$NTS_{92}$@fiber changed less than 2.8% when it was cyclically bent to 2 mm radius for 200,000 cycles. (FIG. 10E).

The presently described benefits of using the sheath-core fibers of these invention embodiments as electronic interconnects that provide nearly constant resistance over a giant strain range can be extended to sheath-core fibers in which the nanofiber sheaths provide nearly strain invariant thermal conductance over a large strain range. For this purpose highly thermally conducting sheath nanofibers, like carbon nanotubes or highly oriented polyethylene nanofibers, are advantageously deployed. As for the case of electrical conductivity, performance as a thermally conducting sheath-core fiber can be enhanced by increasing the sheath-core thickness ratio to the maximum value that will enable the desired range of elastomeric deformation for the sheath-core fiber.

The Application of Highly Elastic Nanofiber-Sheath/Rubber-Core Conducting Fibers The giant strain range (and the small dependence of fiber resistance on strain) for $NTS_m$@fiber encouraged the fabrication of $NTS_n$@rubber@$NTS_m$@fiber for use as a fiber capacitor, tensile strain sensor, and artificial muscle that combines torsional and tensile actuation. Since choice of small n and m enabled especially large strain ranges where electronic properties are reversible, n=10 and m=20 were used for the examples unless otherwise indicated.

$NTS_n$@rubber@$NTS_m$@fiber capacitors were fabricated using a similar approach as described herein for other sheath-core carbon nanotube fibers. In this case the thickness of the solution-deposited rubber layer (~150 μm) was greater than for the rubber layer in rubber@$NTS_m$@fiber and the rubber layer was deposited while the $NTS_m$@fiber was in relaxed state. After depositing this rubber layer, rubber@$NTS_m$@fiber was re-stretched and n layers of NTSs were wrapped onto the stretched rubber@$NTS_m$@fiber core and densified using ethanol. As for the interior $NTS_m$ sheath, the MWNT alignment direction for the $NTS_n$ sheath coincided with the fiber axial direction. The assembly was then released to its relaxed length, forming the $NTS_n$@rubber@$NTS_m$@fiber capacitor. The $NTS_n$ and $NTS_m$ layers act as the two electrodes of the capacitor, which can be used as a capacitive tensile strain sensor that utilizes the linear dependence of capacitance on strain.

Figure 5B:
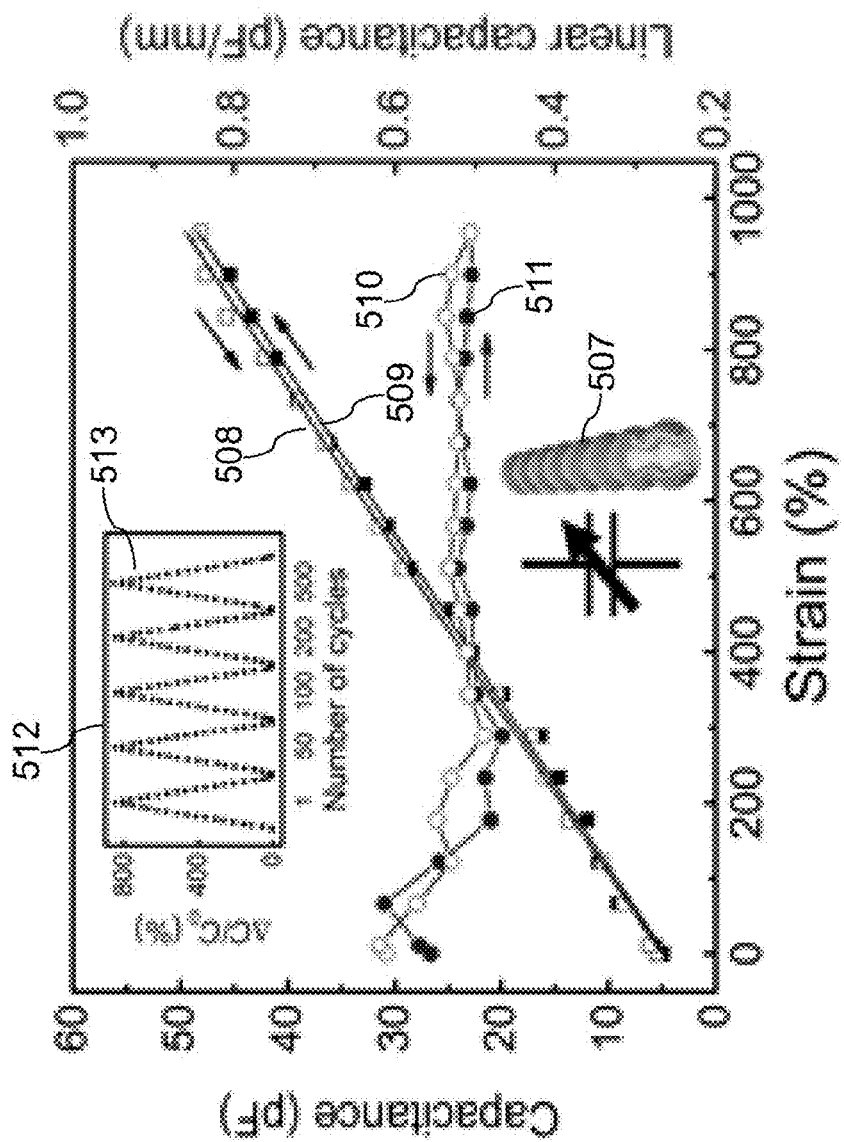

Relevant for application as a capacitive strain sensor, FIG. 5B shows that 950% stretch of an $NTS_4$@rubber@$NTS_3$@fiber provided an 860% increase in capacitance and that this capacitance change was largely non-hysteretic and reversible. This percent capacitance change was substantially higher than that obtained for an elastomeric fiber dielectric capacitor (230% for a maximum 300% strain, using a carbon-black/elastomer composite as electrodes [Kofod 2010]) and for an electrochemical fiber supercapacitor (7.5% for a maximum strain of 400%, using carbon nanotube sheet electrodes that are helically wrapped around a rubber core [Z Zhang 2015]).

Capacitance measurements for the stretched fiber provided a convenient means to determine strain, and the FIG. 5B results show that both high linearity and high sensitivity can be obtained over a giant strain range. In agreement with the theoretical prediction that $\Delta C/C_0 = \Delta L/L_0$ [Liu 2015 *Supplemental Materials*], the data showed that the change in capacitance was linearly proportional to the change in length and that the proportionality constant (0.91) was close to unity. This inter-layer capacitance can be used to control muscle stroke for artificial muscles.

This large change in $\Delta C/C_0$ for large changes in $\Delta L/L_0$ means that the $NTS_n$@rubber@$NTS_m$@fibers of invention embodiments (and cables thereof) can be used for harvesting large-stroke mechanical energy (such as the energy in ocean waves) as electrical energy. While applicable strategies (such as those involving constant charge, constant field, and constant voltage during stretch relaxation) and electronic circuits for achieving such energy harvesting are well known for dielectric rubber sheets sandwiched between electrodes (which typically comprise problematic electrically conducting grease), the giant elastic deformations afforded by the present fibers and their mechanical robustness with respect to twist and bending provides considerable advantage compared with prior-art sheet-based devices [Anderson 2012; Kornbluh 2012].

Artificial muscles based on the electrostatic attraction between electrodes of dielectric rubber capacitors are well known and commercially exploited [Q Zhang 1998; Pelrine 2000; Carpi 2010; Shankar 2007; Brochu 2010]. High stroke torsional fiber muscles were made by simply inserting twist into sheath-core $NTS_n$@rubber@$NTS_m$@fibers, while maintaining a constant fiber length [Liu 2015 *Supplemental Materials*]. The amount of inserted twist was far below that needed to provide coiling [Liu 2015 *Supplemental Materials*]. The present twisted fiber geometry provided torsional actuators having up to 104 times higher torsional stroke per muscle length than previously demonstrated for electrically driven, non-thermal, non-electrochemical muscle fiber [Pan 2008; J Kim 2001], and it avoided the Carnot efficiency limit of thermally powered artificial muscles and the use of liquids or vapors for electrochemically or absorption-powered muscles [Haines 2014; Lima 2012; Cheng 2014].

Dielectric torsional actuators of embodiments of the present invention were fabricated using a hybrid fiber comprised of a twist-inserted $NTS_n$@rubber@$NTS_m$@fiber and a non-actuating rubber fiber, which served as a torsional return spring. Opposite ends of the torsional muscle/return-spring assembly were torsionally tethered to prohibit rotation of these ends. Torsional actuation was measured under either constant tensile load or by maintaining a fixed length for the entire muscle/return-spring assembly. Actuation was characterized by measuring torsional rotation (or torsional rotation combined with tensile actuation for isobaric measurements) as a function of the voltage applied between the two sheath electrodes, $NTS_n$ and $NTS_m$. Torsional stroke was characterized by using a paddle that was attached near the midpoint between the actuating fiber segment and the return spring. The applied load during isobaric actuation prohibited coiling, and the maximum applied electric field was between 10.3 and 11.7 MV/m.

Applicant's theoretical analysis showed that to maximize torsional stroke, the torsional return spring should serve as a reservoir of twist at constant torque [Liu 2015 *Supplemental Materials*]. Therefore, this return spring should have low torsional stiffness, so that the inserted twist is large compared to the torsional stroke.

Figure 9:
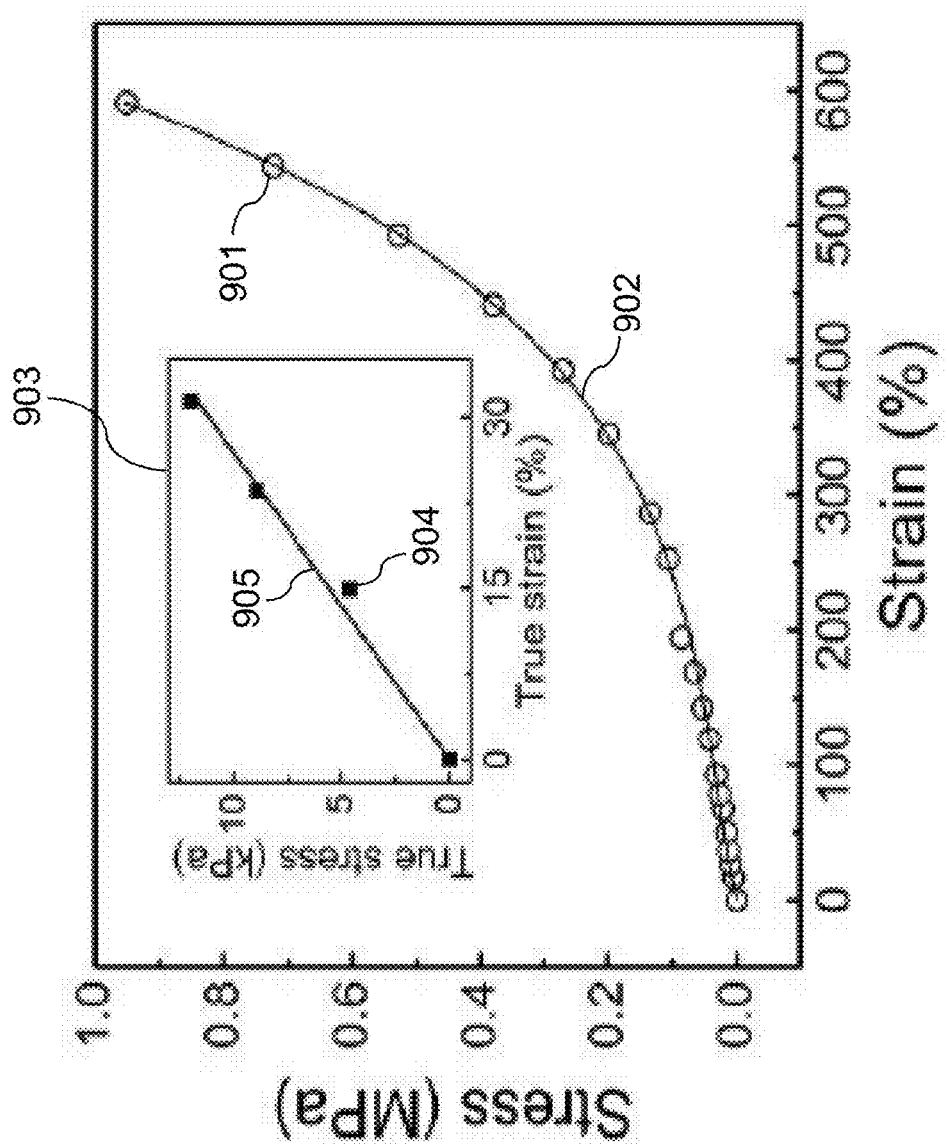
FIG. 9 is a graph that shows engineering stress-strain data (circles 901) and a polynomial model fit (curve 902) for a fiber of the SEBS rubber used for actuation. The inset 903 of FIG. 9 is a graph that provides a plot of the experimental engineering data in the low-strain region (filled squares 904) as true-stress versus true-strain, and a linear fit to this data (line 905).
Figure 14:
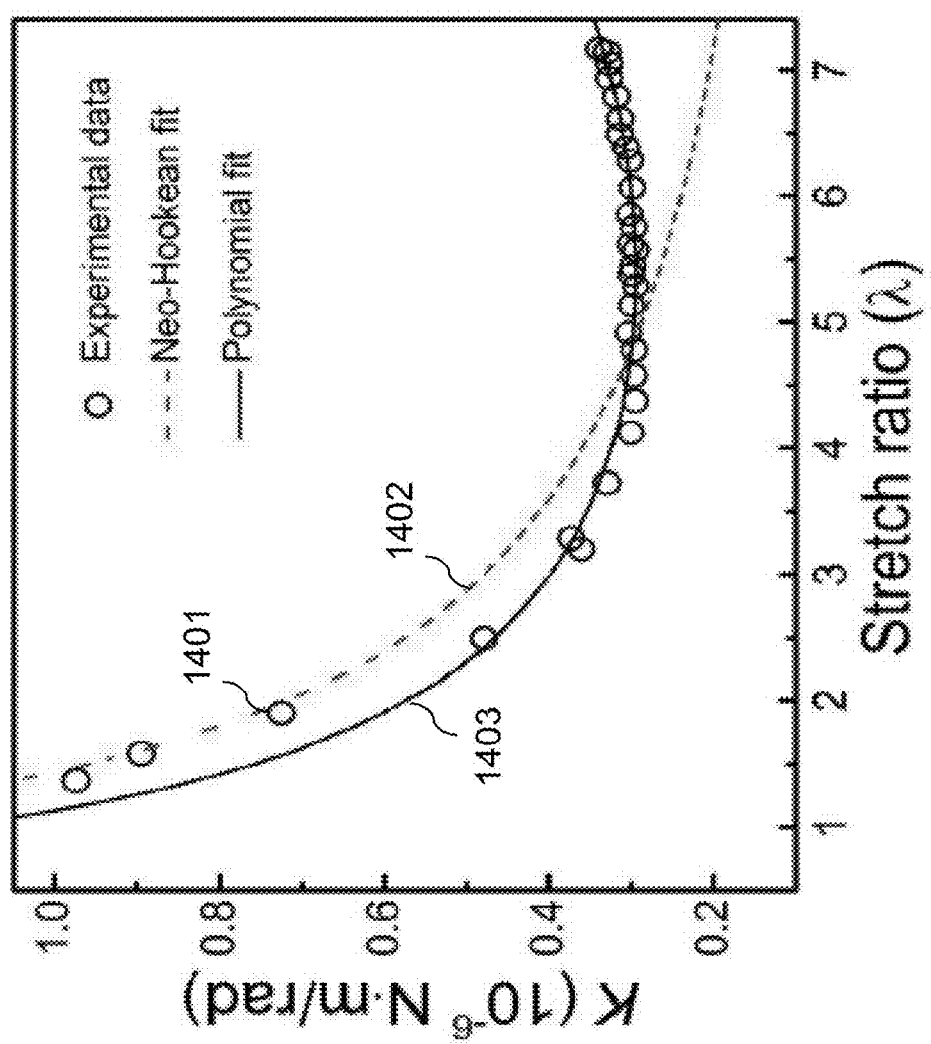
FIG. 14 is a graph that shows the dependence of torsional stiffness at zero twist (circles 1401) on stretch ratio (λ) for an SEBS fiber. The dashed curve 1402 and solid curve 1403 are fits for neo-Hookean and polynomial models, respectively.
Figure 15B:
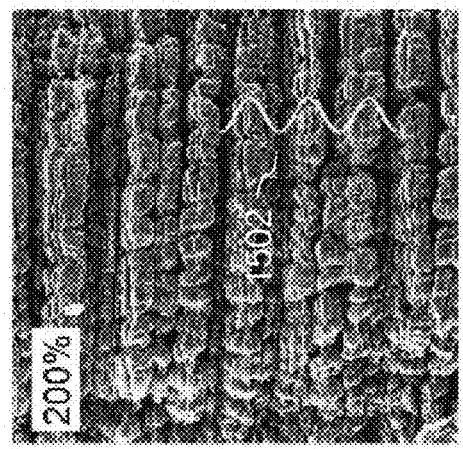
FIGS. 15A-15D are SEM micrographs showing the evolution of the buckled sheath structure of an NTS$_{92}$@fiber during stretch from 0 to 1000% strain in the axial direction, which is vertical in the micrographs. At 0% strain (FIG. 15A) both long-period and short-period axial buckles coexist (and are most clearly seen at 200% strain (FIG. 15B), where the short-period buckles have been pulled apart). During stretch, the long-period axial buckles first disappear (at ~400% strain) (FIG. 15C) and then the short-period axial buckles disappear (at ~1000% strain) (FIG. 15D). Long-period belt-direction buckling first appears between 200 and 400% strain. The fabrication strain applied to the rubber core during CNT sheath application was 1200%. The sinusoidal curves 1501-1504 (in FIGS. 15A-15D, respectively) are provided to enable comparison between the long-buckle periods seen in the SEM images and those calculated from the instantaneous fiber length, considering that the number of buckle wavelengths in the fiber is independent of stretch.
Figure 15D:
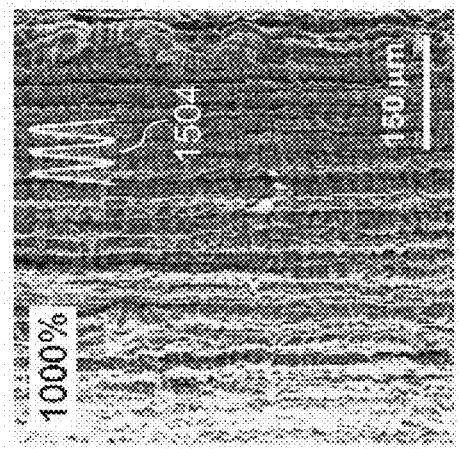
Figure 15A:
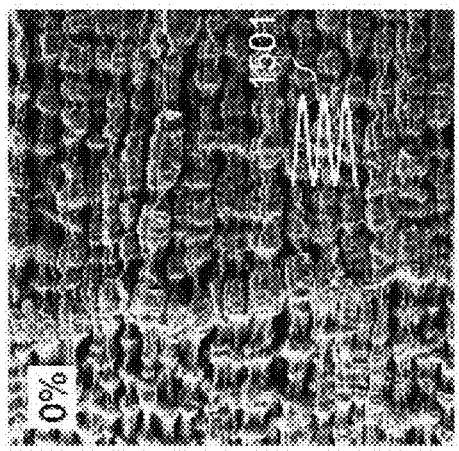
Figure 15C:
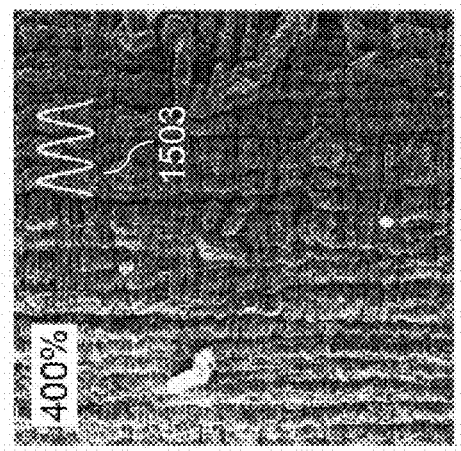
Figure 16A:
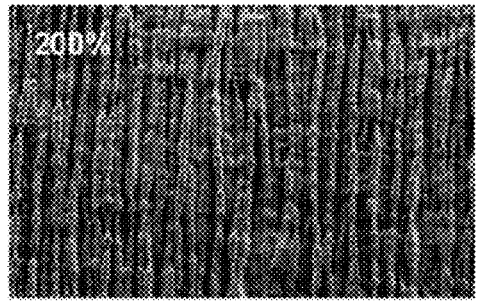
FIGS. 16A-16F are SEM images showing NTS$_{100}$@fibers prepared using different fabrication strains, indicated by the panel labels (200%, 400%, 600%, 800%, 1100%, and 1400%, respectively). The fiber axial direction is horizontal when the images and associated labeling are rotated so that the labeling is horizontal. For these micrographs at 0% strain for trained fibers, belt direction buckles do not appear. At low fabrication strain (200%) (FIG. 16A), only short-period axial buckles were formed. For a fabrication strain of 400% (FIG. 16B), the short-period axial buckles start contacting in the pictured strain-released state. For further increase of fabrication strain to 600% (FIG. 16C), long-period axial buckles are additionally observed. Finally, both short- and long-period axial buckles become more pronounced for fabrication strains of 800% to 1400% (FIGS. 16D-16F).
Figure 16B:
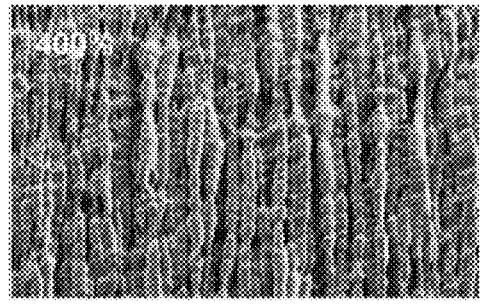
Figure 16C:
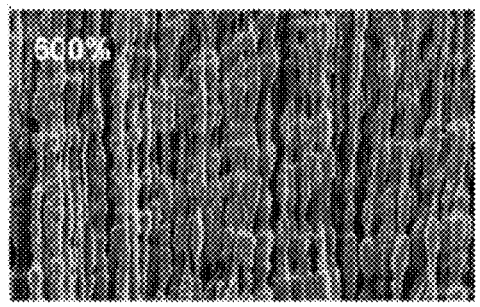
Figure 16D:
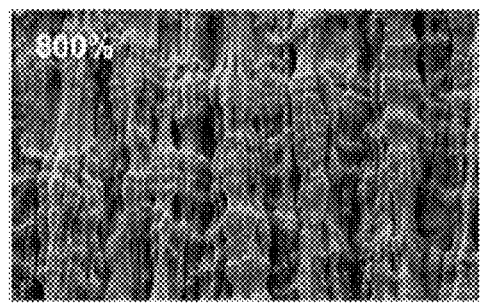
Figure 16E:
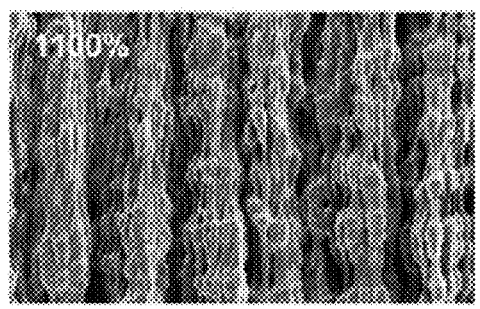
Figure 16F:
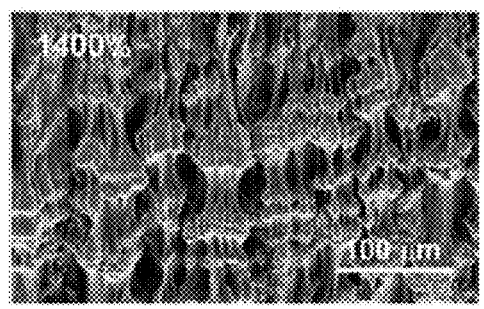

It might be expected that the torsional stroke for a non-coiled $NTS_n$@rubber@$NTS_m$@fiber would linearly increase with inserted twist. This is not the case because of the nonlinear elastic behavior of the rubber at high strains. (See FIG. 9 and FIG. 14). For an intermediate degree of twist insertion, the torsional stiffness of the rubber was low, which enabled the torque of torsional actuation to be outputted as an enhanced torsional stroke.

Figure 8A:
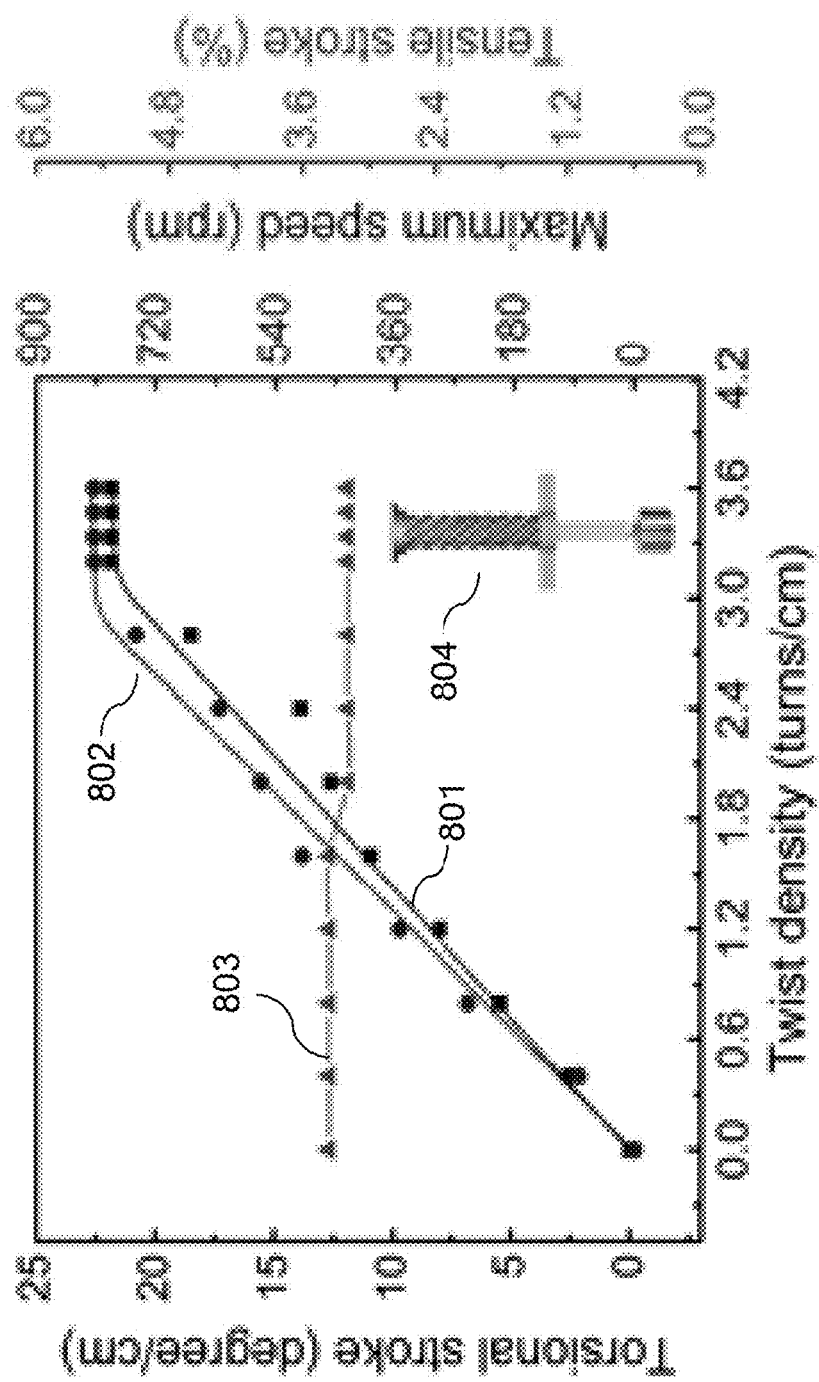
FIGS. 8A-8D show the maximum equilibrium muscle strokes and maximum rotation speeds obtained using a single voltage step for single-ply and two-ply NTS$_{10}$@rubber@NTS$_{20}$@fibers of the present invention. The fabrication strain for these muscles was 900%. The applied stress was 15.6 kPa for the single-ply muscle and 10.0 kPa for the two-ply muscle.
Figure 8B:
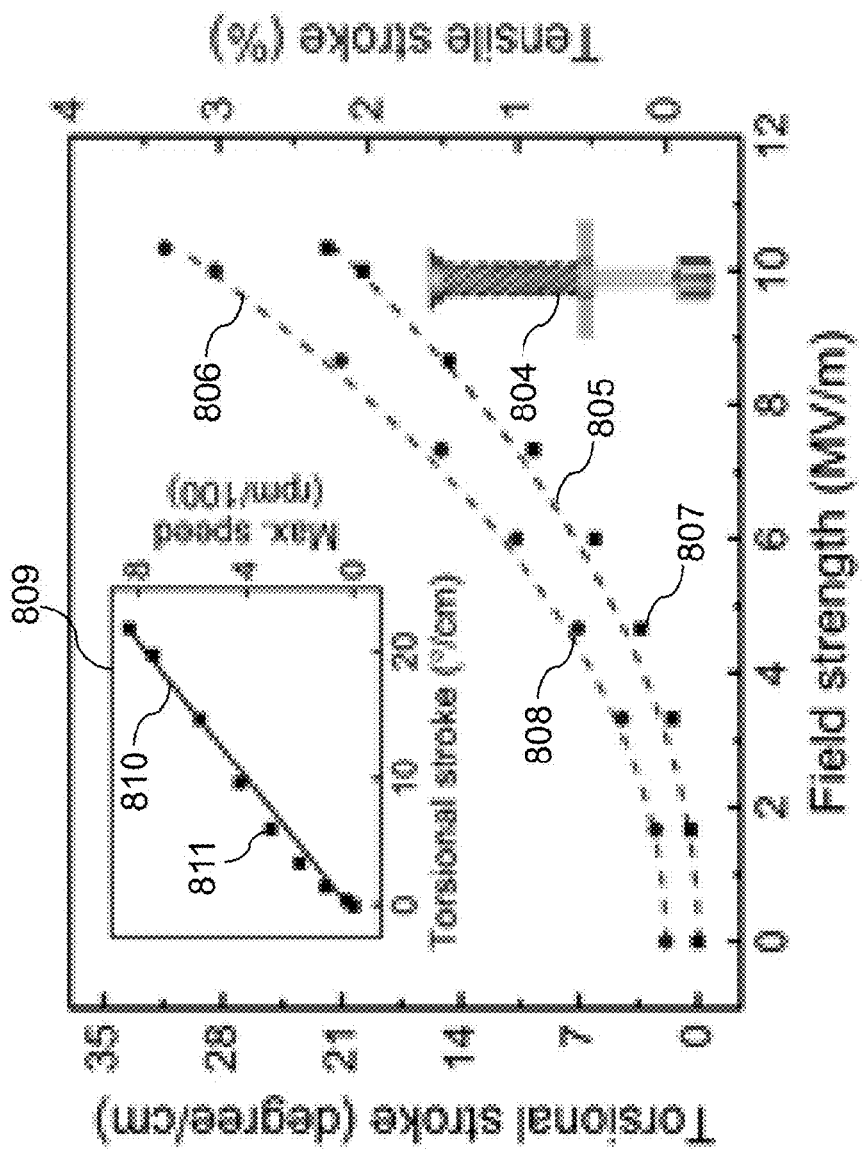
Figure 17:
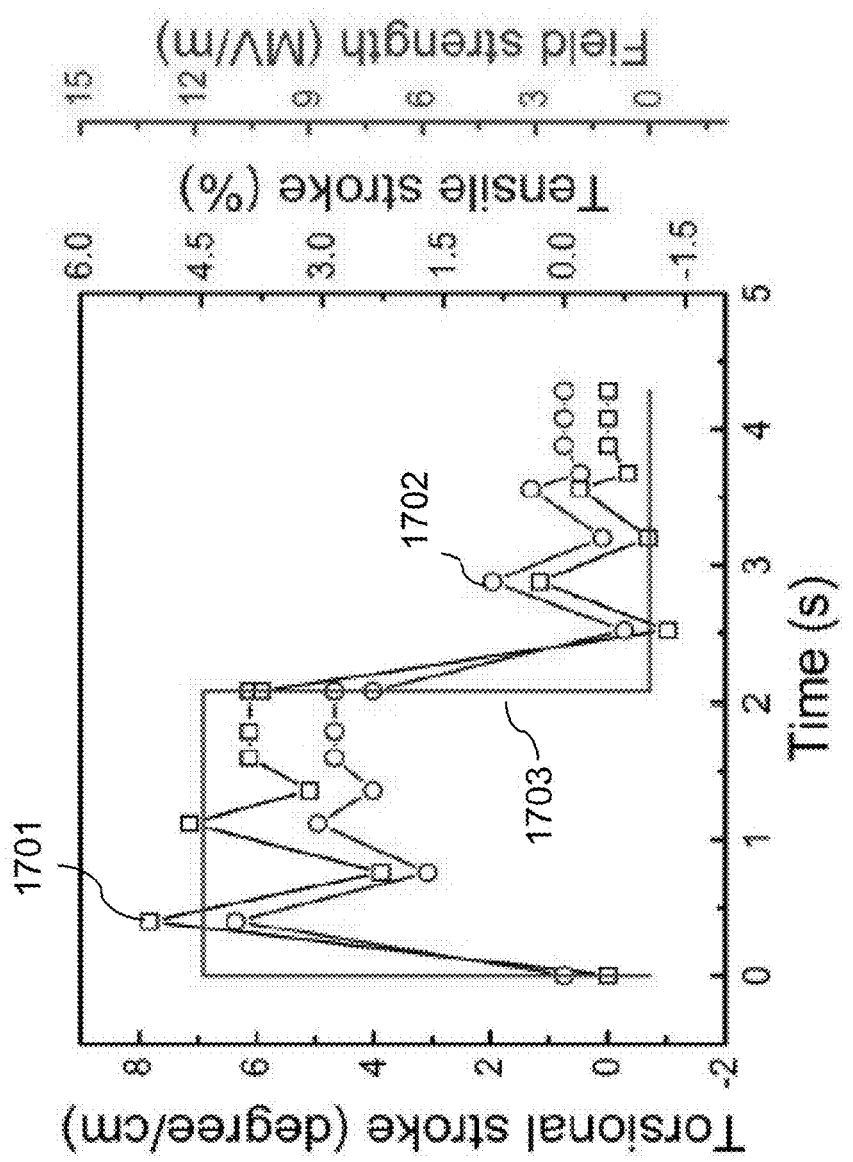
FIG. 17 is a graph that shows the time dependence of rotation angle (squares 1701) and tensile stroke (circles 1702) for an isobarically operated $NTS_{10}$@rubber@$NTS_{20}$@fiber muscle, following application of a high-voltage single square-wave pulse 1703. Both tensile and torsional strokes simultaneously reach maximum values, and then simultaneously decay. This coincidence between maximum values of torsional and tensile stroke is consistent with tensile actuation driving torsional actuation. This single-ply muscle contained an inserted twist of 1.47 turns/cm.

As shown in FIG. 8A, torsional stroke for isobaric actuation was maximized for a 0.9 mm diameter $NTS_{10}$@rubber@$NTS_{20}$@fiber by inserting 3.20 turns/cm of twist. This twist was added to the entire fiber (containing both segments) while maintaining a constant length. FIGS. 8A-8B show the dependencies of maximum equilibrium rotation angle, rotation speed, and tensile stroke on applied field for an isobarically operated $NTS_{10}$@rubber@$NTS_{20}$@fiber muscle 804 having this degree of twist insertion. The torsional stroke reached a maximum value of 21.8°/cm for this 0.9 mm diameter muscle. When applying a square-wave voltage pulse 1703 (in FIG. 17), both tensile and torsional strokes simultaneously reached peak values for a 2 mm diameter fiber of this type (4.1% and 7.8°/cm, respectively) and then simultaneously decayed exponentially to steady-state tensile and torsional strokes of 2.9% and 6.1°/cm, respectively (FIG. 17).

The amount of inserted twist that maximized torsional stroke is much lower than the inserted twist that is required to produce coiling of the rubber fiber under the mechanical loads used for actuation. This twist amount to produce coiling ($T_{coil}$, in turns per cm of non-stretched length) for a rubber core of non-stretched diameter $D_0$ was $D_0 T_{coil}=1.1$ turns, 1.2 turns, and 1.7 turns for applied tensile stresses of 4.0, 8.8, and 24.4 kPa, respectively. Here and elsewhere tensile stress is normalized with respect to the cross-sectional area of the unloaded muscle segment.

Figure 8C:
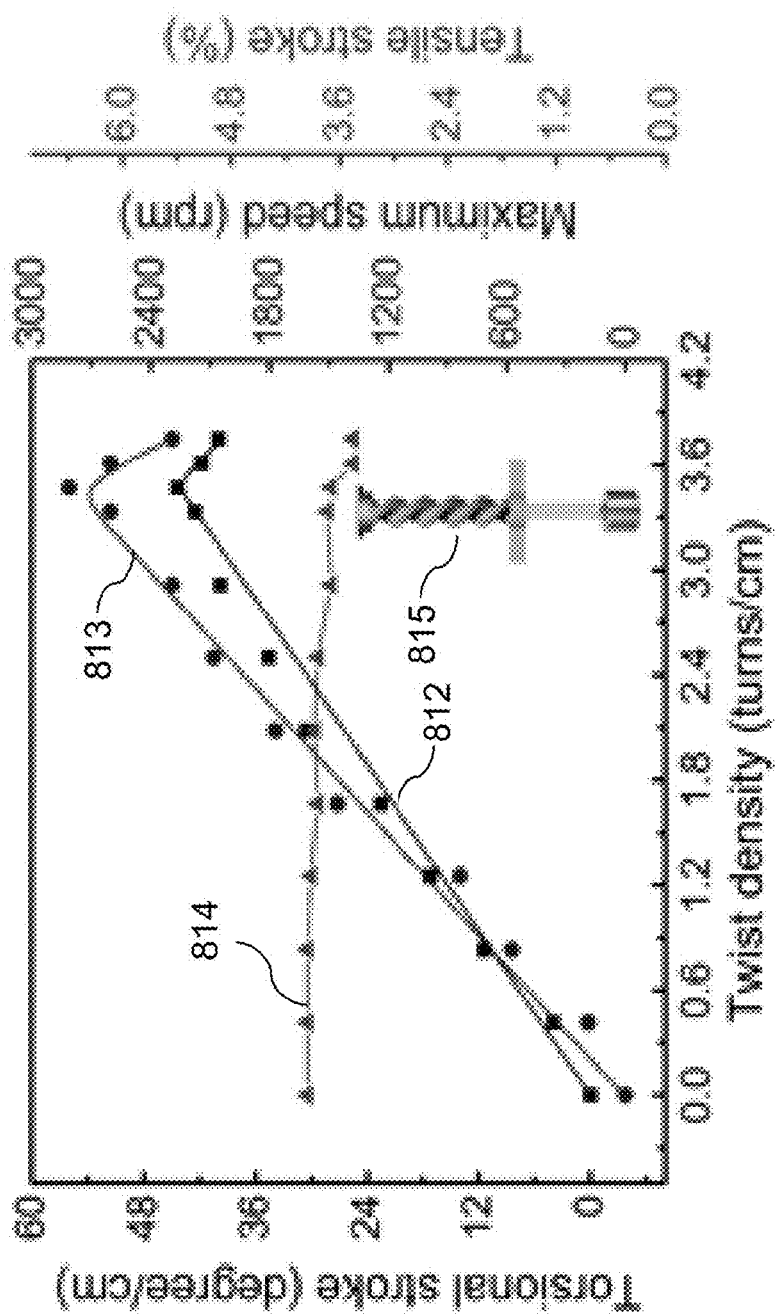
Figure 8D:
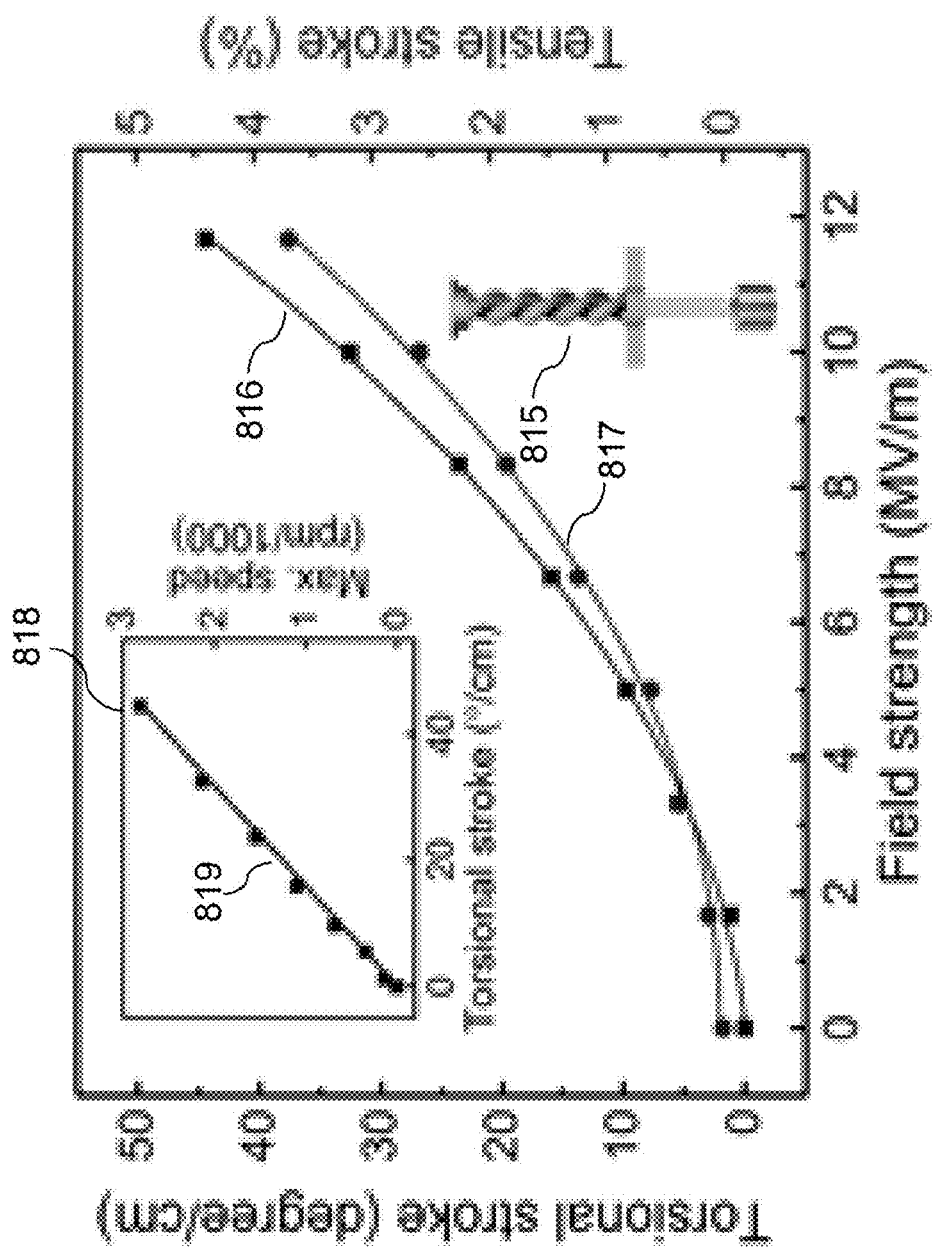

In addition to using a twist-inserted $NTS_n$@rubber@$NTS_m$@fiber as the actuating segment, the performance was also evaluated for two non-twist-inserted $NTS_n$@rubber@$NTS_m$@fibers that were plied together using twist. For reported measurements, the component $NTS_{10}$@rubber@$NTS_{20}$@fibers were 0.9 mm in diameter and 7.2 cm long. The twist density used for plying was 3.47 turns/cm, based on the length of each segment. The torsional return spring (made of similar SEBS rubber as the actuating segment) was also two-ply and comprised individual fibers that were 0.5 mm in diameter and 6.5 cm long. When this two-ply muscle is operated isobarically in the muscle/return-spring configuration used for the single-ply muscles, an especially large torsional stroke was observed (44.4°/cm), along with a tensile stroke of 3.7% (FIG. 8C-8D).

The drive mechanism for this torsional actuation is fundamentally different from that for previous torsional muscles. For earlier electrochemically or thermally driven hybrid nanofiber muscles, the volume change of guest material in the twisted nanofiber yarns drives both tensile and torsional actuation [Lima 2012]. Also, tensile actuation of coiled thermally-driven polymer fiber muscles has been shown experimentally and theoretically to be driven by torsional rotation of the twisted fiber [Haines 2014]. In contrast, tensile actuation drives torsional actuation for these sheath-core dielectric muscles. As a result of this novel drive mechanism, an isometrically operated (constant length) single-ply, dual-segment torsional muscle provides a slightly smaller equilibrium torsional stroke than for the above isobaric configuration, since tensile stroke (which drives torsional actuation) is partially being absorbed by contraction of the torsional return spring.

Just like for planar dielectric muscles, the electrostatic attraction between cylindrical capacitor electrodes in the twisted rubber muscle generated a stress that reduced the thickness of the rubber dielectric in the muscle [Pelrine 2000]. Since the rubber in the muscle core and surrounding capacitor had a Poisson's ratio of ~0.5, the muscle increased length to conserve volume. The resulting reduced torsional stiffness of the actuating segment resulted in twist transfer to the actuating segment, so the paddle rotated to maintain torque balance. Consequently, torsional actuation arose from two complementary effects on torsional stiffness: the increase in muscle length and the decrease of muscle diameter due to the large positive Poisson's ratio.

By employing a neo-Hookean hyperelastic model, theory showed that the coupling of tensile to torsional actuation was realized through an equivalent axial force, which effectively reduced the torsional stiffness of the muscle fiber and caused it to uptwist. Theory and experiment showed that torsional actuation was quadratic with electric field and linear with the initial inserted twist [Liu 2015 *Supplemental Materials*]. Since the same torsional actuation energy was responsible for the maximum kinetic energy of the paddle, the maximum torsional stroke was proportional to maximum rotation speed, as was experimentally observed (FIG. 8B, inset). FIG. 8B shows that the theory accurately predicted the measured field dependence of torsional and tensile stroke. For high inserted twist, a more sophisticated nonlinear model, which considered the nonlinear stress-strain relationship of rubber, explained the observed plateau in torsional stroke at high inserted twist (FIG. 8A).

Similar to thermally driven torsional muscles, theory predicted that the product of muscle diameter and stroke was scale invariant for the dielectric torsional muscles. Hence, torsional stroke per muscle length for a given electric field can be dramatically increased (while the voltage is decreased) by proportionally decreasing core and sheath thicknesses, as long as the bias angle $\alpha$ is kept constant, where $\tan(\alpha)=\pi D T_w$, D is the muscle diameter, and $T_w$ is the inserted twist in turns per muscle length.

This inverse dependence of torsional stroke on muscle diameter must be considered when comparing the torsional strokes of different diameter muscles. Smaller diameter electrothermally-driven or electrochemically-driven fiber-based muscles provide much higher torsional strokes per muscle length [Lima 2012; Foroughi 2011]. Nevertheless, when this length-normalized torsional stroke was scaled by multiplication by the fiber diameter, the advantageously liquid-free, Carnot-efficiency-unlimited dielectric fiber torsional muscles provided length and diameter corrected torsional strokes (1.50° for single-ply muscle and 4.71° for the two-ply muscle) which were comparable to those for the highest performing electrically-driven torsional muscles (0.71° for electrothermally driven wax-filled CNT yarn muscles [Lima 2012], 4.30° for electrothermally driven nylon muscles [Haines 2014], and 2.16° for electrochemically driven CNT muscles [Foroughi 2011]).

Various applications for the sheath-core conducting fibers are enabled by their giant elastic deformability (up to 3000% strain), small change in resistance during giant strain deformation (corresponding to a Q of up to 598), mechanical robustness, and the realized combined torsional and tensile actuation. The sheath-core conductors are attractive capacitance strain sensors, as shown by the observed 860% in capacitance change during 950% elongation. The demonstrated torsional actuation could be exploited for rotating optical elements, such as mirrors, in optical circuits.

For applications in which increased electrical conductance or capacitance is needed, a fundamentally unlimited number of individual small-diameter $NTS_m$@fibers or $NTS_n$@rubber@$NTS_m$@fibers can be plied together (using a small plying angle) or interconnected by infiltrated rubber (applied in the zero stress state) without loss of per-fiber performance. A demonstration of this ability to increase conductance by plying sheath-core fibers together is provided in Example 3.

Figure 18A:
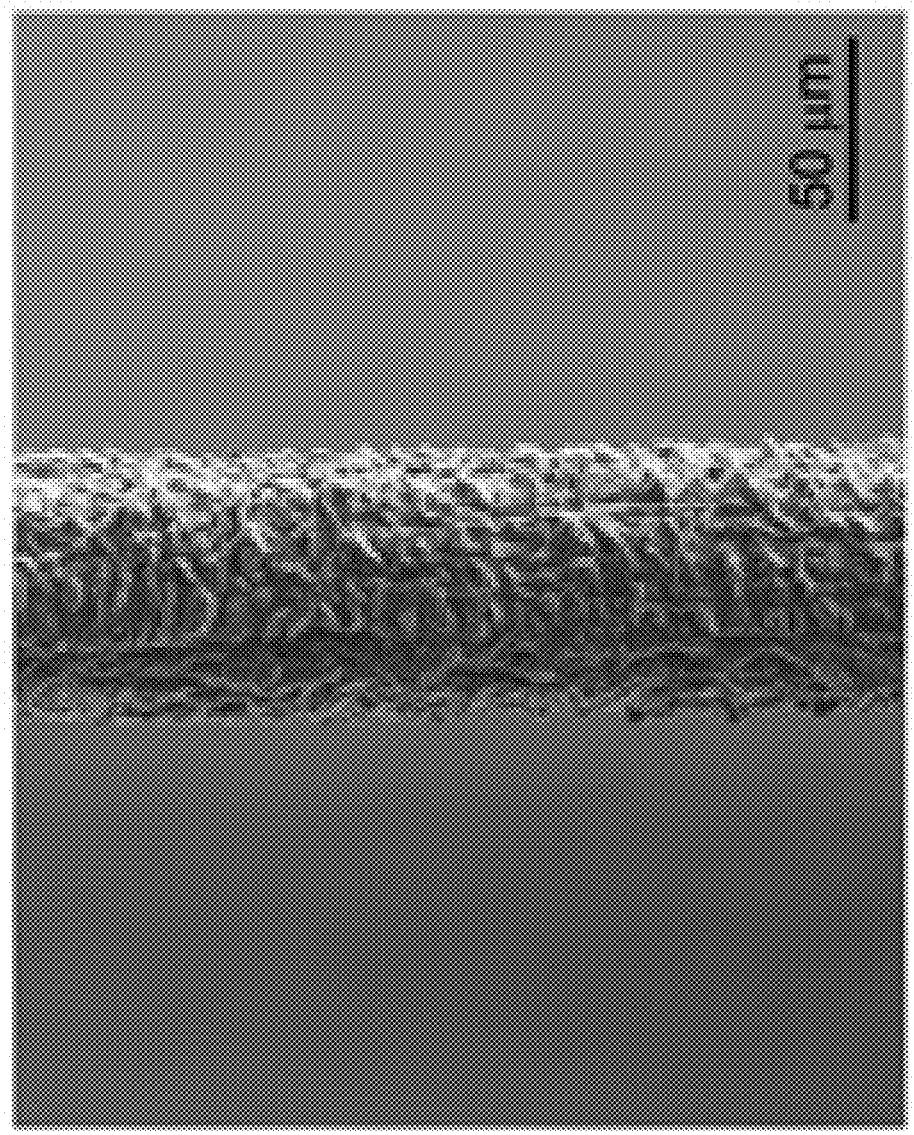
FIG. 18A is SEM image showing a 150-μm-diameter $NTS_8$@fiber at 300% strain.
Figure 18B:
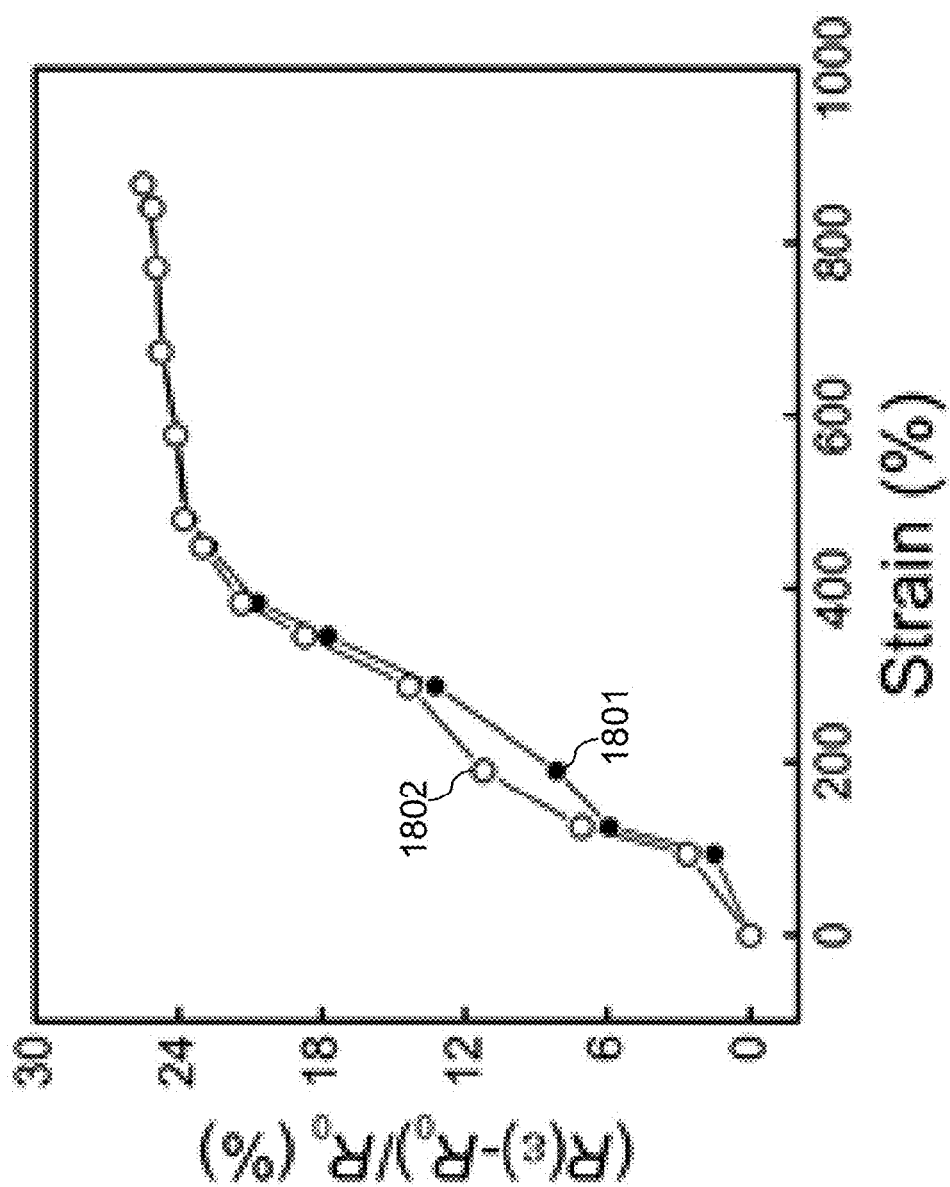
FIGS. 18B-18C are graphs that show percent electrical resistance change versus strain for an $NTS_8$@fiber (FIG. 18B) and a rubber@$NTS_8$@fiber (FIG. 18C) for increasing strain (close circles 1801 and 1803, respectively, for FIGS. 18B-18C) and decreasing strain (open circles 1802 and 1804, respectively, for FIGS. 18B-18C).
Figure 18C:
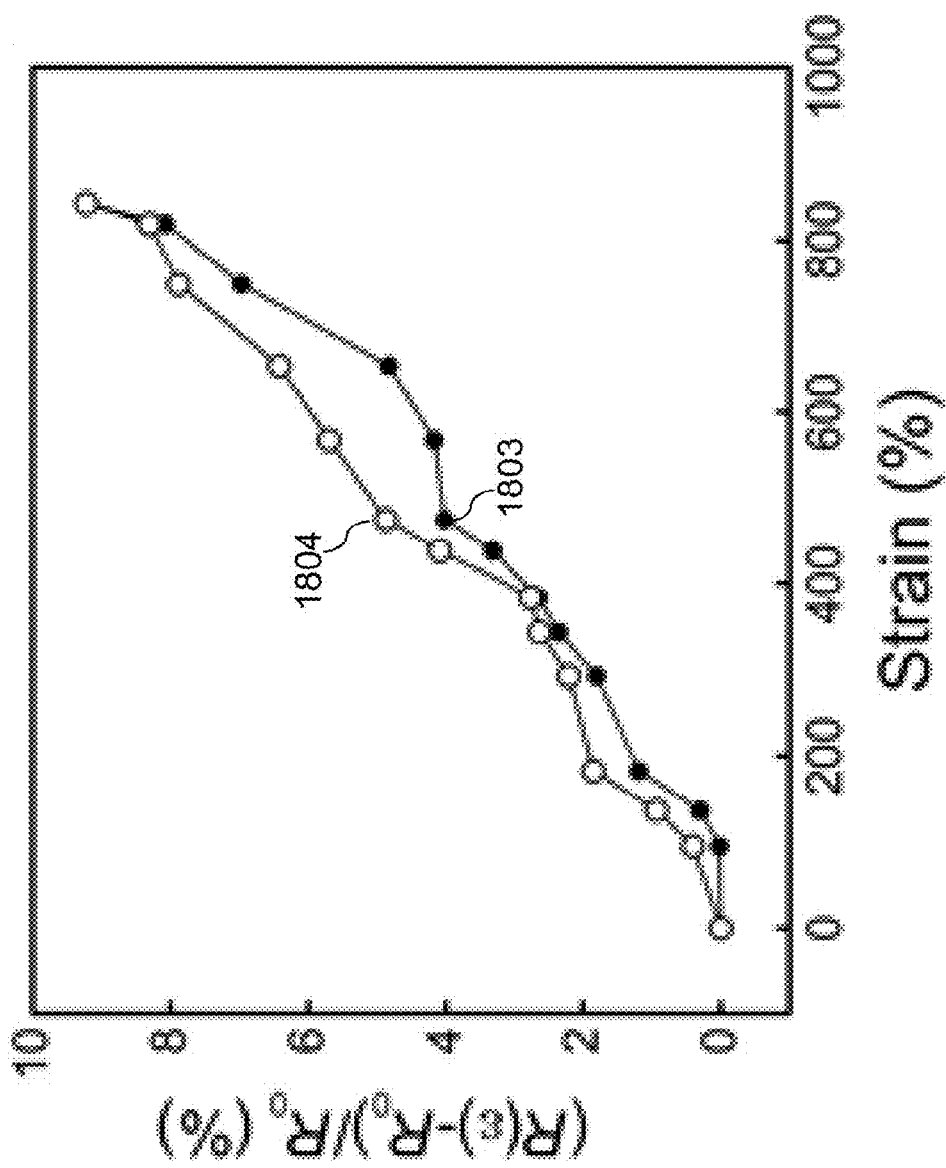
Figure 18D:
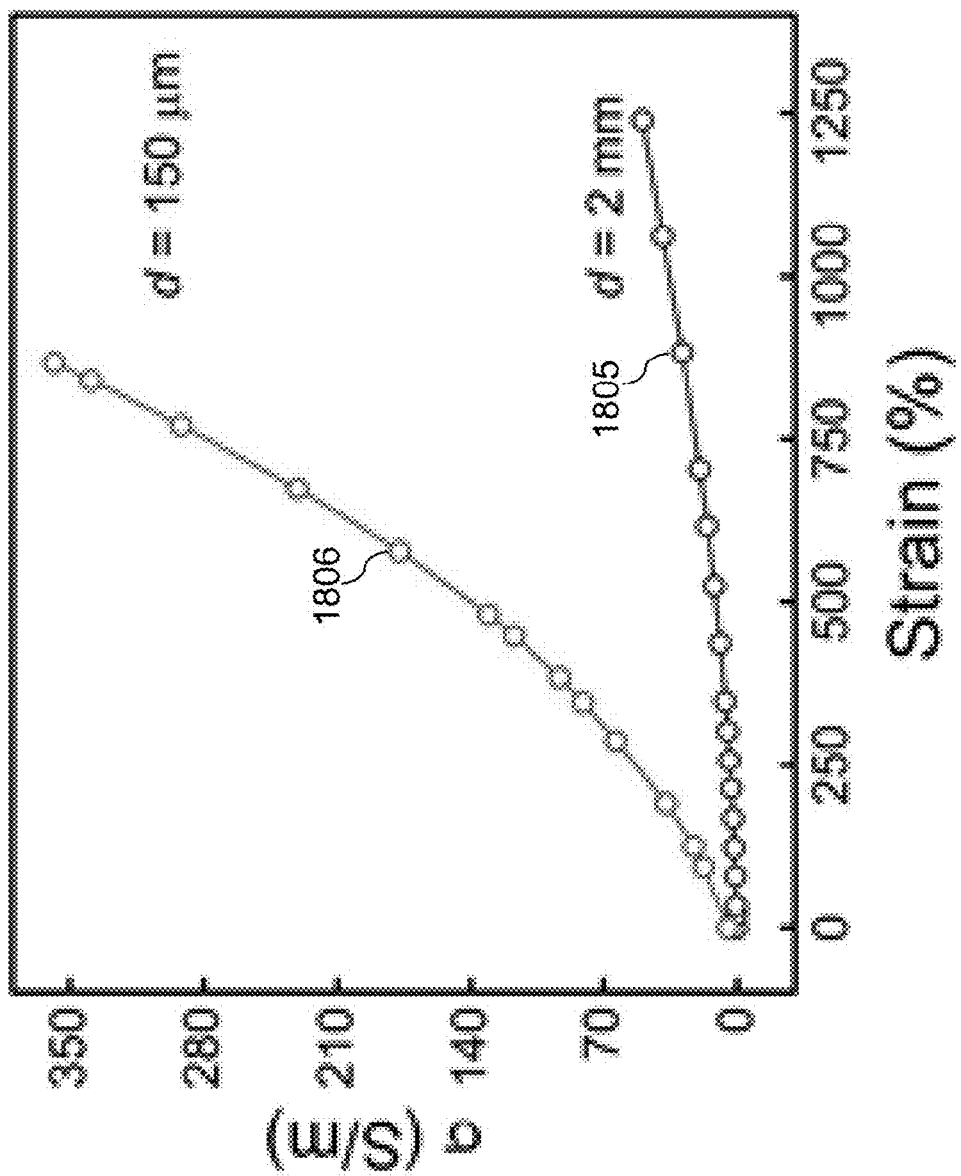
FIG. 18D is a graph that shows electrical conductivity of a 2-mm-diameter $NTS_8$@fiber and a 150-μm-diameter $NTS_8$@fiber versus strain (curves 1805 and 1806, respectively). The fabrication strain was 1400%.

Additionally, the conductivity of an 870%-stretched fiber can be increased by a factor of 13 (realizing 360 S/m conductivity) by reducing the diameter of the rubber core from 2 mm to 150 μm, while maintaining constant sheath thickness. (See FIG. 18D). The elastomeric fibers of the present invention can be deployed for such applications as pacemaker leads. While giant elastomeric deformability is not required for pacemaker leads, lead failure is a major problem [Hanker 1988]. The mechanical robustness of the hierarchically buckled sheath-core fibers, including giant torsional rotations and flexing, make them attractive for this application. Other possibilities are for cables that are extendable up to 31 times their initial length without significant resistance change, which could be applied for morphing structures in space, robotic arms or exoskeletons having giant reach, or as interconnects for highly elastic electronic circuits.

EXAMPLES

The examples provided herein are to more fully illustrate some of the embodiments of the present invention. It should be appreciated by those of skill in the art that the techniques disclosed in the examples which follow represent techniques discovered by the Applicant to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Example 1

This Example 1 demonstrates fabrication of sheath-core superelastic CNT@rubber fibers. We replace the frequently used laminate of a carbon nanotube (CNT) sheet conductor on a stretched rubber sheet with a multilayer CNT sheath on a rubber fiber core. $NTS_m$@fiber denotes that m carbon nanotube sheet (NTS) layers were wrapped around a rubber fiber core. $NTS_m$@fibers were fabricated from highly oriented carbon multiwall nanotube (MWNT) aerogel sheets, which were drawn from CNT forests [M Zhang 2005]. The rubber core and rubber sheath consisted of styrene-(ethylene-butylene)-styrene (SEBS) block copolymer (Kraton, G-1651H), which contained a plasticizer (ExxonMobil, Marcol 82). The weight ratio of polymer to plasticizer was 1:5 for the conducting fibers and 1:3 for the muscle fibers.

Figure 2A:
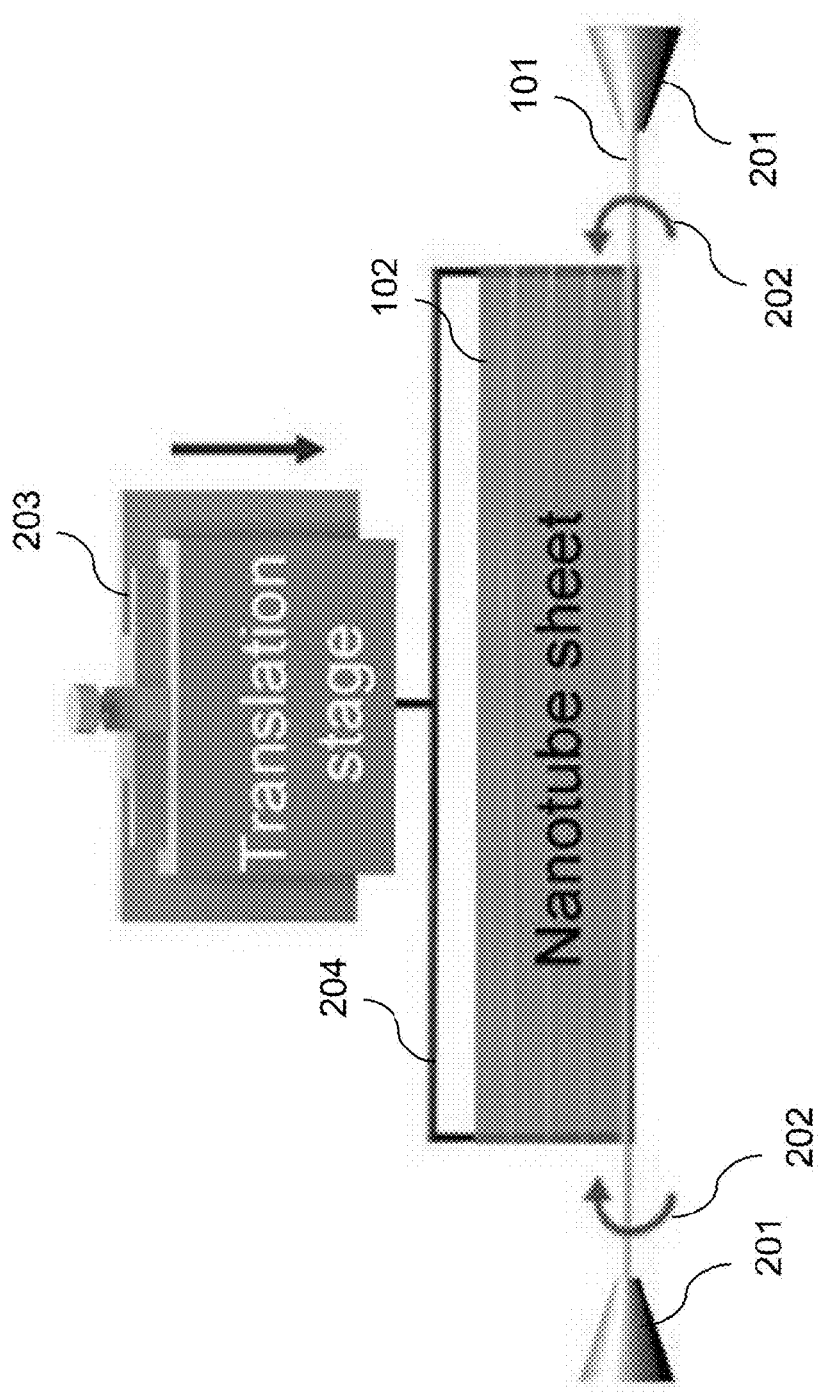
FIG. 2A is a schematic diagram of the fabrication of an $NTS_m$@fiber. Two motors synchronously rotated the stretched rubber fiber core, while an NTS stack was translated (by translation stage) so as to wrap the nanotube sheets around the rubber fiber core. The MWNT orientation within the NTS stack was kept parallel to the axial direction of the rubber fiber.
Figure 2B:
FIG. 2B is an SEM image of an $NTS_m$@fiber during fabrication, as illustrated in FIG. 2A.

The process for making an $NTS_m$@fiber is illustrated in FIG. 1A and FIG. 2A. First, two opposite ends of a melt-spun, plasticized SEBS rubber fiber were attached between the shafts of two motors and then the rubber fiber core was highly stretched. Unless otherwise indicated, this original strain (called the fabrication strain) was 1400%. Freestanding nanotube sheet was supported on a U-shaped frame that was mounted on a translation stage. To attach the NTS onto the rubber fiber, the two motors synchronously rotated the stretched rubber fiber, so no net twist was introduced. The NTS was brought into contact with the rotating rubber fiber so that it was wrapped onto the fiber, like a jelly roll. Importantly, the alignment direction of the carbon nanotubes was in the axial direction of the rubber fiber. After completion of wrapping, where the number of NTS layers, m, was controlled by counting the number of turns of the rubber fiber, ethanol (98%) was used to densify the NTSs onto the rubber fiber. After drying in air, the strain in the stretched rubber fiber was slowly released to form the non-stretched $NTS_m$@fiber.

Structure and properties characterizations are for conducting elastomer fibers that have been preconditioned by applying five cycles of stretch-release to the maximum strain that does not plastically stretch the NTSs in the sheet alignment direction. Exceeding this fabrication strain, which is measured with respect to a non-elastically deformed rubber core, would cause irreversible plastic draw of the carbon nanotube sheath in the nanotube alignment direction. Since the fabrication strain is the strain that is applied to the rubber core before application of the CNT sheath, this strain is an engineering strain measured with respect to the length of the non-deformed rubber core. On the other hand, after application of the CNT sheath, the length of the non-stretched sheath-core fiber is elongated with respect to the length of the non-deformed rubber core. Hence, when referring to applied strains for the sheath-core fiber, the engineering strain is with respect to the relaxed length of the sheath-core fiber, which is longer than that of the non-deformed rubber core.

Example 2

This Example 2 demonstrates fabrication of sheath-core superelastic rubber@CNT@rubber fibers. A rubber@$NTS_m$@fiber was obtained by spray-coating a 6-μm-thick layer of rubber (5 wt % plasticized SEBS in cyclohexane), while the $NTS_m$@fiber was in the fully stretched state. Then the fiber was first allowed to dry in air and then slowly released to its relaxed length.

Example 3

Figure 7D:
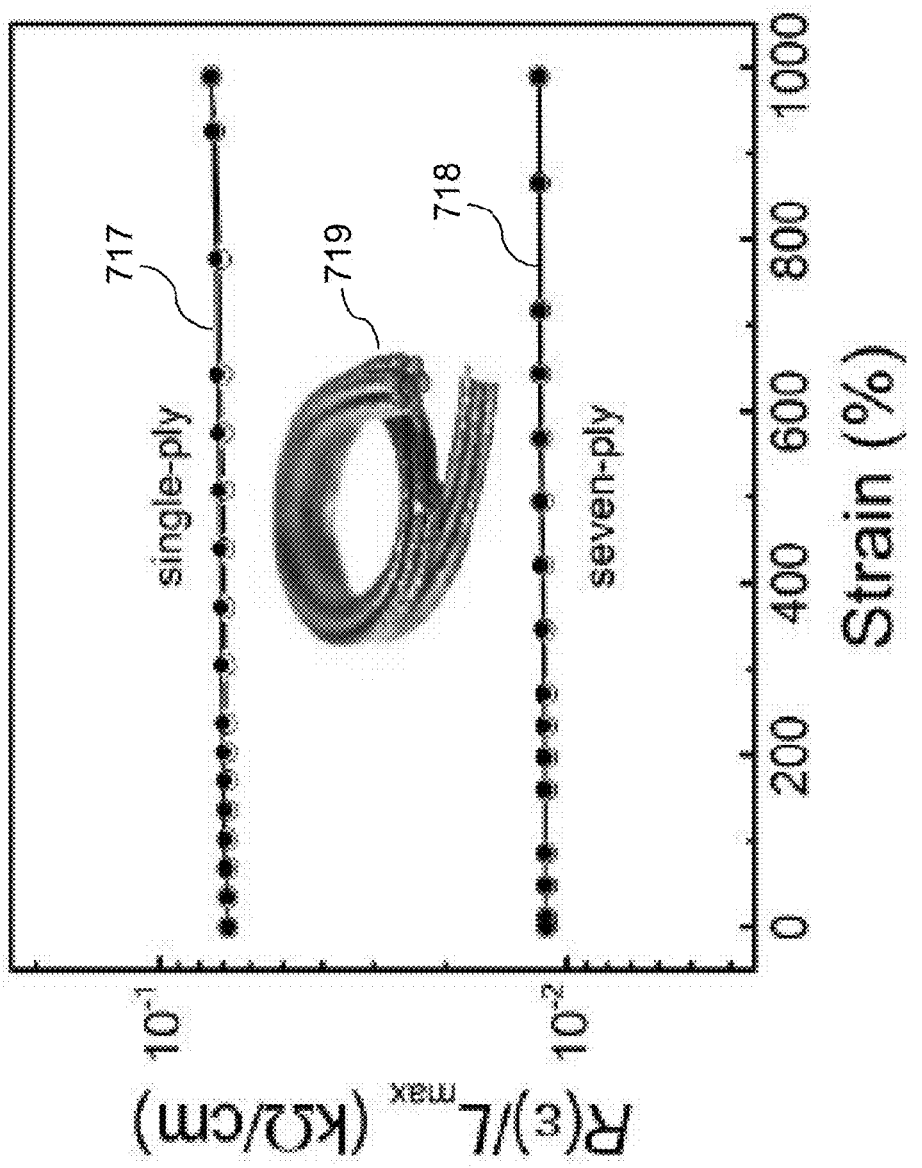
FIG. 7D is a graph that shows the dependence of fiber resistance (per maximum stretched length) on tensile strain for a single rubber@NTS$_{90}$@fiber (curve 717) and for a seven-ply rubber@NTS$_{90}$@fiber (curve 718). The inset 719 in FIG. 7D is a photograph of the seven-ply rubber@NTS$_{90}$@fiber. Each ply is 0.9 mm in diameter.

In this Example 3 seven individual rubber@$NTS_{90}$@fibers were plied together without twist to make a 7-ply elastic conductor cable, to thereby obtain an increased electrical conductance. To fabricate this cable, seven unstrained rubber@$NTS_{90}$@fibers were closely arranged parallel in a hexagonal close-packed structure, as shown in inset 719 of FIG. 7D, and then bonded together by infiltrating the above described solution of plasticized SEBS rubber. The plied conductor cable, which could be reversibly stretched to 990% strain, showed no loss of elasticity compared with the individual rubber@$NTS_{90}$@fibers. The total resistance decreased 7-fold, and surprisingly, the resistance change over this 990% strain range decreased from 10% for individual rubber@$NTS_{90}$@fiber to 4% for the 7-ply conductor cable, as shown in FIG. 7D. The corresponding quality factor (Q=percent strain/percent resistance change) increased from 97 for the individual fiber to 250 for the 7-ply cable. This increase in Q likely results from more complete elimination of axial direction inter-buckle contacts due to the thicker applied rubber layer.

Example 4

This Example 4 demonstrates downsizing the diameter of the elastomeric fiber core to the micron scale. This is equivalent to downsizing the sheath-core fiber to the same diameter, since most of the fiber diameter is due to the rubber core. For this downsizing, melt spinning was used to produce a 150-μm diameter rubber fiber core. Deploying the same technique used for making the 2-mm diameter $NTS_m$@fiber, we prepared a 150-μm-diameter $NTS_8$@fiber. The fabrication strain was 1400%, the maximum resistance change was 25% over the reversible strain range of 870%, which corresponds to Q=35. In addition, a rubber overcoating was applied to an $NTS_8$@fiber to form a 150-μm-diameter rubber@$NTS_8$@fiber. As a result of this overcoating, the maximum resistance change over the reversible 840% strain range was reduced to 9%, corresponding to a quality factor of 93. This reduction in rubber fiber core diameter from the previously used 2 mm to 150 μm, without changing the sheath thickness, increased 13-fold the fiber conductivity at 870% strain (to 360 S/m).

Example 5

This Example 5 demonstrates fabrication of a $NTS_n$@rubber@$NTS_m$@fiber capacitor, which is based on a 2-mm-diameter rubber core. In this case the thickness of the solution-deposited rubber layer (~150 μm) was greater than for the rubber layer in rubber@NTS$_m$@fiber and the rubber layer was deposited while the NTS$_m$@fiber was in relaxed state. After depositing this rubber layer, the rubber@NTS$_m$@fiber was re-stretched to the fabrication strain of the rubber core, and n layers of NTSs were wrapped onto the stretched rubber@NTS$_m$@fiber core and densified using ethanol. As for the interior NTS$_m$ sheath, the MWNT alignment direction for the NTS$_n$ sheath coincided with the fiber axial direction. The assembly was then released to its relaxed length, forming the NTS$_n$@rubber@NTS$_m$@fiber capacitor. The NTS$_n$ and NTS$_m$ layers act as the two electrodes of the capacitor, which can be used as a capacitive tensile strain sensor that utilizes the linear dependence of capacitance on strain.

Example 6

This Example 6 demonstrates the fabrication and performance of an artificial muscle based on a twisted NTS$_n$@rubber@NTS$_m$@fiber. Dielectric torsional actuators were fabricated using a hybrid fiber that contained linearly connected NTS$_n$@rubber@NTS$_m$@fiber and non-actuating rubber fiber segments, where the latter segment served as a torsional return spring. To maximize torsional stroke, the torsional return spring should serve as a reservoir of twist while providing nearly constant torque. Therefore, this return spring should have low torsional stiffness, so that the amount of twist in it is large compared to the torsional stroke. Torsional stroke was characterized by using a paddle that was attached near the midpoint between the actuating fiber segment and the return spring. To complete fabrication of the muscle, twist was added to the entire fiber (containing both segments) while maintaining a constant length. The amount of inserted twist was varied to maximize torsional stroke (FIG. 8A). To maximize tensile stroke, the thickness of the rubber layer was increased from the ~150 μm that was used for the capacitive strain sensor to ~300 μm. The amount of inserted twist (3.20 turns/cm for single-ply muscles) that maximized torsional stroke is much lower than the inserted twist that is required to produce coiling of the rubber fiber. Here and elsewhere, tensile stress is normalized with respect to the cross-sectional area of the unloaded muscle segment.

FIG. 8B shows the dependence or tensile stroke and torsional stroke on applied electric field for a single ply NTS$_n$@rubber@NTS$_m$@fiber containing 3.20 turns/cm of twist. When operated using applied voltages that provide the indicated fields of this figure, the maximum static-field tensile stroke for the single-ply muscle was 3.4%, and the obtained steady-state torsional stroke was 21.8°/cm for the single-ply muscle.

Example 7

This Example 7 demonstrates the fabrication and performance of an artificial muscle by plying together two non-twist-inserted NTS$_n$@rubber@NTS$_m$@fibers using twist. For reported measurements, the component NTS$_{10}$@rubber@NTS$_{20}$@fibers were 0.9 mm in diameter and 7.2 cm long. Since the results of FIG. 8C indicate that this twist density maximizes torsional speed and torsional stroke, the twist density used for plying was 3.47 turns/cm, based on the length of each segment. The torsional return spring (made of similar SEBS rubber as the actuating segment) was also two-ply and comprised individual fibers that were 0.5 mm in diameter and 6.5 cm long. This two-ply muscle configuration was operated isobarically, so that it provided both tensile and torsional actuation. The dependence of equilibrium torsional and tensile stroke on applied field is shown in FIG. 8D for the above two-ply NTS$_{10}$@rubber@NTS$_{20}$@fiber muscle.

Example 8

This Example 8 demonstrates the application of an NTS$_4$@rubber@NTS$_3$@fiber as a strain gauge that provides a linear response over a large stroke range. As shown in FIG. 5B, an 860% change in capacitance over a 950% strain range (corresponding to 0.91% change in capacitance per percent change in length) was demonstrated. Using a 2-cm-length NTS$_n$@rubber@NTS$_m$@fiber capacitive strain sensor providing this performance, up to a 19 cm displacement can be linearly sensed. Linear performance for such large displacements is presently not realizable using a previously described material-based sensor. For the investigated capacitive sensor, the total resistance of the two electrodes is ~36 kΩ and essentially independent of strain, and the capacitance varies between 5 pF at 0% strain to 48 pF at 950% strain. These parameters for a RC circuit provide time constants of ~0.18 μs to ~1.8 μs in going from 0% strain to 950% strain, corresponding to frequencies between ~0.6 and ~6 MHz. Consequently, the resistance of our capacitive sensors does not significantly limit response times. This capacitive sensor can be deformed at 8%/s without generating significant hysteresis between capacitance on loading and unloading.

Example 9

This Example 9 demonstrates two-dimensional hierarchical buckling structures of NTS$_m$@rubber. Unlike for previously investigated laminated structures, we observe periodic hierarchical buckling in two dimensions for NTS$_m$@fibers when m is larger than 10 and the fabrication strain ε$_{fab}$ (i.e., the strain applied to the rubber fiber core during wrapping CNT sheaths) is large (typically 1400%). The scanning electron microscope (SEM) images (FIG. 1C and FIG. 1D) show an elongation (100%) for which short and long buckling periods are simultaneously observed for the fiber axial direction (at ~8 μm and ~35 μm, respectively) and the fiber belt direction (at ~8.5 μm and ~51 μm, respectively). Unless otherwise indicated, such as by using the term "fabrication strain", mentioned strains are with respect to the relaxed state of the sheath-core structure, rather than with respect to the relaxed state of the sheath-free core. Also, structure and properties characterizations are for conducting elastomer fibers that have been trained by applying about five stretch-release cycles to the maximum strain that does not plastically stretch the NTSs in the sheet alignment direction. This training is needed, since the two-dimensionally buckled structure appears during the first cycle, and thereafter slightly evolves.

The reversible buckling for fiber axial and belt directions are out-of-phase, as is illustrated by the SEM images for an NTS$_{92}$@fiber, which can be reversibly elongated 1000%. Long-period buckling along the fiber axis is seen at 0% strain (where short-period axial buckles exist, but are squeezed together), and at 200% strain the axial short-period buckles are pulled apart. The long-period axial buckles disappear at 400% strain and the short-period axial buckles disappear near 1000% strain. There is no buckling in the belt direction at 0% strain, and long-period buckling in the belt direction appears between 200% and 400% strain, becoming more pronounced at higher strains. During strain release (from 1000% strain), these out-of-phase buckling processes in axial and belt directions reverse without noticeable hysteresis.

While the emergence of these different types of buckling and their corresponding periods for an $NTS_m@fiber$ depend upon m and the fabrication strain, the out-of-phase behavior for axial and belt buckling and the order in which short-period and long-period axial buckling occurs is a general phenomenon for our sheath-core elastomeric fibers. As the fabrication strain or m decreases, the long-period buckling in axial and belt directions disappears, and then all out-of-plane buckling disappears. For about five NTS layers and 1200% fabrication strain, only short-period axial buckles were observed. Long-period axial buckling appears when m and the fabrication strain are large. Using a single sheet layer for the sheath results in only in-plane buckling for fabrication strains up to the maximum investigated 1400%. Such use of a single sheet for the sheath of the sheath-core fiber is disadvantageous, since the resistance of the sheath-core fibers increase with decreasing numbers of sheets in the sheath.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

REFERENCES

E. Alt et al., Lead fracture in pacemaker patients. *J. Thorac. Cardiovasc. Surg.* 35, 101 (1987) ("Alt 1987").

I. A. Anderson et. al., Multi-functional dielectric elastomer artificial muscles for soft and smart machines. *J. Applied Physics* 112, 041101 (2012) ("Anderson 2012").

D. J. Apple et al., Biocompatibility of implant materials: a review and scanning electron microscopic study. *J. Am. Intraocul. Implant. Soc.* 10, 53 (1984) ("Apple 1984").

N. Behabtu et al., Strong, light, multifunctional fibers of carbon nanotubes with ultrahigh conductivity. *Science,* 339, 182 (2013) ("Behabtu 2013").

C. S. Boland et al., Sensitive, high-strain, high-rate bodily motion sensors based on graphene-rubber composites. *ACS Nano* 8, 8819 (2014) ("Boland 2014").

N. Bowden et al., Spontaneous formation of ordered structures in thin films of metals supported on an elastomeric polymer. *Nature* 393, 146 (1998) ("Bowden 1998").

P. Brochu et al., Advances in dielectric elastomers for actuators and artificial muscles. *Macromol. Rapid Commun.* 31, 10 (2010) ("Brochu 2010").

L. Cai et al., Super-stretchable, Transparent carbon nanotube-based capacitive strain sensors for human motion detection. *Sci. Rep.* 3, 3048 (2013) ("Cai 2013").

L. S. Carnell et al., Aligned Mats From Electrospun Single Fibers. *Macromolecules* 41, 5345 (2008) ("Carnell 2008").

F. Carpi et al., Materials science. Stretching dielectric elastomer performance. *Science* 330, 1759 (2010) ("Carpi 2010").

T. Chen et al., Transparent and stretchable high-performance supercapacitors based on wrinkled graphene electrodes. *ACS Nano* 8, 1039 (2014) ("Chen 2014").

T. Chen et al., High-performance transparent and stretchable all-solid supercapacitors based on highly aligned carbon nanotube sheets. *Angew. Chem. Int. Ed.* 54, 618 (2015) ("Chen 2015").

H. Cheng et al., Moisture-activated torsional graphene-fiber motor. *Adv. Mater.* 26, 2909 (2014) ("Cheng 2014").

K.-Y. Chun et al., Highly conductive, printable and stretchable composite films of carbon nanotubes and silver. *Nat. Nanotechnol.* 5, 853 (2010) ("Chun 2010").

S. F. Fennessey et al., Fabrication of aligned and molecularly oriented electrospun polyacrylonitrile fibers and the mechanical behavior of their twisted yarns." *Polymer* 45, 4217 (2004) ("Fennessey 2004").

J. Foroughi et al., Torsional carbon nanotube artificial muscles. *Science* 334, 494 (2011) ("Foroughi 2011").

C. S. Haines et al., Artificial muscles from fishing line and sewing thread. *Science* 343, 868 (2014) ("Haines 2014").

J. S. Hanker et al., Biomaterials and biomedical devices. *Science* 242, 885 (1988) ("Hanker 1988").

P. Katta et al., Continuous Electrospinning of Aligned Polymer Nanofibers onto a Wire Drum Collector. *Nano Letters* 4, 2215 (2004) ("Katta 2004").

C. Keplinger et al., Stretchable, Transparent, Ionic Conductors. *Science* 341, 984 (2013) ("Keplinger 2013").

D.-Y. Khang et al., A stretchable form of single-crystal silicon for high-performance electronics on rubber substrates. *Science* 311, 208 (2006) ("Khang 2006").

J. Kim et al., Performance test and improvement of piezoelectric torsional actuators. *Smart Mater. Struct.* 10, 750 (2001) ("J Kim 2001").

Y. Kim et al., Stretchable nanoparticle conductors with self-organized conductive pathways. *Nature* 500, 59 (2013) ("Y Kim 2013").

G. Kofod et al., Multilayer coaxial fiber dielectric elastomers for actuation and sensing. *Appl. Phys. A* 102, 577 (2010) ("Kofod 2010").

R. D. Kornbluh et al., From Boots to Buoys: Promises and Challenges of Dielectric Elastomer Energy Harvesting, Chapter 3, pp. 67-93, Electroactivity in Polymeric Materials, L. Rasmussen, Editor, Springer, 2012 ("Kornbluh 2012")

D. M. Kosynkin et al., Longitudinal unzipping of carbon nanotubes to form graphene nanoribbons. *Nature* 458, 872 (2009) ("Kosynkin 2009").

D. S. Lashmore et al., Chemically-assisted alignment of nanotubes within extensible structures. U.S. Patent Appl. Publ. No. 2009/0075545, published Mar. 19, 2009 ("Lashmore Patent Application").

P. Lee et al., Highly stretchable or transparent conductor fabrication by a hierarchical multiscale hybrid nanocomposite. *Adv. Funct. Mater.* 24, 5671 (2014) ("Lee 2014").

D. Li et al., Electrospinning of Nanofibers: Reinventing the Wheel? *Advanced Materials* 16, 1151 (2004) ("D. Li 2004").

Y. Li et al., Bismuth Nanotubes: A Rational Low-Temperature Synthetic Route. *J. Am. Chem. Soc.* 123, 9904 (2001) ("Y. Li 2001").

Y. Li et al., Direct Spinning of Carbon Nanotube Fibers from Chemical Vapor Deposition Synthesis. *Science* 304, 276 (2004) ("Y. Li 2004").

J. Liang et al., Elastomeric polymer light-emitting devices and displays. *Nat. Photonics* 7, 817 (2013) ("Liang 2013").

M. D. Lima et al., Biscrolling Nanotube Sheets and Functional Guests into Yarns. *Science* 331, 51 (2011) ("Lima 2011").

M. D. Lima et al., Electrically, chemically, and photonically powered torsional and tensile actuation of hybrid carbon nanotube yarn muscles. *Science* 338, 928 (2012) ("Lima 2012").

C. L. Pan et al., Small torsional piezoelectric fiber actuators with helical electrodes. *Appl. Phys. Lett.* 92, 012923 (2008) ("Pan 2008").

M. Park et al., Highly stretchable electric circuits from a composite material of silver nanoparticles and elastomeric fibres. *Nat. Nanotechnol.* 7, 803 (2012) ("Park 2012").

R. Pelrine et al., High-speed electrically actuated elastomers with strain greater than 100%. *Science* 287, 836 (2000) ("Petrine 2000").

S. V. Ranade et al., Styrenic block copolymers for biomaterial and drug delivery applications. *Acta Biomater.* 1, 137 (2005) ("Ranade 2005").

R. S. Rivlin, Large elastic deformations of isotropic materials. iv. further developments of the general theory. *Philos. Trans. R. Soc. London Ser. A* 241, 379 (1948) ("Rivlin 1948").

J. A. Rogers et al., Materials and mechanics for stretchable electronics. *Science* 327, 1603 (2010) ("Rogers 2010").

S. Schmidt et al., Biocompatibility of silicon-based electrode arrays implanted in feline cortical tissue. *J. Biomed. Mater. Res.* 27, 1393 (1993) ("Schmidt 1993").

T. Sekitani et al., Stretchable active-matrix organic light-emitting diode display using printable elastic conductors. *Nat. Mater.* 8, 494 (2009) ("Sekitani 2009").

R. Shankar et al., Dielectric elastomers as next-generation polymeric actuators. *Soft Matter* 3, 1116 (2007) ("Shankar 2007").

M. K. Shin et al., Elastomeric conductive composites based on carbon nanotube forests. *Adv. Mater.* 22, 2663 (2010) ("M Shin 2010").

U.-H. Shin et al., Highly stretchable conductors and piezocapacitive strain gauges based on simple contact-transfer patterning of carbon nanotube forests. *Carbon* 80, 396 (2014) ("U Shin 2014").

C. Wang et al., Buckled, stretchable polypyrrole electrodes for battery applications. *Adv. Mater.* 23, 3580 (2011) ("Wang 2011").

M. S. White et al., Ultrathin, highly flexible and stretchable PLEDs. *Nat. Photonics* 7, 811 (2013) ("White 2013").

Y. Wu et al., Superconducting $MgB_2$ nanowires. *Advanced Materials* 13, 1487 (2001) ("Wu 2001").

Y. Wu et al., Single Crystalline Nanowires of Lead Can Be Synthesized Through Thermal Decomposition Of Lead Acetate IN Ethylene Glycol. *Nano Letters* 3, 1163 (2003) ("Wu 2003").

T. Yamada et al., A stretchable carbon nanotube strain sensor for human-motion detection. *Nat. Nanotechnol.* 6, 296 (2011) ("Yamada 2011").

J. Zang et al., Multifunctionality and control of the crumpling and unfolding of large-area graphene. *Nat. Mater.* 12, 321 (2013) ("Zang 2013").

M. Zhang et al., Strong, transparent, multifunctional, carbon nanotube sheets. *Science* 309, 1215 (2005) ("M Zhang 2005").

Q. M. Zhang et al., Giant electrostriction and relaxor ferroelectric behavior in electron-irradiated poly(vinylidene fluoride-trifluoroethylene) copolymer. *Science* 280, 2101 (1998) ("Q Zhang 1998").

Z. Zhang et al., Superelastic supercapacitors with high performances during stretching. *Adv. Mater.* 27, 356 (2015) ("Z Zhang 2015").

S. Zhu et al., Ultrastretchable fibers with metallic conductivity using a liquid metal alloy core. *Adv. Funct. Mater.* 23, 2308 (2013) ("S Zhu 2013").

Y. Zhu et al., Buckling of aligned carbon nanotubes as stretchable conductors: a new manufacturing strategy. *Adv. Mater.* 24, 1073 (2012) ("Y Zhu 2012").

What is claimed is:

1. A superelastic conductive fiber comprising
   (a) a reversibly stretchable fiber core; and
   (b) one or more layers of nanofiber sheets wrapped on the stretchable fiber core, wherein
      (i) the one or more layers of nanofiber sheets were wrapped on the stretchable fiber core while the reversibly stretchable fiber core was in a stretched position,
      and
      (ii) the orientation of the nanofibers in at least one of the one or more layers of nanofiber sheets is parallel to the length direction of the stretchable fiber core.

2. The superelastic conductive fiber of claim 1, wherein the superelastic conductive fiber is operable as a fiber selected from the group consisting of fiber capacitors, tensile strain sensors, and artificial muscles that provide torsional actuation, tensile actuation, or a combination thereof.

3. The superelastic conductive fiber of claim 2, wherein
   (a) the superelastic conductive fiber is operable as a fiber capacitor in which 950% stretch of superelastic conductive fiber provides at least 800% increase in capacitance, and
   (b) the increase in capacitance change is substantially non-hysteretic and reversible.

4. The superelastic conductive fiber of claim 1, wherein the orientation of the nanofibers in each of the one or more layers of nanofiber sheets is parallel to the length direction of the stretchable fiber core.

5. The superelastic conductive fiber of claim 2, wherein the superelastic conductive fiber is operable as an artificial muscle based on electrostatic attraction between electrodes of dielectric rubber capacitors.

6. The superelastic conductive fiber of claim 5, wherein the artificial muscle is a high stroke torsional fiber muscle made by inserting twist into the superelastic conductive fiber.

7. An elastomeric electrically conducting fiber that is operable for being periodically buckled in a first dimension and a second dimension, wherein the elastomeric electrically conducting fiber comprises:
   (a) an elastomeric fiber core; and
   (b) a nanofiber sheath having nanofibers that are predominately oriented parallel to the length direction of the elastomeric fiber core, wherein
      (i) the first dimension is provided by length direction of the elastomeric electrically conducting fiber;
      (ii) the second dimension is provided by belt direction of the elastomeric electrically conducting fiber; and
      (iii) the periodic buckling in the first dimension and the second dimension provides out-of-plane buckling.

8. The elastomeric electrically conducting fiber of claim 7, wherein the periodic buckling in the first dimension and the second dimension is operable to occur out-of-phase in the length direction and the belt direction as length of the elastomeric electrically conducting fiber is varied by either mechanical stretch or release of mechanical stretch.

9. The elastomeric electrically conducting fiber of claim 8, wherein the buckling in the first direction and the second direction is hierarchical in that, in each of the first direction and the second direction, both long period and short period buckling is operable to occur.

* * * * *